(12) United States Patent
Miyata

(10) Patent No.: US 7,812,973 B2
(45) Date of Patent: Oct. 12, 2010

(54) PRINT DATA TRANSMISSION TO IMAGER OF PRINT DATA FOR DOWNLOADABLE FONT IN DATA TRANSMITTING SEQUENCE REFLECTING DIFFERENCES IN PAGE SEQUENCE BETWEEN ORIGINAL PAGES AND PRINT PAGES

(75) Inventor: Yuji Miyata, Nishikasugai-gun (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1429 days.

(21) Appl. No.: 11/066,144

(22) Filed: Feb. 25, 2005

(65) Prior Publication Data

US 2005/0200871 A1    Sep. 15, 2005

(30) Foreign Application Priority Data

Feb. 27, 2004   (JP) ............................. 2004-055268

(51) Int. Cl.
G06K 15/00 (2006.01)
G06F 3/12 (2006.01)
G06F 9/46 (2006.01)

(52) U.S. Cl. .................... 358/1.11; 358/1.12; 358/1.13; 358/1.14; 358/1.15; 718/102; 718/103; 718/104; 718/105

(58) Field of Classification Search ................ 358/1.11, 358/1.12, 1.15, 1.18; 345/467, 581
See application file for complete search history.

(56) References Cited

U.S. PATENT DOCUMENTS

| 5,993,088 | A | * | 11/1999 | Nogay et al. .................. 400/78 |
| 6,069,704 | A | * | 5/2000 | Verhaag ...................... 358/1.12 |
| 6,167,460 | A | * | 12/2000 | Okada et al. ................... 710/5 |
| 6,313,920 | B1 | * | 11/2001 | Dresevic et al. ............. 358/1.11 |
| 6,433,884 | B1 | * | 8/2002 | Kawakami ................. 358/1.15 |
| 6,613,041 | B1 | | 9/2003 | Schrunder |
| 6,788,430 | B1 | * | 9/2004 | Emoto ........................ 358/1.16 |
| 2002/0159084 | A1 | * | 10/2002 | Daniels et al. ............. 358/1.11 |
| 2003/0090717 | A1 | * | 5/2003 | Yoshida et al. ............. 358/1.15 |
| 2004/0070788 | A1 | * | 4/2004 | Barry et al. ................ 358/1.15 |

FOREIGN PATENT DOCUMENTS

JP          A 5-184543          7/1993

(Continued)

Primary Examiner—Mark K Zimmerman
Assistant Examiner—Haris Sabah
(74) Attorney, Agent, or Firm—Oliff & Berridge, PLC

(57) ABSTRACT

A print management apparatus is disclosed which includes a print-data producing device that produces print data based on original data, and which allows a downloading of font data from the print management apparatus to an image forming apparatus. The print management apparatus further includes: a sequence modifier modifying a sequence in which the print management apparatus outputs the print data to the image forming apparatus, from an original sequence in which original pages represented by the original data are arranged, into a printing sequence in which print pages printed by the image forming apparatus are arranged; and a redundant-range detector detecting a redundant range over which an identical downloadable font is redundantly used within the print pages arranged in the printing sequence. The print-data producing device outputs the print data to the image forming apparatus in the printing sequence, without a redundant output of at least one portion of data identical to the font data previously outputted to the image forming apparatus.

20 Claims, 36 Drawing Sheets

FOREIGN PATENT DOCUMENTS

| | | |
|---|---|---|
| JP | A 5-317264 | 12/1993 |
| JP | A 7-175614 | 7/1995 |
| JP | A 7-176514 | 7/1995 |
| JP | A 7-194548 | 8/1995 |
| JP | A 11-259250 | 9/1999 |
| JP | A 11-259260 | 9/1999 |
| JP | A 2000-118101 | 4/2000 |
| JP | A 2000-342538 | 12/2000 |
| JP | A 2001-113764 | 4/2001 |
| JP | A 2001-245852 | 9/2001 |
| JP | A 2002-523120 | 7/2002 |
| JP | A 2003-526446 | 9/2003 |
| WO | WO 01/67977 A1 | 9/2001 |

* cited by examiner

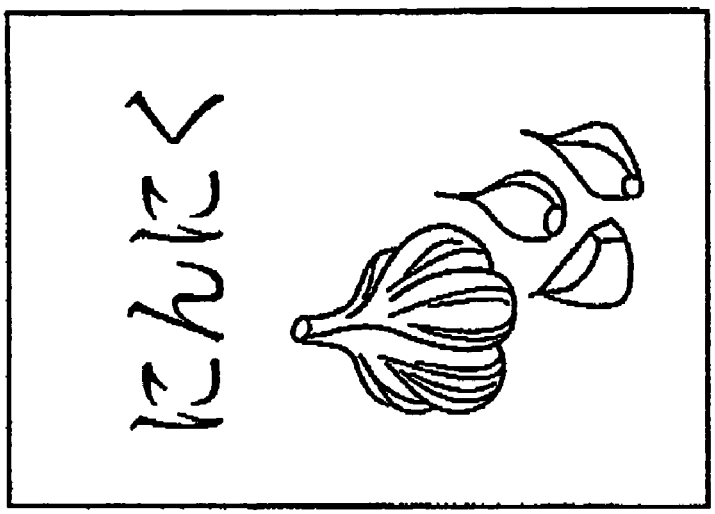
PAGE 3
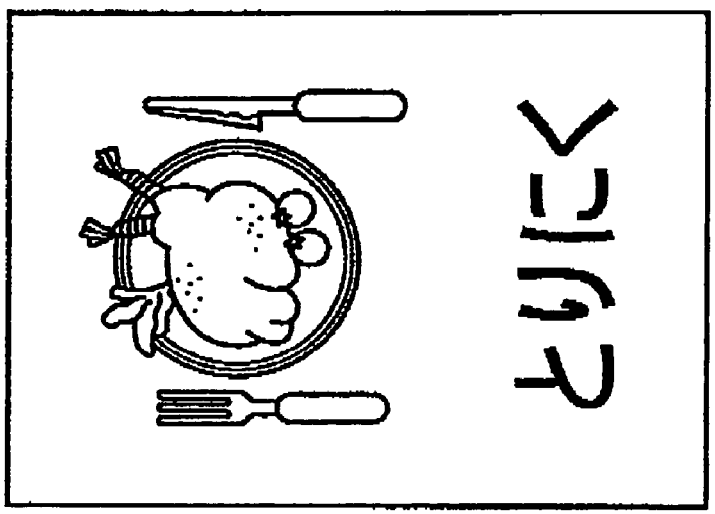
PAGE 2
FIG.11
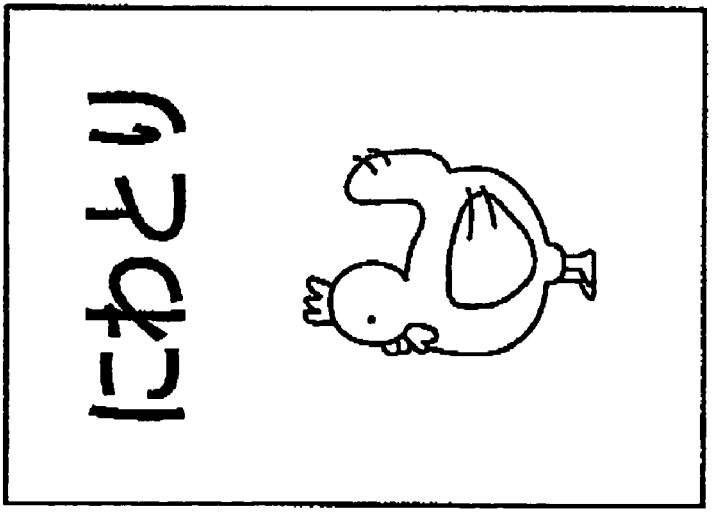
PAGE 1

PAGE INDEX INFORMATION

| PAGE NO. | START POSITION | LENGTH |
|---|---|---|
| 1 | 0 | 600 |
| 2 | 600 | 500 |
| 3 | 1100 | 800 |

FIG.14

FONT INDEX INFORMATION

| FONT NO. | FONT NAME | START POSITION | LENGTH |
|---|---|---|---|
| 1 | GOTHIC FONT | 0 | 500 |
| 2 | MING-CHO FONT | 1100 | 550 |

FIG.16

USED-FONT INFORMATION

| PAGE NO. | NUMBER OF TOTAL FONTS USED | SEQUENTIAL NUMBERS OF USED FONTS |
|---|---|---|
| 1 | 1 | 1 |
| 2 | 1 | 1 |
| 3 | 1 | 2 |

FIG.17

CHARACTER INDEX INFORMATION

| CHARACTER NO. | FONT NO. | CHARACTER CODE | START POSITION | LENGTH |
|---|---|---|---|---|
| 1 | 1 | 0x306B[に] | 500 | 100 |
| 2 | 1 | 0x308F[わ] | 600 | 150 |
| 3 | 1 | 0x3068[と] | 750 | 100 |
| 4 | 1 | 0x308A[り] | 850 | 150 |
| 5 | 1 | 0x304F[く] | 1000 | 100 |
| 6 | 2 | 0x306B[に] | 1650 | 150 |
| 7 | 2 | 0x3093[ん] | 1800 | 150 |
| 8 | 2 | 0x304F[く] | 1950 | 100 |

FIG.18

USED-CHARACTER INFORMATION

| PAGE NO. | NUMBER OF TOTAL CHARACTERS USED | SEQUENTIAL NUMBERS OF USED CHARACTERS |
|---|---|---|
| 1 | 4 | 1, 2, 3, 4 |
| 2 | 4 | 3, 4, 1, 5 |
| 3 | 3 | 6, 7, 8 |

FIG.19

PAGE SEQUENCE INFORMATION

| PRINTING SEQUENCE | PAGE NO. |
|---|---|
| 1 | 2 |
| 2 | 1 |
| 3 | 3 |

FIG.20

FONT INDEX INFORMATION

| FONT NO. | FONT NAME | START POSITION | LENGTH | START PAGE NUMBER USING DOWNLOADED FONT | END PAGE NUMBER USING DOWNLOADED FONT |
|---|---|---|---|---|---|
| 1 | GOTHIC FONT | 0 | 500 | 1 | 2 |
| 2 | MING-CHO FONT | 1100 | 550 | 3 | 3 |

FIG.21

CHARACTER INDEX INFORMATION

| CHARACTER NO. | FONT NO. | CHARACTER CODE | START POSITION | LENGTH | START PAGE NUMBER USING CHARACTER IN DOWNLOADED FONT | END PAGE NUMBER USING CHARACTER IN DOWNLOADED FONT |
|---|---|---|---|---|---|---|
| 1 | 1 | 0x306B[に] | 500 | 100 | 1 | 2 |
| 2 | 1 | 0x308F[わ] | 600 | 150 | 2 | 2 |
| 3 | 1 | 0x3068[と] | 750 | 100 | 1 | 2 |
| 4 | 1 | 0x308A[り] | 850 | 150 | 1 | 2 |
| 5 | 1 | 0x304F[く] | 1000 | 100 | 1 | 1 |
| 6 | 2 | 0x306B[に] | 1650 | 150 | 3 | 3 |
| 7 | 2 | 0x3093[ん] | 1800 | 150 | 3 | 3 |
| 8 | 2 | 0x304F[く] | 1950 | 100 | 3 | 3 |

FIG.22

FIG.24 PRINT DATA (CONVENTIONAL ART)

PRINT DATA TRANSMISSION TO IMAGER OF PRINT DATA FOR DOWNLOADABLE FONT IN DATA TRANSMITTING SEQUENCE REFLECTING DIFFERENCES IN PAGE SEQUENCE BETWEEN ORIGINAL PAGES AND PRINT PAGES

This application is based on Japanese Patent Application No. 2004-055268 filed Feb. 27, 2004, the content of which is incorporated hereinto by reference.

CROSS-REFERENCE TO RELATED APPLICATIONS

Not Applicable.

BACKGROUND OF THE INVENTION

1. Field of the Invention

The present invention relates to techniques of transmitting print data from a computer to an imager such as a printer or a copier, and more particularly to techniques of transmitting print data for a downloadable font in the presence of the differences in page sequence between original pages and print pages.

2. Description of the Related Art

A printing or imaging system is known in which print data is transmitted from a computer to a printer as an imager, thereby causing the printer to print using the print data transmitted. There has been provided the printing system of a type allowing a downloading from the computer to the printer, of font data which has not been previously retained in the printer, thereby causing the printer to perform a printing operation by the printer using a downloadable font.

The employment of the above arrangement provides a preferable printing system which of course permits an incorporation of a newly-provided font data into the printer, and which does not require the printer to previously store all of the existing numerous kinds of font data.

BRIEF SUMMARY OF THE INVENTION

In an event of printing using such a downloadable font described above, a problem is encountered with the amount of data required to be transmitted from the computer to the printer. The amount of data to be transmitted is preferably reduced as much as possible, in order to eliminate a fear that the printer is subject to a slow down in print speed due to a large amount of data received and stored in the printer.

For better understanding the above, a more specific description will be made below by way of an example of a case where print pages or physical pages are required to be printed in the same page sequence as that in which original pages of an original document are arranged, for example, on a screen of the computer.

The above original document is created as a result of the execution of a suitable application program by the computer, and the page sequence in which the original pages are arranged is indicated by original data created as a result of the execution of the application program. In view of the fact that the print pages may be referred to as "physical pages," the original pages may be referred to as "virtual or on-screen pages," for example.

In this case, an approach may be employed that a downloadable font, once downloaded to the printer in association with a certain one of the print pages, is utilized for printing not only the certain print page but also the following print pages, to thereby avoid a redundant downloading of the same downloadable font.

This approach allows an adequate reduction in amount of data required to be totally downloaded to the printer, without facing any difficulties in printing characters using a downloadable font.

For example, where a certain downloadable font, which is to be used for the first print page, is to be used also for the second print page, the efficiency of the printer in printing is enhanced, provided that data for the certain downloadable font, which was previously downloaded to the printer in timed relation with the printing for the first print page, is not downloaded again to the printer in timed relation with the printing for the second print page, and provided that the data previously downloaded to and stored in the printer is redundantly used in the printing for the second print page.

Conventionally, the above approach however fails to be properly applied without any modification thereto, in a case where there are differences between the original sequence of the original pages created as a result of the execution of the aforementioned application program, and the transmitting sequence in which print data is to be transmitted to the printer, for the purpose of printing pages for producing a booklet, for example.

In this context, the transmitting sequence coincides with the page sequence in which the physical pages, i.e., print pages printed by the printer are arranged in sequence.

More specifically, conventionally, for the printing sequence to be determined by rearranging in sequence the original pages, subsets of print data for respective print pages are formed into respective individual files, and these files, upon rearrangement in order, are outputted to the printer.

For better understanding the above situation, an example case will be cited below in which subsets of print data are organized to allow the same downloadable font to be used both on the first and the second page of the same original document.

If the above approach is applied in the above example case, for the first page of the original document to be printed, data relating to a downloadable font used on the first page of the original document is entirely downloaded to the printer. In addition, for the second page of the original document to be printed, data relating to a downloadable font which is used both on the first and the second page is not downloaded to the printer, while only a downloadable font which is not used on the first page but used on the second page is newly downloaded to the printer.

That is, data relating to a downloadable font which is used both on the first and the second page is downloaded to the printer in timed relation with the printing of the first page, and is not downloaded in timed relation with the printing of the second page.

The above approach does not require the repeated downloading of data for a downloadable font used for both of the first and the second page of the original document to the printer in timed relation with the printing of the second page of the original document. As a result, if the subsets of print data for the first and the second page of the original document are simply reversed in sequence, when the second page of the original document attempts to be printed prior to the first page of the original document, there is no data for the downloadable font required for printing the second page of the original document.

As is evident from the above, such a conventional approach has difficulties in eliminating a redundant output of data to the printer in the presence of the differences in page sequence between the original pages and the print pages.

For avoiding such drawbacks, there is proposed an alternative approach allowing a downloading of each subset of data relating to a downloadable font required for each page on a per page basis. The alternative approach ensures a downloading of data for a downloadable font required for each page to the printer on a per page basis, irrespective of whether or not the downloadable font downloaded once will be used again later, to thereby avoid an inappropriate printing operation.

The alternative approach however unavoidably requires the processing of an increased amount of data, and eventually results in a slow down of the print speed of the printer.

It is therefore an object of the present invention to provide, in an environment where font data is downloadable to an imager, and where a plurality of successive pages are printed by the imager in a printing sequence modified from a sequence in which the original pages are arranged, i.e., in which subsets of print data are outputted to the imager, techniques which allow the imager to make a more efficient utilization of font data downloaded once to the imager.

According to the present invention, a print management apparatus is provided which includes a print-data producing device that produces print data based on original data, and which allows a downloading of font data from the print management apparatus to an image forming apparatus.

The print management apparatus includes:

a sequence modifier modifying a sequence in which the print management apparatus outputs the print data to the image forming apparatus, from an original sequence in which original pages represented by the original data are arranged, into a printing sequence in which print pages printed by the image forming apparatus are arranged; and a redundant-range detector detecting a redundant range over which an identical downloadable font is redundantly used within the print pages arranged in the printing sequence.

The print-data producing device is configured to output the print data to the image forming apparatus in the printing sequence, without a redundant output of at least one portion of data identical to the font data previously outputted to the image forming apparatus.

The thus-configured print management apparatus is configured in an environment where font data is downloadable from the print management apparatus to the image forming device, and where a plurality of successive pages are printed by the image forming apparatus in a printing sequence modified from a sequence in which original pages are arranged. That is, such an environment is where the original pages are rearranged in printing.

The above print management apparatus, because of the above configuration, allows the detection of the redundant range over which the identical downloadable font is redundantly used within a plurality of successive print pages arranged in the same sequence as the printing sequence.

The above print management apparatus further allows the output of the print data to the image forming apparatus in the same sequence as the printing sequence, without a redundant output of at least one portion of data identical to the font data previously outputted to the image forming apparatus.

The above print management apparatus therefore allows a more efficient reduction in amount of data required to be outputted to the image forming apparatus for printing using a downloadable font. This is conducive to an improved efficient utilization in the image forming apparatus of font data for a downloadable font downloaded once to the image forming apparatus.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities show. In the drawings:

FIG. 11 illustrates an example of original document having three pages;

FIG. 14 illustrates the content of page index information shown in FIG. 1B;

FIG. 16 illustrates the content of font index information shown in FIG. 1B;

FIG. 17 illustrates the content of used-font information shown in FIG. 1B;

FIG. 18 illustrates the content of character index information shown in FIG. 1B;

FIG. 19 illustrates the content of used-character information shown in FIG. 1B;

FIG. 20 illustrates the content of page sequence information employed in the printer driver 3 shown in FIG. 13;

FIG. 21 illustrates the content of the font index information shown in FIG. 1B;

FIG. 22 illustrates the content of the character index information shown in FIG. 1B;

DETAILED DESCRIPTION OF THE INVENTION

Figure 1A:
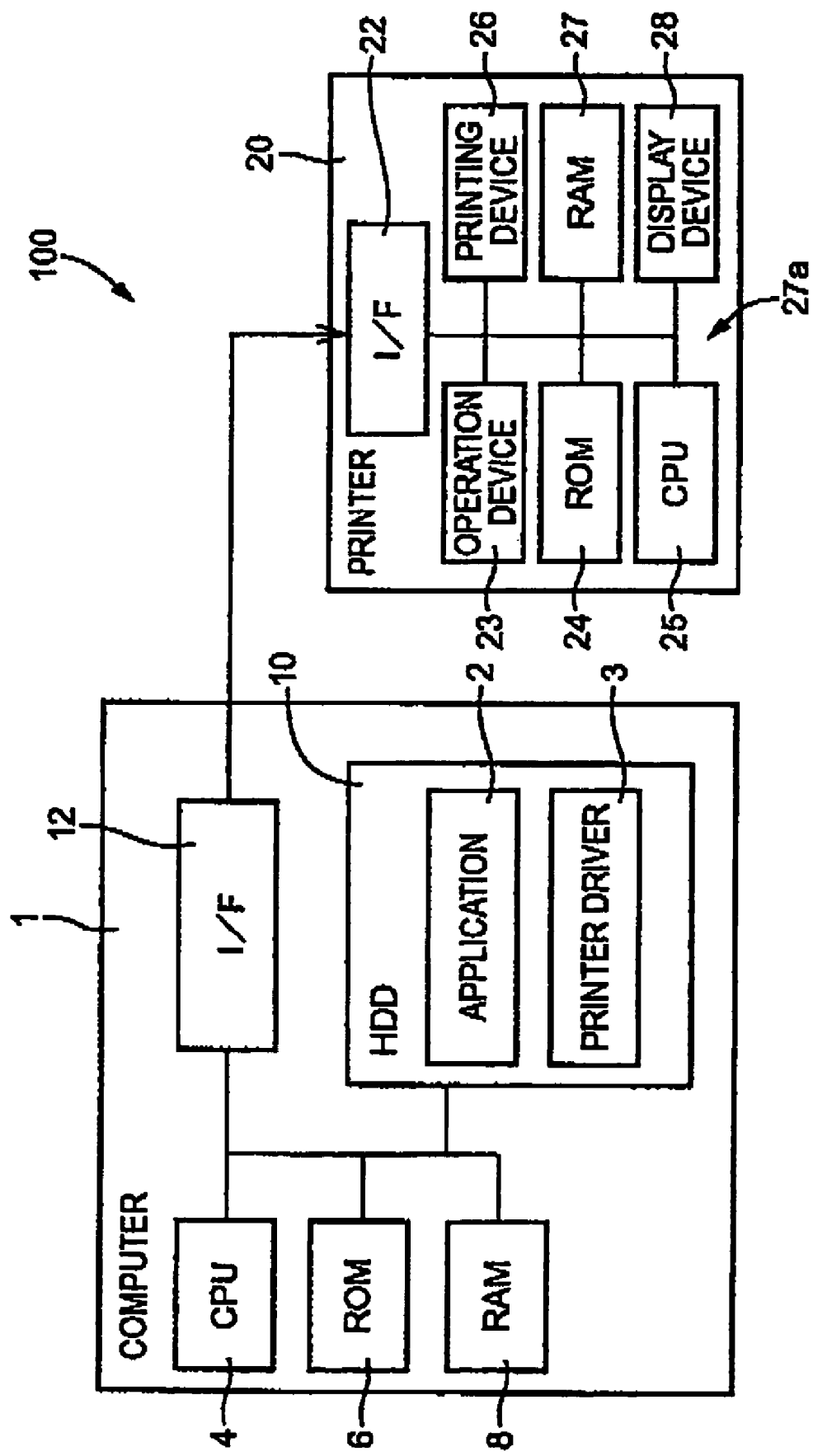
FIG. 1A is a block diagram illustrating schematically a printing system constructed according to a first embodiment of the present invention.

The object mentioned above may be achieved according to any one of the following modes of this invention.

These modes will be stated below such that these modes are sectioned and numbered, and such that these modes depend upon the other mode or modes, where appropriate. This is for a better understanding of some of a plurality of technological features and a plurality of combinations thereof disclosed in this description, and does not mean that the scope of these features and combinations is interpreted to be limited to the scope of the following modes of this invention.

That is to say, it should be interpreted that it is allowable to select the technological features which are stated in this description but which are not stated in the following modes, as the technological features of this invention.

Furthermore, stating each one of the selected modes of the invention in such a dependent form as to depend from the other mode or modes does not exclude a possibility of the technological features in a dependent-form mode to become independent of those in the corresponding depended mode or modes and to be removed therefrom. It should be interpreted that the technological features in a dependent-form mode is allowed to become independent according to the nature of the corresponding technological features, where appropriate.

(1) A printing system comprising a print management apparatus and an image forming apparatus, the print management apparatus including a print-data producing device producing and outputting print data based on original data produced as a result of execution of an application program, the image forming apparatus receiving the print data from the print management apparatus and forming an image using the received print data, the printing system being configured to allow a downloading of font data for forming a downloadable font in use for a printing operation by the image forming apparatus using the print data, from the print management apparatus to the image forming apparatus, the print management apparatus further comprising:

a sequence modifier operable in the printing operation in which the image forming apparatus prints a plurality of successive print pages using the print data, wherein the successive print pages are printed in a printing sequence of pages different from an original sequence of pages in which a plurality of successive original pages represented by the original data are arranged, the sequence modifier modifying into the printing sequence of pages a sequence in which the print management apparatus outputs the print data to the image forming apparatus, within a sequence-modification range selected to at least include a non-correspondence range over which the original sequence of pages and the printing sequence of pages do not coincide in numerical number of pages with each other, respectively, within the successive print pages arranged in the printing sequence; and a redundant-range detector detecting a redundant range over which an identical downloadable font is redundantly used within the selected sequence-modification range, wherein the print-data producing device is configured to output the print data to the image forming apparatus in the printing sequence of pages, without a redundant output of at least one portion of data identical to the font data previously outputted to the image forming apparatus.

The system constructed according to the above mode (1) allows the detection of the redundant range over which the identical downloadable font is redundantly used within a plurality of successive print pages arranged in the same sequence as the printing sequence.

The system according to the above mode (1) further allows the output of the print data to the image forming apparatus in the same sequence as the printing sequence, without a redundant output of at least one portion of data identical to the font data previously outputted to the image forming apparatus.

The system according to the above mode (1) therefore allows a more efficient reduction in amount of data required to be outputted to the image forming apparatus for printing using a downloadable font. This is conducive to an improved efficient utilization in the image forming apparatus of font data for a downloadable font downloaded once to the image forming apparatus.

Throughout the description, the term "print data" and the term "font data" are each interpreted depending upon where the respective terms are used.

For example, the term "print data" may be interpreted to mean data including font data and page data both described below, or data including the page data but excluding the font data. In addition, the term "font data" may be interpreted to mean data including font headers and character data both described below, data including the font headers but excluding the character data, or data including the character data but excluding the font headers.

(2) The system according to mode (1), further comprising a position determining device specifying a font data position at which the font data is used in the print data, wherein the redundant range detector detects the redundant range based on the font data position determined by the position determining device.

The system according to the above mode (2) allows an appropriate determination of where the font data for a particular kind of a downloadable font is used in the print data, despite the original pages are rearranged in sequence in printing, or in determining the printing sequence of the print pages.

The system according to the above mode (2) therefore allows the detection of a redundant range over which a particular kind of a downloadable font is redundantly used within the print pages arranged in the printing sequence.

(3) The system according to mode (2), wherein the position determining device determines the font data position, upon coincidence between the original sequence of pages and the printing sequence of pages throughout the plurality of pages.

The system according to the above mode (3) allows the deactivation of the processing of determining a font data position at which the font data is used in the print data, in a case where there is no difference in page sequence between the original pages and the print pages.

The system according to the above mode (3) is therefore capable of a faster data processing depending on the situations.

(4) The system according to mode (2) or (3), wherein the position determining device determines as at least one downloadable-font-used page at least one of the plurality of print pages on which the downloadable font is used, and wherein the redundant-range detector detects the redundant range based on at least one page number of at least one of the plurality of print pages arranged in the printing sequence of pages, which at least one corresponds to the at least one downloadable-font-used page, upon modification by the sequence modifier of the sequence in which the print data is outputted to the image forming apparatus, from the original sequence of pages into the printing sequence of pages.

The system according to the above mode (4) allows a more appropriate determination of at least one downloadable-font-used page using a particular kind of a downloadable font, resulting in a more ensured detection of the redundant range based on the determined downloadable-font-used page, despite that the printing sequence of the print pages is different from the original sequence of the original pages.

(5) The system according to mode (4), wherein the at least one downloadable-font-used page comprises a plurality of downloadable-font-used pages, wherein the redundant range detector detects a start page of the plurality of downloadable-font-used pages arranged in the printing sequence of pages, wherein the print-data producing device outputs the font data in timed relation with an event of outputting to the image forming apparatus of a portion of the print data which corresponds to the start page, the print data being representative of the plurality of print pages arranged in the printing sequence of pages, and wherein the print-data producing device avoids a redundant output of at least one portion of data identical to the font data previously outputted to the image forming apparatus, for at least one of the downloadable-font-used pages which follows the start page in the printing sequence.

The system according to the above mode (5) allows a more ensured detection of the redundant range based on the at least one downloadable-font-used page, and allows a more effective elimination of the data output to the image forming apparatus in association with the at least one downloadable-font-used page.

(6) The system according to any one of modes (1)-(5), wherein the downloadable font comprises a plurality kinds of downloadable fonts, and wherein the system is configured to allow a downloading of the plurality kinds of downloadable fonts from the print management apparatus to the image forming apparatus, wherein the redundant range detector comprises:

(a) a kind-related-information producing device producing per-page kind-related-information for specifying in kind at least one of the plurality kinds of downloadable fonts which is used for printing the plurality of print pages represented by the print data, on a per print-page basis; and (b) a per-kind redundant-range detecting device detecting a redundant range over which the same kind of downloadable font is redundantly used within the plurality of print pages arranged in the printing sequence of pages, for each of the plurality kinds of downloadable fonts, based on the per-page kind-related-information produced by the kind-related-information producing device, and wherein the print-data producing device avoids a redundant output of at least one portion of data identical to the font data previously outputted to the image forming apparatus, for each of the plurality kinds of downloadable fonts, over the redundant range detected by the per-kind redundant-range detecting device.

The system according to the above mode (6) allows a more ensured detection of the redundant range on a per kind-of-downloadable-font basis, despite that various in kind of downloadable fonts are used, resulting in a more efficient data output to the image forming apparatus for every kind of a downloadable font.

(7) The system according to any one of modes (1)-(6), wherein the image forming apparatus comprises a memory allowing for storage of the font data received from the print-data producing device, wherein the print management apparatus comprises:

(a) an inactive-font detecting device detecting as an inactive font at least one of a plurality of downloadable fonts represented by the font data stored in the memory, which at least one will not be used later at least temporarily; and (b) a deletion-command output device outputting to the image forming apparatus a deletion command instructing the image forming apparatus to delete from the memory data for the inactive font detected by the inactive-font detecting device.

The system according to the above mode (7) allows the decrease in the load placed on the memory of the image forming apparatus for storage of data for a downloadable font.

(8) The system according to mode (7), further comprising a status detector detecting a status in utilization of the memory, and wherein the deletion-command output device outputs the deletion command to the image forming apparatus, depending upon the status in utilization of the memory detected by the status detector.

The system according to the above mode (8) allows the deletion of the data for the downloadable font from the memory of the image forming apparatus, depending upon the detected status in utilization of the memory, resulting in a more suitable increase in available capacity of the memory (free memory area).

The system according to the above mode (8) may be practiced in a manner that, for example, where the current amount of the available capacity of the memory is larger, the deletion of the previously-stored data is delayed, and where the current amount of the available capacity of the memory is smaller, the deletion of the previously-stored data is expedited.

(9) The system according to mode (8), wherein the status detector detects an available capacity of the memory at a print of a predetermined one of the plurality of print pages, and wherein the deletion-command output device outputs the deletion command to the image forming apparatus, upon fulfillment of a predetermined condition by the available capacity detected by the status detector, so as to instruct the image forming apparatus to temporarily delete from the memory a portion of the font data stored in the memory, which portion will not be used for printing the predetermined page, and which portion functions as data for the inactive font, irrespective of whether or not the portion will be used for printing at least one of the plurality of print pages which follows the predetermined page.

The system according to the above mode (9) allows the deletion from the memory of the data of a downloadable font that will not be used during the printing of the predetermined print page, at the time that the predetermined print page is printed (e.g., prior to the printing of the predetermined print page), to thereby effectively ensure the available capacity of the memory even where the available capacity of the memory is not large enough.

(10) The system according to any one of modes (7)-(9), wherein the inactive-font detector detects the downloadable font as the inactive font, upon completion of a print of an end page of downloadable-font-used pages of the plurality of print pages arranged in the printing sequence, on which downloadable-font-used pages the downloadable font is used.

The system according to the above mode (10) allows the deletion from the memory of the data of a downloadable font that will not be used after the completion of the printing of the end page of a series of downloadable-font-used pages, to thereby increase the available capacity of the memory.

The system according to the above mode (10) therefore does not create a drawback of inoperability of a downloadable font due to the deletion of the corresponding data, resulting in an appropriate increase in the available capacity of the memory.

(11) The system according to mode (10), wherein the downloadable-font-used pages are formed as a series of pages which are selected from the print pages so as to include a start page and an end page on which the downloadable font is used, and at least one intermediate page between the start and end pages on which the downloadable font is not used, and wherein the inactive-font detector is configured, in the presence of the intermediate page not using the downloadable font, so as not to detect the downloadable font as the inactive font, before completion of a print of the end page, and to detect the downloadable font as the inactive font, after completion of the print of the end page.

The system according to the above mode (11) makes it unnecessary to newly store or delete the data of a downloadable font during a series of printings of a series of respective pages which are selected from the print pages so as to include a start page and an end page on which the downloadable font is used, and at least one intermediate page between the start and end pages on which the downloadable font is not used. This results in a faster data processing in the instant system.

(12) The system according to any one of modes (1)-(11), wherein the print data is categorized into first data relating to the font data, and second data other than the first data, wherein the print management apparatus further comprises a storage in which the first data is stored, prior to the printing operation by the image forming apparatus, in a manner that the first data is not redundant with respect to the font data, and that the first data is formatted into a data file required for the printing operation by the image forming apparatus, and wherein the print-data producing device performs outputting of the second data to the image forming apparatus, and retrieval of the first data from the storage and outputting of the retrieved first data to the image forming apparatus.

The system according to the above mode (12) allows the storing of data relating to a downloadable font into the storage of the print management apparatus, prior to the printing operation by the image forming apparatus, in a manner that the stored data is not redundant with respect to a downloadable font, and that the stored data is formatted into a data file required for the printing operation by the image forming apparatus.

In other words, the system according to the above mode (12) allows the storing and the formatting into file, of the data relating to a downloadable font, prior to the printing employing the data, resulting in a more efficient system configuration.

(13) The system according to any one of modes (1)-(12), wherein the print data is categorized into first data relating to the font data, and second data other than the first data, wherein the print management apparatus further comprises a memory in which the first data is stored, prior to the printing operation by the image forming apparatus, in a manner that the first data is not formatted into a data file required for the printing operation by the image forming apparatus, and wherein the print-data producing device, operable upon request for the first data, retrieves the first data from the memory, formats the retrieved first data into a data file required for the printing operation by the image forming apparatus, and to output the formatted first data to the image forming apparatus.

The system according to the above mode (13) avoids the storing and the formatting into file, of data relating to a downloadable font, prior to the printing employing the data, resulting in a quicker start-up of the printing owing to the reduction in time required for data processing in the print management apparatus.

(14) The system according to any one of modes (1)-(13), wherein the font data comprises character-identification data for specifying a character, and font-kind data specifying a kind of a font required to be used for printing a character.

The system according to the above mode (14) provides a more suitable configuration enabling the utilization of various kinds of characters and various kinds of fonts in the image forming apparatus.

(15) The system according to any one of modes (1)-(14), wherein the print management apparatus comprises a determining device determining whether or not the print data contains data for the downloadable font.

The system according to the above mode (15) allows an appropriate determination as to whether font data should be downloaded to the image forming apparatus, resulting in a more accurate discrimination between an event requiring the downloading of font data and an event not requiring the downloading of font data. This is conducive to a better optimization of the processing in the instant system.

(16) The system according to any one of modes (1)-(15), wherein the print-data producing device outputs to the image forming apparatus the print data and the font data in a manner that the font data is attached to the print data, at an event of outputting the print data to the image forming apparatus.

The system according to the above mode (16) allows the transmission of the print data together with the font data to the image forming apparatus, such that the font data is attached to the print data.

That is to say, the font data is transmitted to the image forming apparatus, not in a manner that the font data is inseparable from the print data, but in a manner that the font data is separable from or independent of the print data. The independency between these two sets of data is conducive to the increase in flexibility in thereafter handling these two sets of data independently.

In this context, typically, the term "print data" means page data described above, for example, while the term "font data" means font headers and character data described above.

(17) A print management apparatus comprising a print-data producing device that produces print data based on original data produced as a result of execution of an application program, and that outputs the produced print data to an image forming apparatus forming an image based on the print data received, the print management apparatus being configured to allow a downloading of font data for forming a downloadable font in use for a printing operation by the image forming apparatus using the print data, from the print management apparatus to the image forming apparatus, the print management apparatus further comprising:

a sequence modifier operable in the printing operation in which the image forming apparatus prints a plurality of successive print pages using the print data, wherein the successive print pages are printed in a printing sequence of pages different from an original sequence of pages in which a plurality of successive original pages represented by the original data are arranged, the sequence modifier modifying into the printing sequence of pages a sequence in which the print management apparatus outputs the print data to the image forming apparatus, within a sequence-modification range selected to at least include a non-correspondence range of the successive print pages over the original sequence of pages and the printing sequence of pages do not coincide in numerical number of pages with each other, respectively, within the successive print pages arranged in the printing sequence; and a redundant-range detector detecting a redundant range over which an identical downloadable font is redundantly used within the selected sequence-modification range, wherein the print-data producing device is configured to output the print data to the image forming apparatus in the printing sequence of pages, without a redundant output of at least one portion of data identical to the font data previously outputted to the image forming apparatus.

The print management apparatus according to the above mode (17) allows the detection of a redundant range over which the identical downloadable font is redundantly used within a plurality of successive print pages arranged in the same sequence as the printing sequence.

The print management apparatus according to the above mode (17) further allows the output of the print data to the image forming apparatus in the same sequence as the printing sequence, without a redundant output of at least one portion of data identical to the font data previously outputted to the image forming apparatus.

The print management apparatus according to the above mode (17) therefore allows the efficient reduction in amount of data required to be outputted to the image forming apparatus for printing using a downloadable font. This is conducive to the improved efficient utilization in the image forming apparatus of font data for a downloadable font downloaded once to the image forming apparatus.

(18) A method of print management effected in a print management apparatus that manages a printing operation performed by an image forming apparatus forming an image based on print data, wherein the print management apparatus is configured to produce the print data based on original data produced as a result of execution of an application program, to output the produced print data to the image a downloadable font in use for the printing operation by the image forming apparatus using the print data, from the print management apparatus to the image forming apparatus, the method comprising:

a sequence-modification step operable in the printing operation in which the image forming apparatus prints a plurality of successive print pages using the print data, wherein the successive print pages are printed in a printing sequence of pages different from an original sequence of pages in which a plurality of successive original pages represented by the original data are arranged, wherein the sequence-modification step is configured to modify into the printing sequence of pages a sequence in which the print management apparatus outputs the print data to the image forming apparatus, within a sequence-modification range selected to at least include a non-correspondence range over which the original sequence of pages and the printing sequence of pages do not coincide in numerical number of pages with each other, respectively, within the successive print pages arranged in the printing sequence;

a redundant-range detection step of detecting a redundant range over which an identical downloadable font is redundantly used of within the selected sequence-modification range; and a print-data output step of outputting the print data to the image forming apparatus in the printing sequence of pages, without a redundant output of at least one portion of data identical to the font data previously outputted to the image forming apparatus.

The method according to the above mode (18) provides substantially the same functions and effects as those of the system according to the above mode (1). The method according to the above mode (18) may be practiced in combination with at least one technical feature set forth in any one of the above mode (2)-(17).

(19) A computer program to be executed by a computer to implement the method according to mode (18).

The execution of this program by a computer provides substantially the same functions and effects as those of the method according to the above mode (18).

The "program" in the present mode (19) may be interpreted to incorporate not only a combination of instructions implemented by a computer to perform the functions of the program, but also files, data, etc. processed depending on each of the instructions.

(20) A computer-readable storage medium having stored therein the computer program according to mode (19).

The execution of the program stored in this storage medium provides substantially the same functions and effects as those of the method according to the above mode (19).

The "storage medium" in the above mode (20) may take any one of existing or later-developed kinds of formats, for example, at least any one of a magnetic recording medium such as a flexible disc; an optical recording medium such as a CD, and a CD-ROM; an magnetic optical recording medium such as an MO; an un-removable storage such as a ROM; etc.

(21) A print management apparatus which includes a print-data producing device that produces print data based on original data, and which allows a downloading of font data from the print management apparatus to an image forming apparatus, the print management apparatus comprising:

a sequence modifier modifying a sequence in which the print management apparatus outputs the print data to the image forming apparatus, from an original sequence in which original pages represented by the original data are arranged, into a printing sequence in which print pages printed by the image forming apparatus are arranged; and a redundant-range detector detecting a redundant range of the print pages arranged in the printing sequence over which an identical downloadable font is redundantly used, wherein the print-data producing device outputs the print data to the image forming apparatus in the printing sequence, without a redundant output of at least one portion of data identical to the font data previously outputted to the image forming apparatus.

The print management apparatus according to the above mode (21) provides substantially the same functions and effects as those of the system according to the above mode (1).

Several presently preferred embodiments of the invention will be described in detail by reference to the drawings in which like numerals are used to indicate like elements throughout.

Referring now to FIG. 1A, a printing system 100 according to a first embodiment of the present invention is schematically illustrated in block diagram. The printing system 100 includes a computer 1 which constitutes as an example of a print management apparatus. As shown in FIG. 1A, the computer 1 includes a CPU 4, a ROM 6, a RAM 8, an HDD (hard disk drive) 10, an interface (denoted by "I/F" in FIG. 1A) 12, etc. The printing system 100 further includes a printer 20 which constitutes as an example of an image forming apparatus. The printer 20 is electrically coupled with the computer 1.

Within the HDD 10, there are stored an application program (hereinafter also referred to simply as "application") 2, a printer driver 3, an operating system (hereinafter also referred to simply as "OS"), which is not shown, etc. The application 2 and the printer driver 3, which have been previously stored on, for example, a CD-ROM (not shown) that functions as an example of a recording medium. The application 2 and the printer driver 3 are installed from the CD-ROM to the HDD 10 as a result of the activation of a given install program by the computer 1.

The application 2 is a program such as word processing software, image formation software, both in use for creating a document, an image, etc. The application 2, upon request for the execution, is loaded to a predetermined area of the RAM 8 and is then executed by the CPU 4. The execution of the application 2 allows an operator, who is the user of the printing system 100, to create a document (text), an image like graphics, etc., by the use of the word processing software, etc. The printer driver 3 will be described below in greater detail.

As shown in FIG. 1A, the interface 12, which is interposed between the printer driver 3 and the printer 20, controls the transmission of output data from the printer driver 3 to the printer 20.

The printer 20 includes an interface 22 that functions as a device capable of receiving print data outputted from the computer 1. The printer 20 further includes a printing device 26 for printing an image based on the print data received. The printer 20 still further includes: an operation device 23 enabling the user to input various kinds of commands to the printer 20; a computer 27 which includes a ROM 24, a CPU 25, a RAM 27, etc.; a display device 28 for various kinds of displays; etc.

The printer 20 is configured to allow a downloading of font data for forming a downloadable or downloaded font from the computer 1 to the printer 20, so that the printer 20 forms the downloadable font when used in print data sent from the computer 1.

Figure 1B:
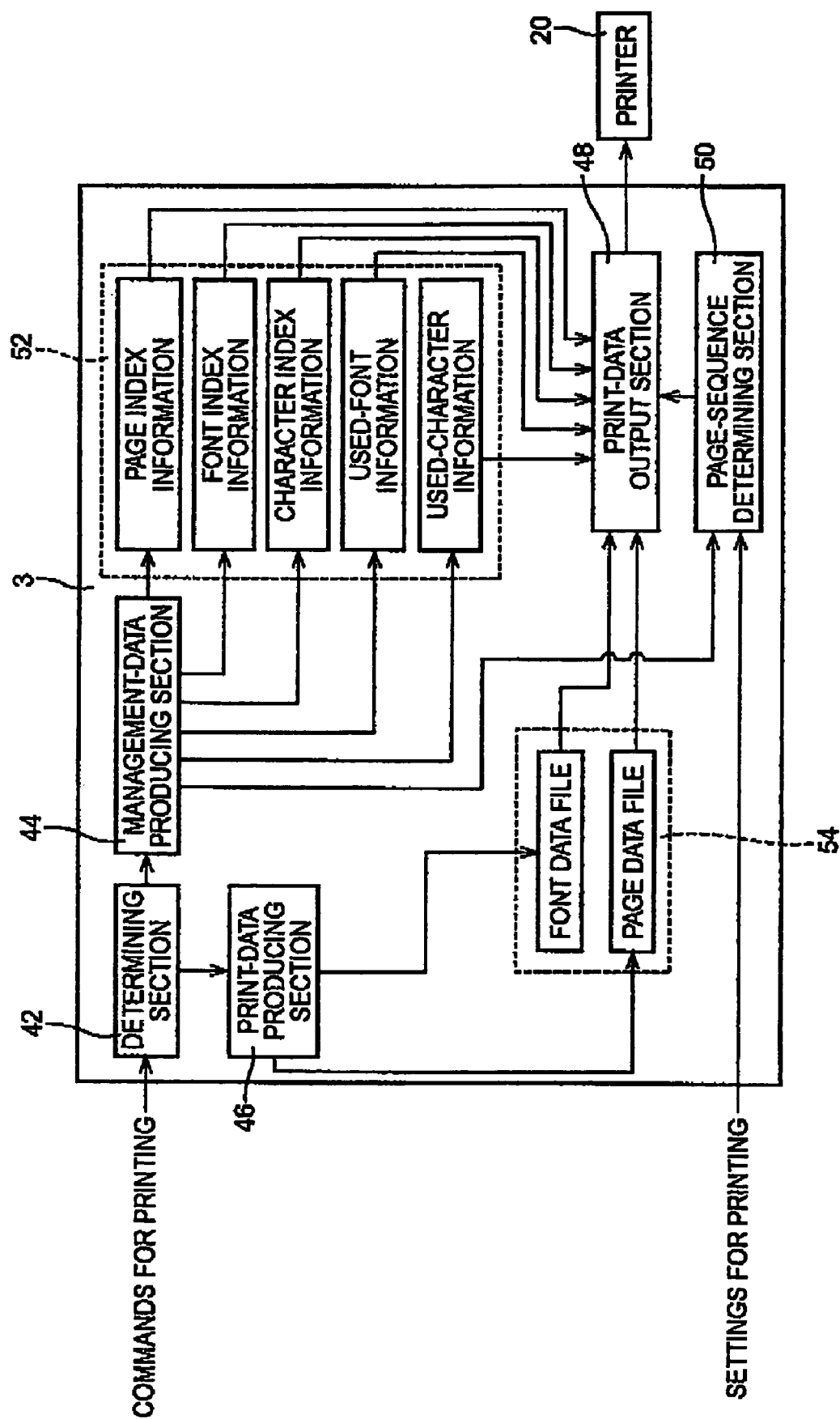
FIG. 1B is a block diagram for explaining the various functions of a printer driver shown in FIG. 1A.

FIG. 1B schematically illustrates in block diagram the printer driver 3 with regard to a plurality of functions provided thereby.

The printer driver 3, which is a program executed for printing by the computer 1, is prepared within the computer 1 in conformity in type with the printer 20. The printer driver 3, upon request for the execution, is loaded from the HDD 10 to a predetermined area of the RAM 8 and is then executed by the CPU 4, as shown in FIG. 1A.

As shown in FIG. 1B, the printer driver 3 includes a determining section 42 for making various kinds of determinations based on commands relating to a printing operation delivered from the OS, and a print-data producing section 46 for producing print data 54 based on original data generated as a result of the execution of the application 2. The printer driver 3 further includes a print-data output section 48 for outputting the print data 54 to the printer 20.

The print data 54 contains a font data file and a page data file. The definitions thereof will be described below in the description order.

(1) Font Data File

The font data file is formed as a file storing a font header and character data, both of which are for a downloadable font required for printing a document. The font header and the character data will be collectively referred to as "font data" hereinafter. The font data file is defined to have a logical structure shown in FIG. 15, for example. The example of the font data file illustrated in FIG. 15 corresponds to an example of a document having three pages shown in FIG. 11.

The "font header," which is data for specifying the feature of a character required to be printed, contains various sets of information for typeface, i.e., kinds of fonts such as Gothic font, Ming-cho font, etc.; weight, e.g., roman, bold, etc.; type size; etc. That is, the "font header" is an example of font-kind data for specifying the kind of a font requested to be used in printing characters.

The "character data," which is character-identification data for specifying or identifying a character (text) requested to be printed, is for specifying the shape of a character such as "あ," "い," "う," "A," "B," etc.

(2) Page Data File

The page data file is meant to be a file in which page descriptions using a page description language (PDL) to be transmitted to the printer 20 are recorded on a per page basis. The data which is stored within the page data file on a per page basis will be referred to as "page data" hereinafter. The page data file is defined to have a logical structure shown in FIG. 13, for example. The example of the page data file illustrated in FIG. 13 corresponds to the example of the three-page document shown in FIG. 11.

Figure 12:
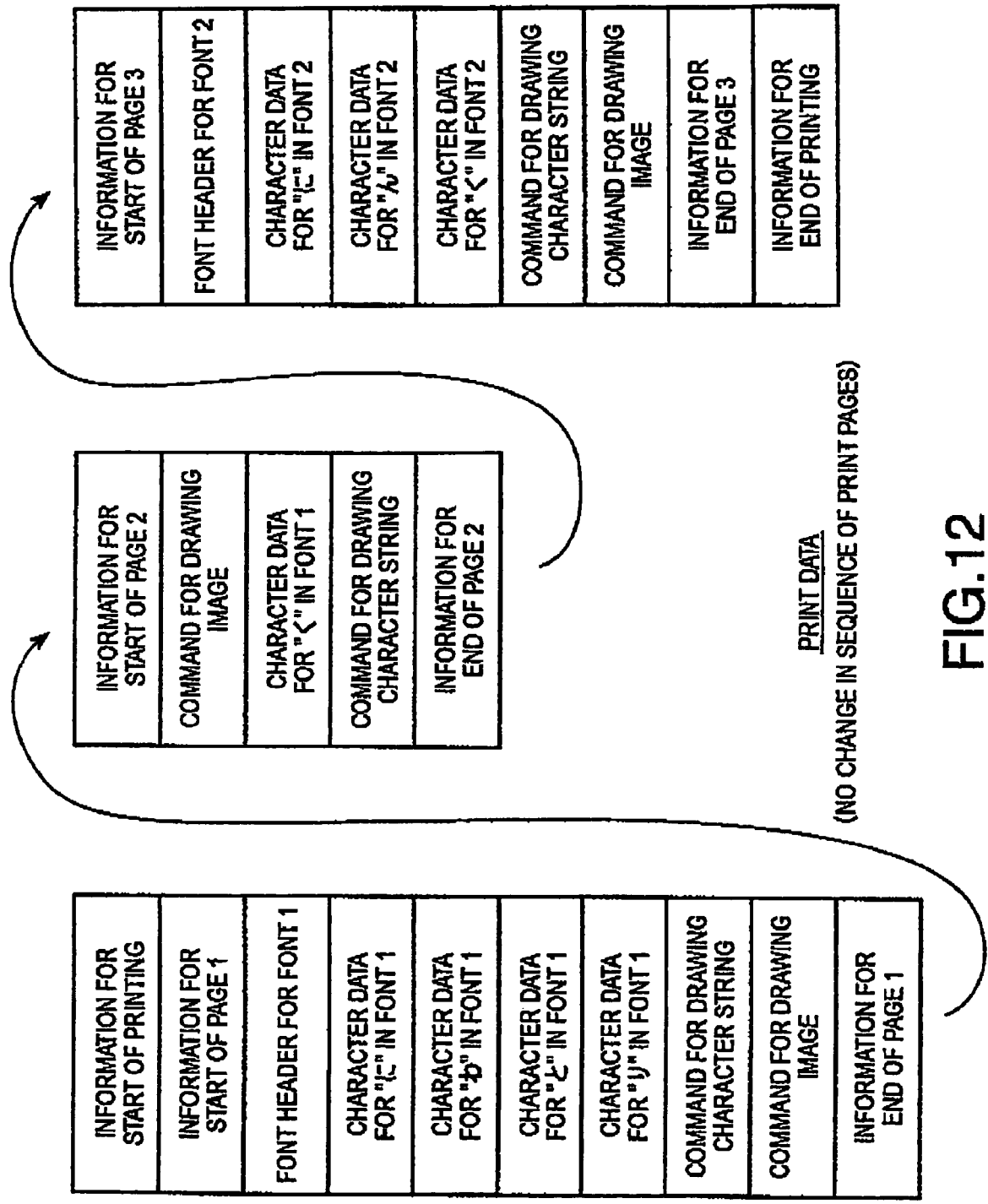
FIG. 12 illustrates a series of subsets of print data required for printing the document shown in FIG. 11 in a normal mode.
Figure 13:
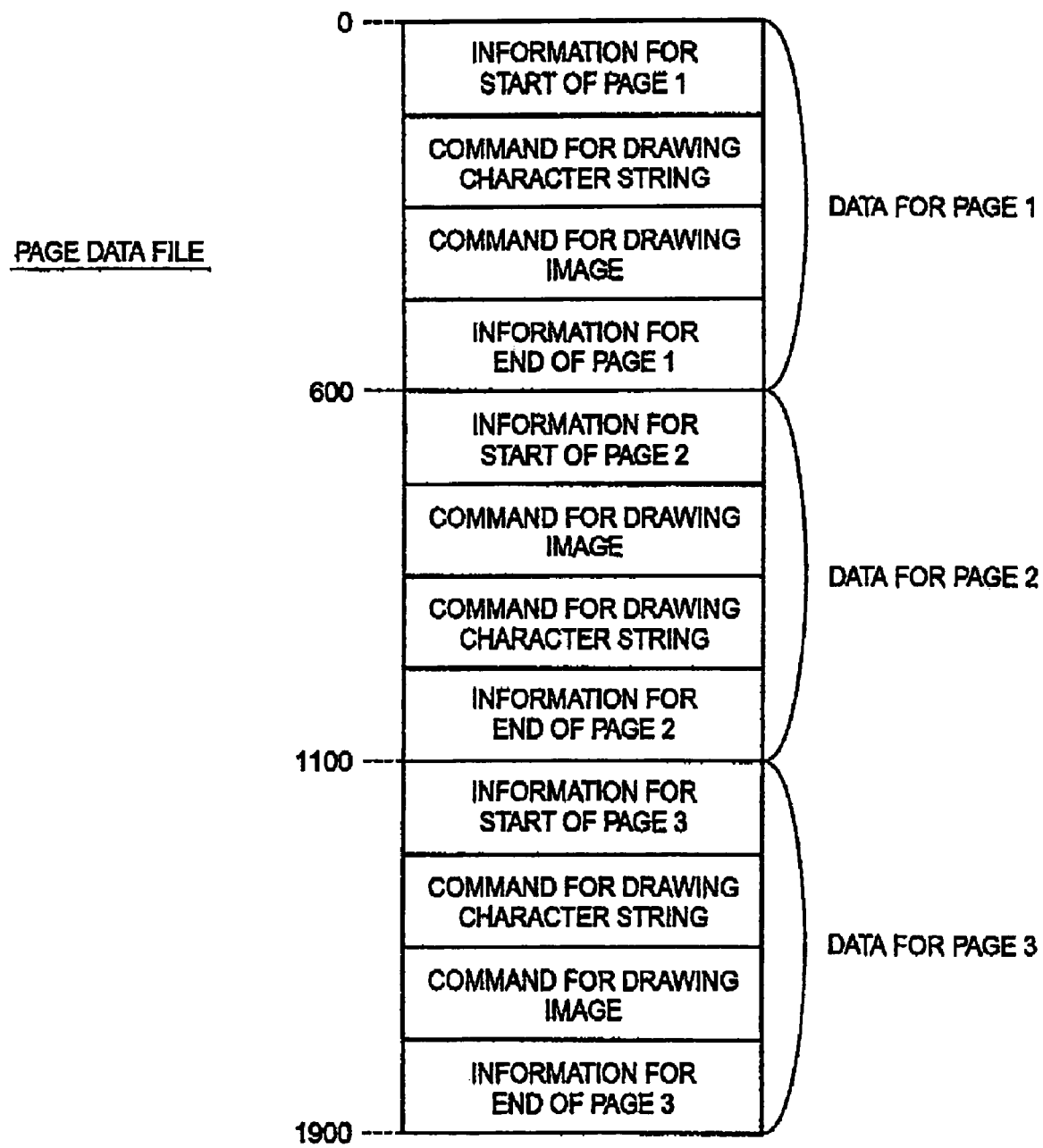
FIG. 13 illustrates the logical structure of a page data file shown in FIG. 1B.

The example structure of the page data file illustrated in FIG. 13 is obtained by removing from print data in use for a normal or standard printing as exemplarily illustrated in FIG. 12, a command for font downloading (indicated as "font header for font 1" in FIG. 12, for example), a command for character-data downloading (indicated as "character data for "に" in font 1," for example), information for start of printing, and information for end of printing.

As shown in FIG. 1B, the printer driver 3 further includes a page-sequence determining section 50 for determining the page sequence in which the successive pages of a document are arranged. The page-sequence determining section 50 is operable where successive print pages are required to be printed by the printer 20 based on the print data received from the computer 1 in a printing sequence of pages different from an original sequence of pages in which there are arranged successive original pages represented by the original data created as a result of the execution of the application 2.

In operation, the page-sequence determining section 50 modifies into the printing sequence of pages a sequence in which the computer 1 will output the print data to the printer 20. The modification is made within such a sequence-modification range of pages that is selected to at least include a non-correspondence range of the successive print pages, over which non-correspondence range the original sequence of pages and the printing sequence of pages do not coincide in numerical number of pages with each other, respectively.

As shown in FIG. 1B, the printer driver 3 further includes a management-data producing section 44 which produces management data 52 capable of specifying the position of data using a downloadable font on each page.

As shown in FIG. 1B, the management data 52 contains page index information, font index information, character index information, used-font information, and used-character information. The definitions thereof will be described below in the description order.

(1) Page Index Information

The page index information is meant to be information for the management of the aforementioned page data file. Specifically, the page index information is information in use for specifying, on a per print-page basis, the start position and the length of an area in which data for each page is stored in the page data file. The page index information is defined to have a logical structure shown in FIG. 14, for example. The example of the page index information illustrated in FIG. 14 corresponds to the example of the page data file shown in FIG. 13.

(2) Font Index Information

The font index information is meant to be information for the management of the aforementioned font data file. Specifically, the font index information is organized to form a file storing a font name, and the start position and the length of a corresponding font header stored in the font data file. The font index information is defined to have a logical structure shown in FIG. 16, for example. The example of the font index information illustrated in FIG. 16 corresponds to the example of the font data file shown in FIG. 15.

(3) Character Index Information

The character index information is a record of, on a per character basis, a font number, a character code, and the start position and the length of an area in which the corresponding aforementioned character data is stored in the font data file. The character index information is defined to have a logical structure shown in FIG. 18, for example. The example of the character index information illustrated in FIG. 18 corresponds to the example of the font data file shown in FIG. 15.

(4) Used-Font Information

The used-font information is organized for specifying the kinds of downloadable fonts to be used in print data (specifically, the number of the kinds of the total downloadable fonts required to be used, and the sequential numbers of downloadable fonts required to be used, both for each page), on a per print-page basis. The used-font information is defined to have a logical structure shown in FIG. 17, for example. The example of the used-font information illustrated in FIG. 17 corresponds to the example of the three-page document shown in FIG. 11.

(5) Used-Character Information

The used-character information is organized for specifying, on a per print-page basis, the number of total characters, and the sequential numbers of characters required to be used in downloadable font (see FIG. 18). The used-character information is defined to have a logical structure shown in FIG. 19, for example. The example of the used-character information illustrated in FIG. 19 corresponds to the example of the three-page document shown in FIG. 11.

As shown in FIG. 1B, the print-data output section 48 has the function of detecting, based on the position of data for a character using a downloadable font (e.g., the position of a character using a downloadable font on a print page) specified by the management data 52, a redundant range over which redundant range an identical downloadable font is redundantly used within successive print pages arranged in a printing sequence of pages.

The print-data output section 48 is so constructed as to output to the printer 20 in the printing sequence of pages, the print data 54 generated by the print-data producing section 46. The print-data output section 48 is further constructed so as to, at the transmission of the generated print data 54 to the printer 20, output the page data of the generated print data 54 to the printer 20 along with the separably accompanying font data (the font header and the character data, for example) required.

The print-data output section 48 is further constructed so as to avoid, in the presence of a redundant range over which redundant range an identical downloadable font is redundantly used within successive print pages arranged in a printing sequence of pages, a redundant output of at least one portion of data identical to the font data (the font header and the character data, for example) previously outputted to the printer 20.

With reference to FIGS. 2-10, the flow of the specified processing to be implemented by the printer driver 3 will be described below in more detail.

Figure 2:
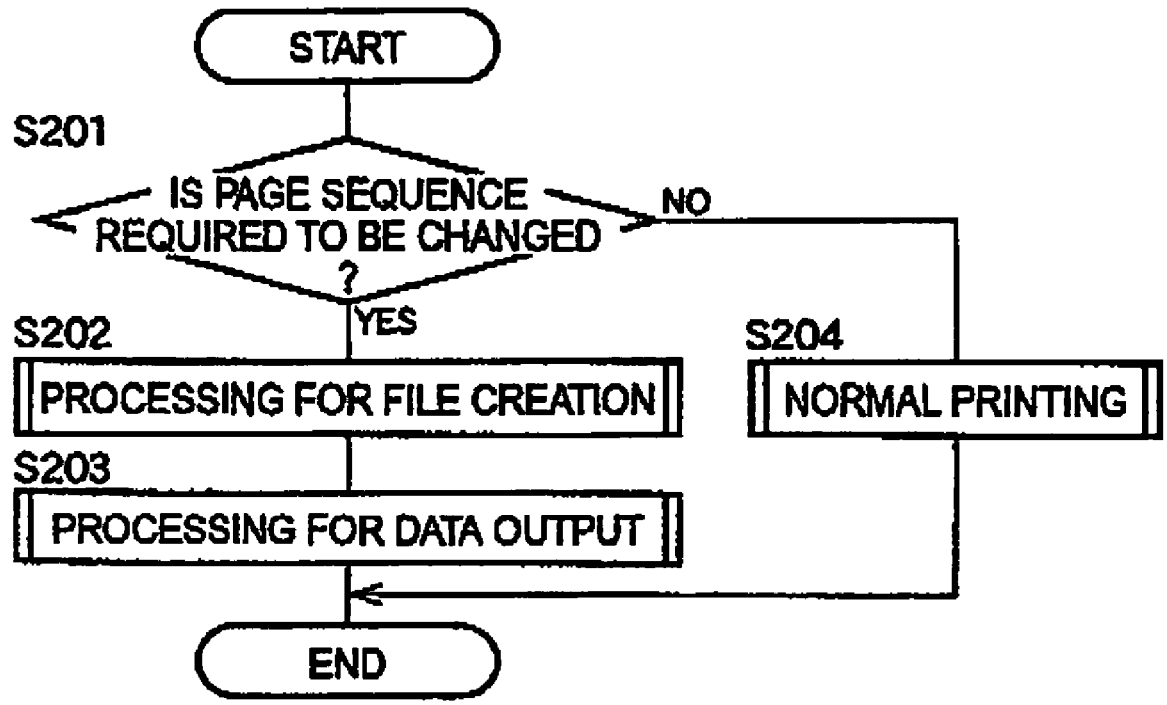
FIG. 2 is a flow chart illustrating schematically a main program to be executed by a computer 1 shown in FIG. 1A.
Figure 3:
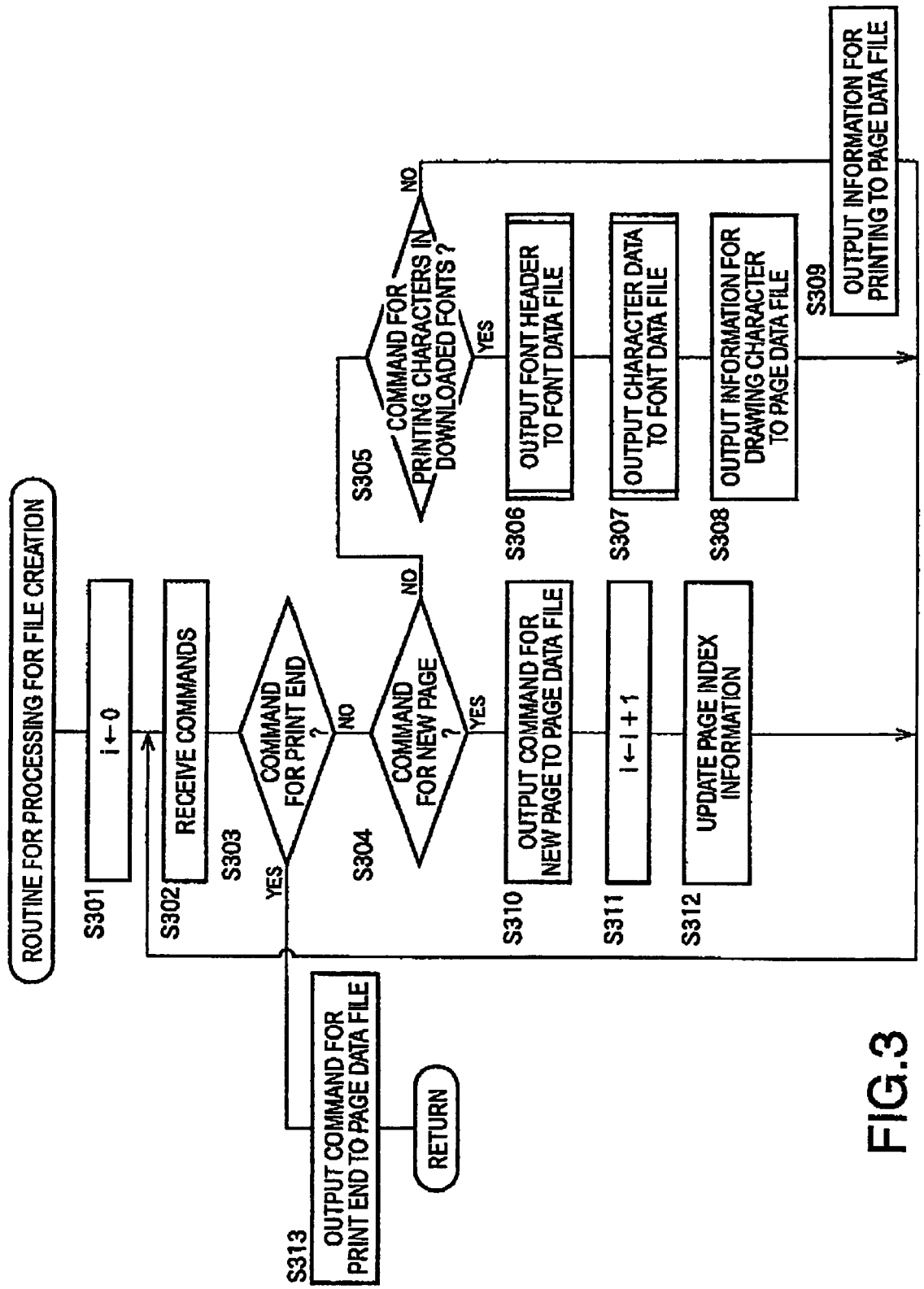
FIG. 3 is a flow chart illustrating schematically an example of a routine for processing for file creation to be executed by the computer 1 shown in FIG. 1A.
Figure 4:
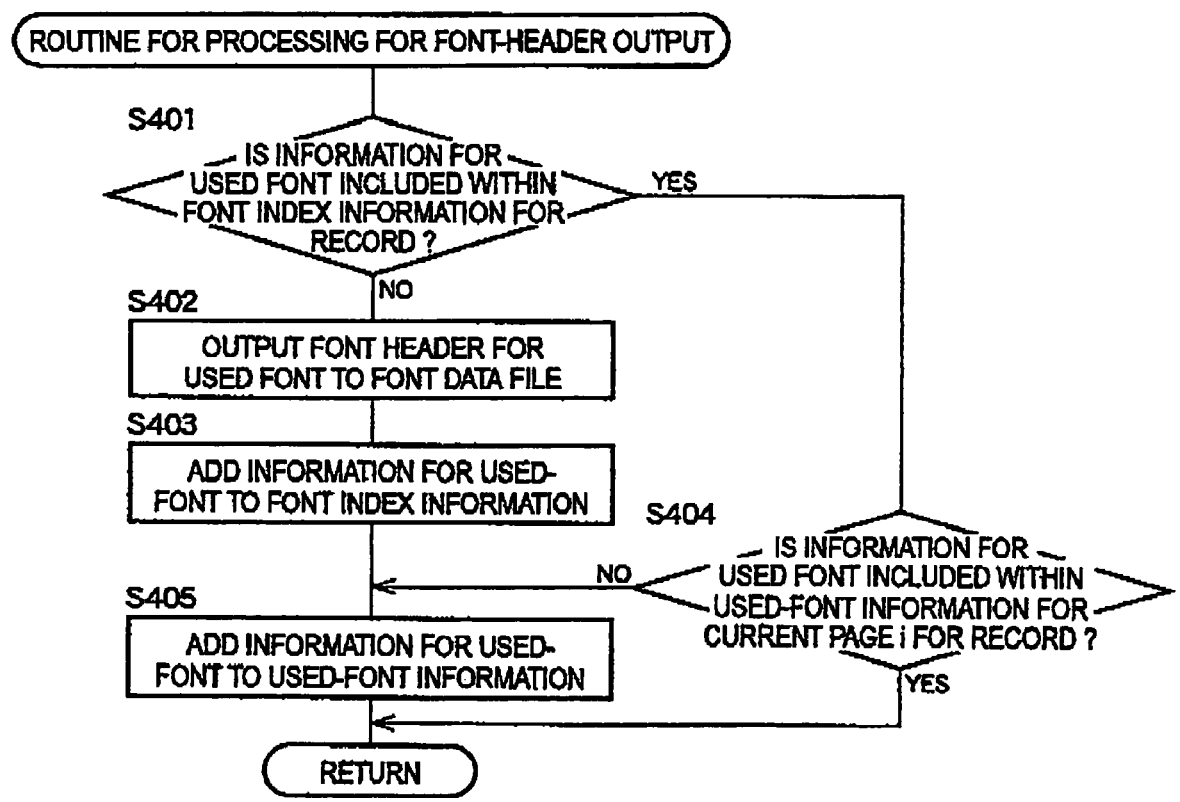
FIG. 4 is a flow chart illustrating schematically an example of a routine for processing for font-header output to be executed by the computer 1 shown in FIG. 1A.
Figure 5:
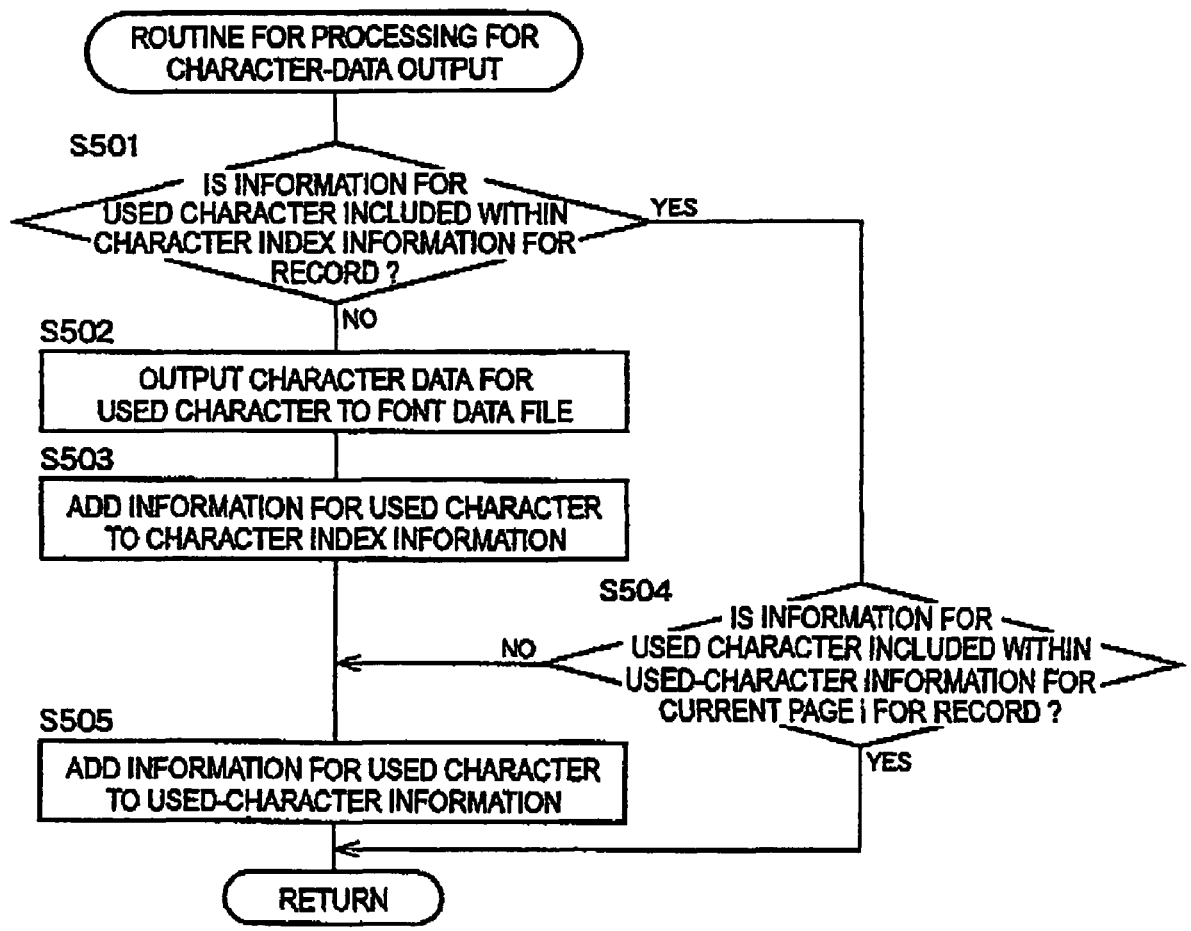
FIG. 5 is a flow chart illustrating schematically an example of a routine for processing for character-data output to be executed by the computer 1 shown in FIG. 1A.

In FIG. 2, a main program to be executed by the computer 1 for processing the creation and the output of the print data 54 is schematically illustrated in flow chart. In FIG. 3, the details of a step S202 indicated in FIG. 2 are schematically illustrated in flow chart as a routine for processing for file creation. In FIG. 4, the details of a step S306 indicated in FIG. 3 are schematically illustrated in flow chart as a routine for processing for font-header output. In FIG. 5, the details of a step S307 indicated in FIG. 3 are schematically illustrated in flow chart as a routine for processing for character-data output.

Figure 6:
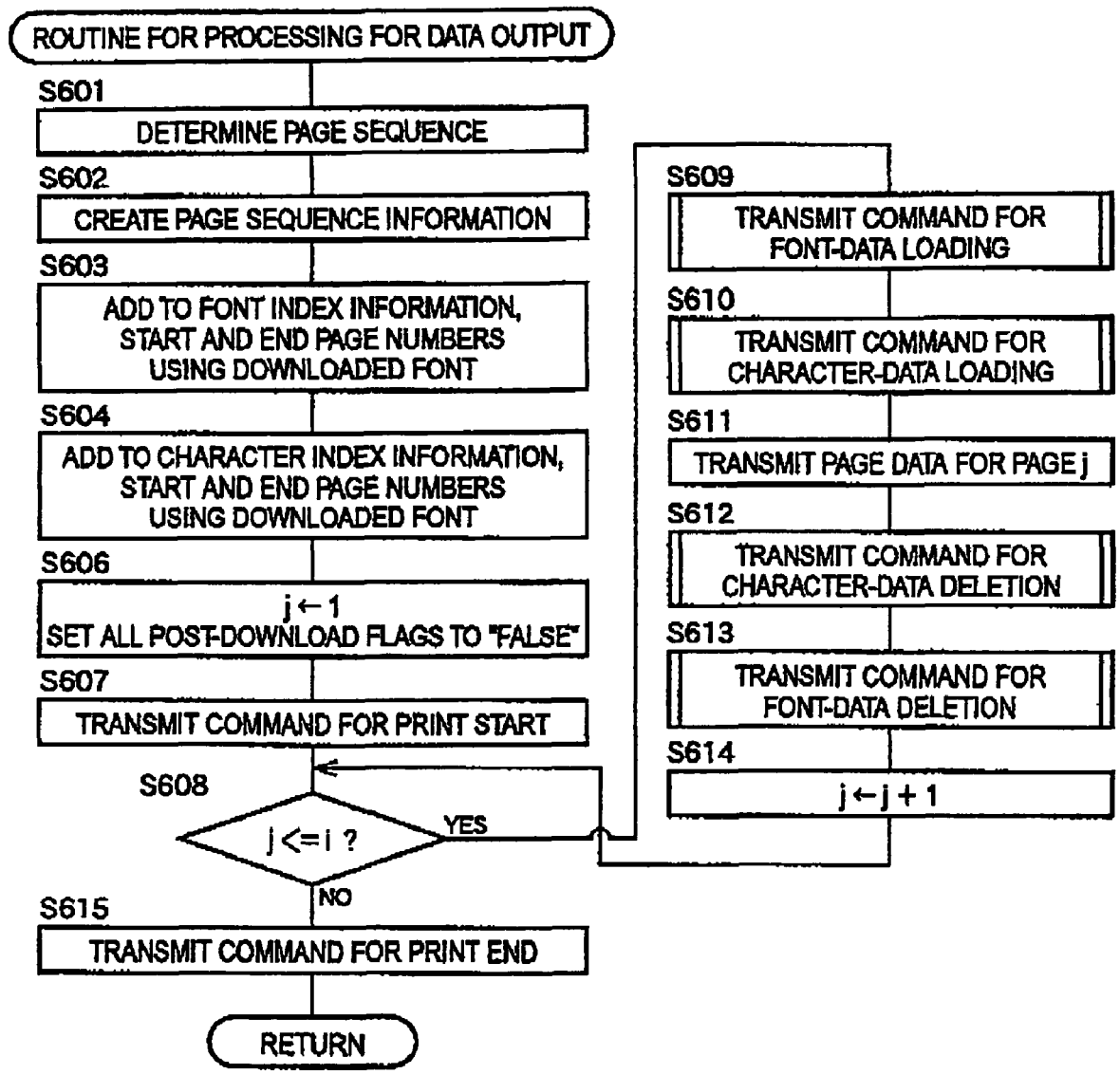
FIG. 6 is a flow chart illustrating schematically an example of a routine for processing for data output to be executed by the computer 1 shown in FIG. 1A.
Figure 7:
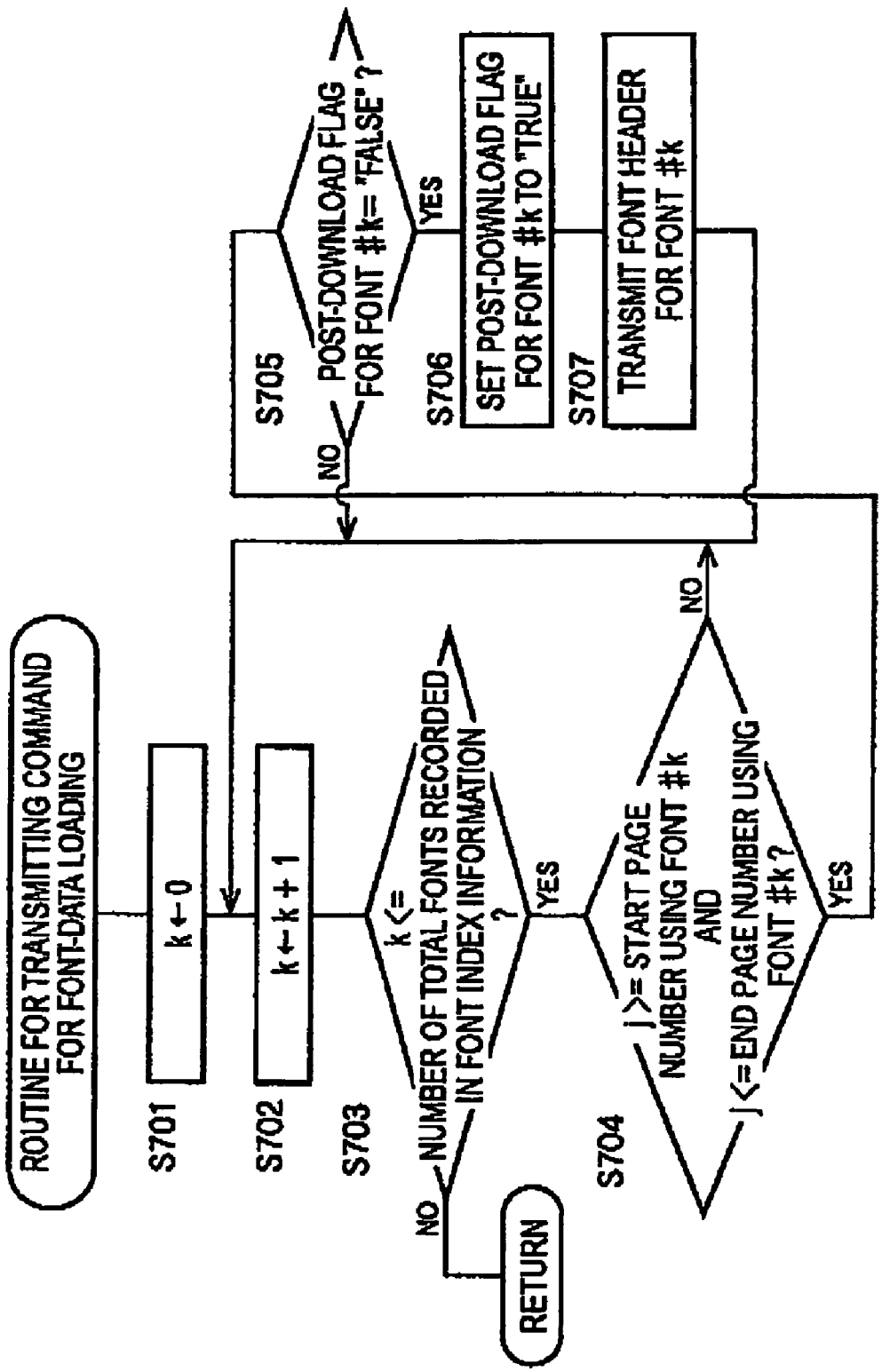
FIG. 7 is a flow chart illustrating schematically an example of a routine for transmitting command for font-data loading to be executed by the computer 1 shown in FIG. 1A.
Figure 8:
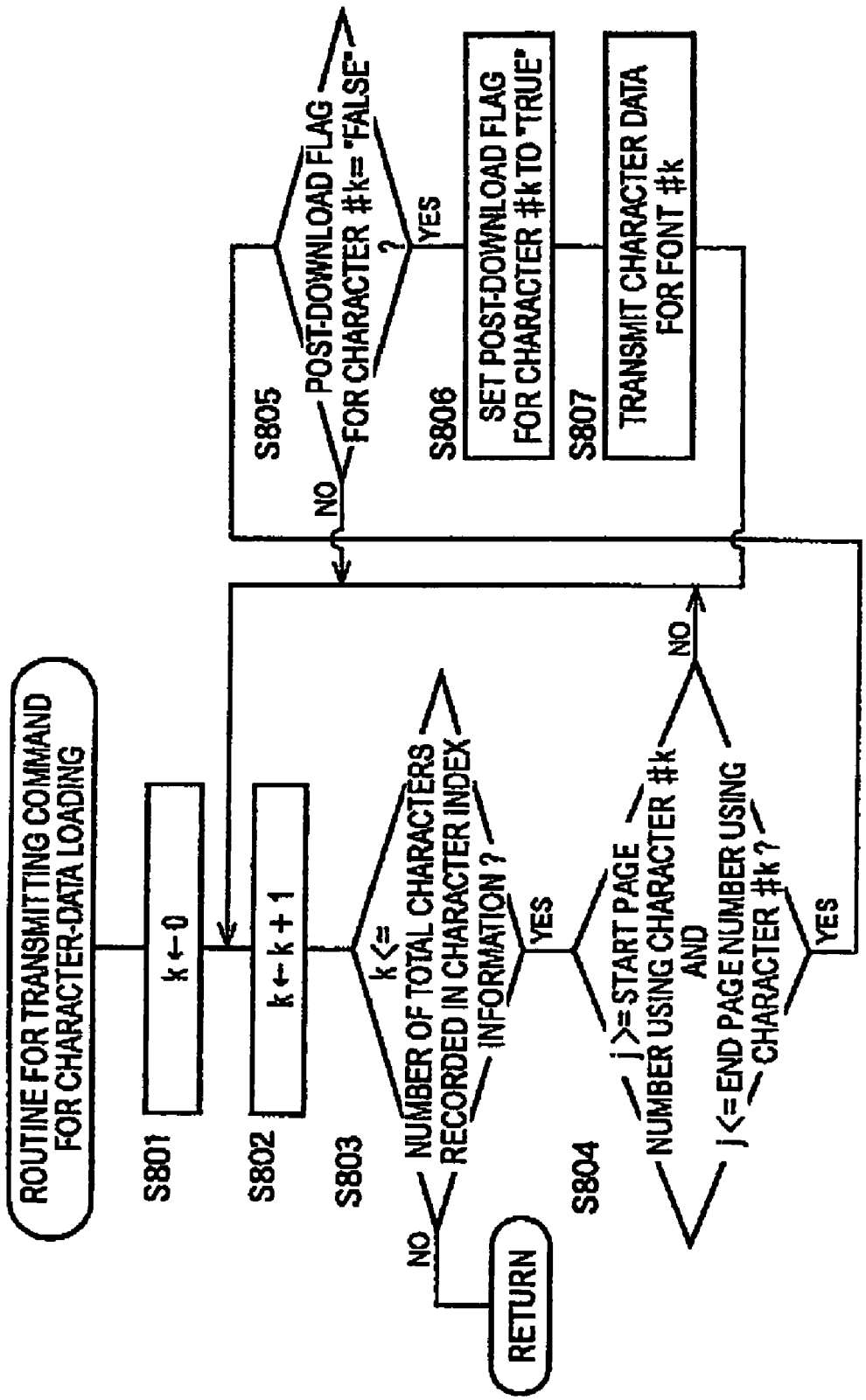
FIG. 8 is a flow chart illustrating schematically an example of a routine for transmitting command for character-data loading to be executed by the computer 1 shown in FIG. 1A.
Figure 9:
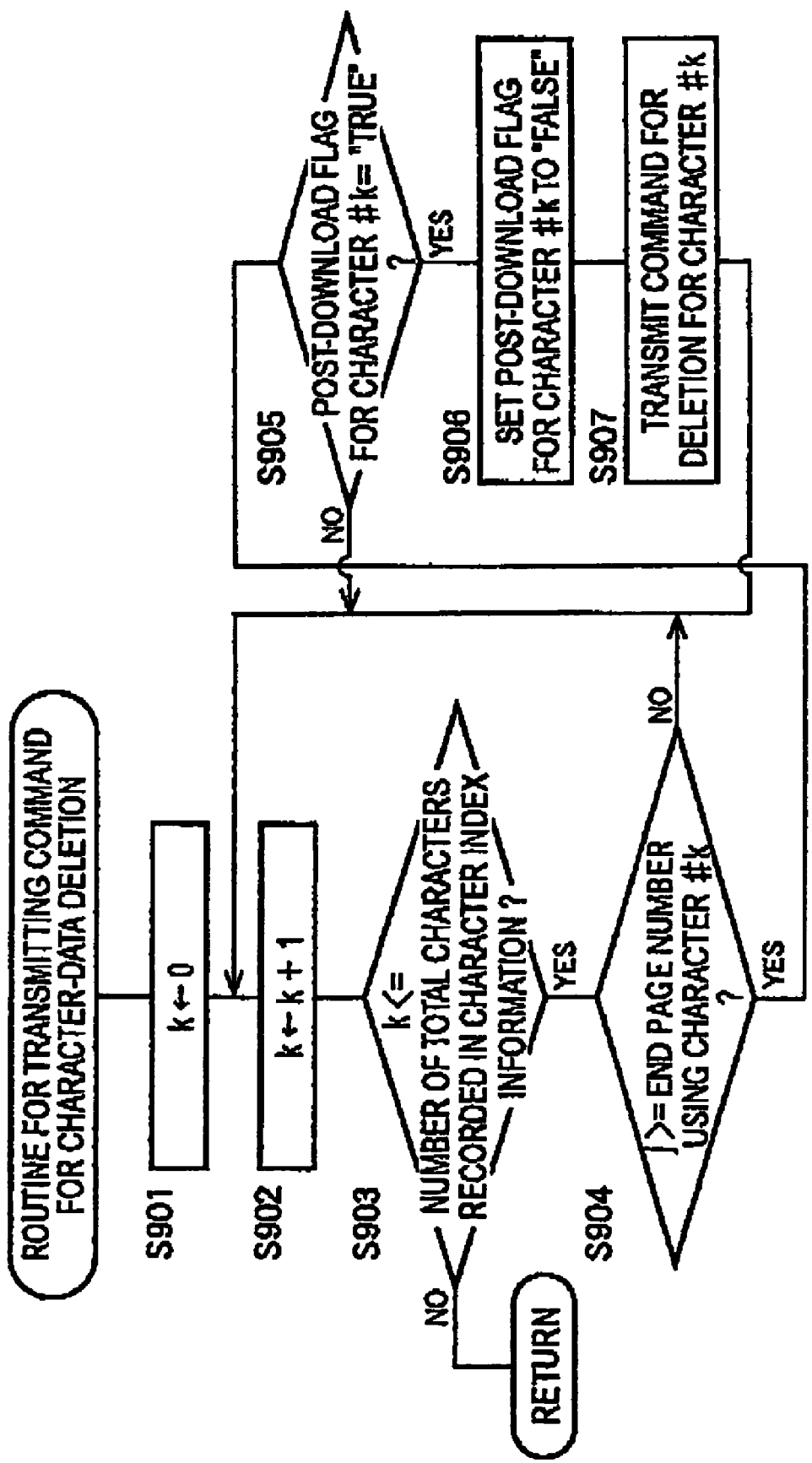
FIG. 9 is a flow chart illustrating schematically an example of a routine for transmitting command for character-data deletion to be executed by the computer 1 shown in FIG. 1A.
Figure 10:
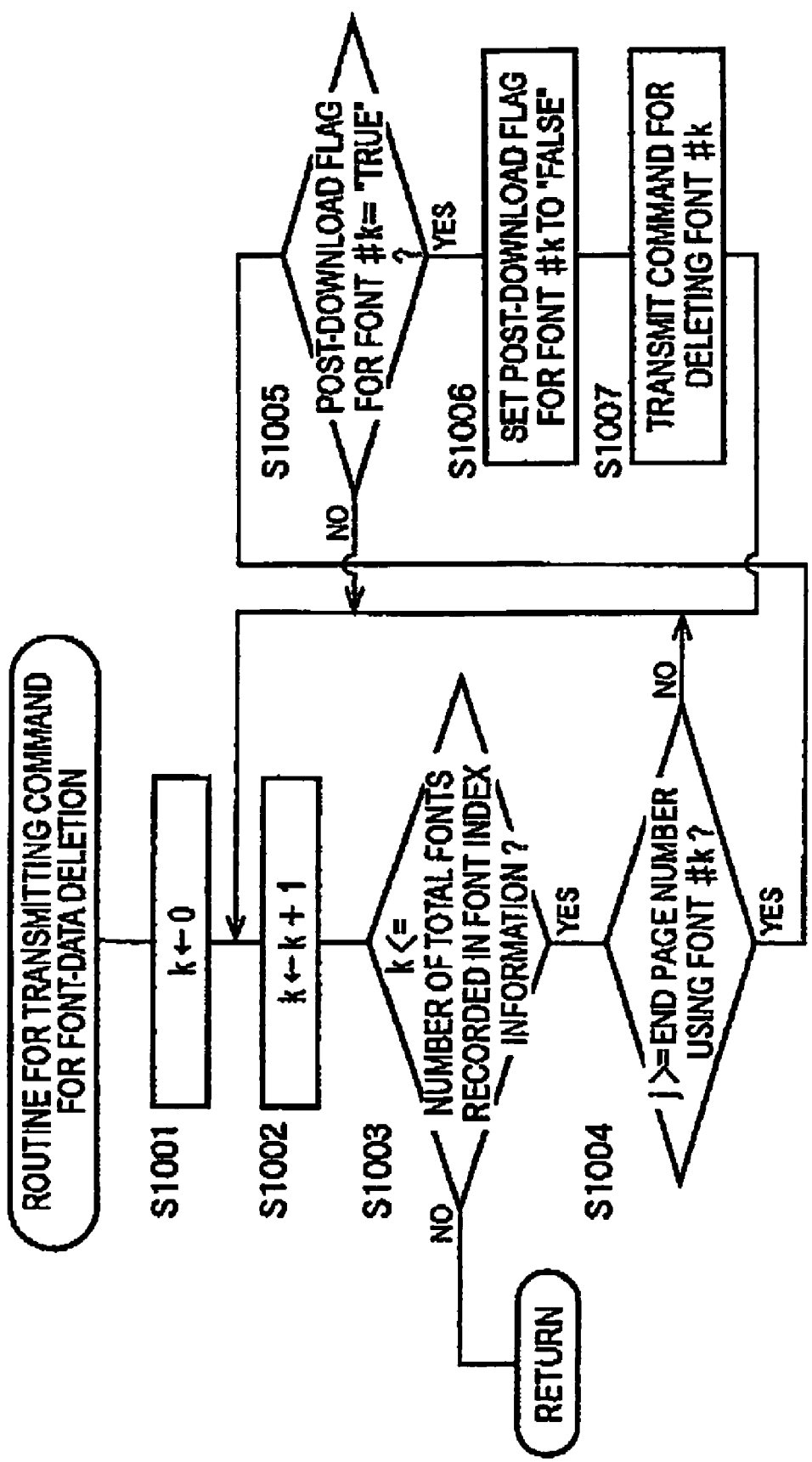
FIG. 10 is a flow chart illustrating schematically an example of a routine for transmitting command for font-data deletion to be executed by the computer 1 shown in FIG. 1A.

In FIG. 6, the details of a step S203 indicated in FIG. 2 are schematically illustrated in flow chart as a routine for processing for data output. In FIG. 7, the details of a step S609 indicated in FIG. 6 are schematically illustrated in flow chart as a routine for transmitting command for font-data loading. In FIG. 8, the details of a step S610 indicated in FIG. 6 are schematically illustrated in flow chart as a routine for transmitting command for character-data loading. In FIG. 9, the details of a step S612 indicated in FIG. 6 are schematically illustrated in flow chart as a routine for transmitting command for character-data deletion. In FIG. 10, the details of a step S613 indicated in FIG. 6 are schematically illustrated in flow chart as a routine for transmitting command for font-data deletion.

First, with reference to the flow chart shown in FIG. 2, the processing for the creation and the output of the print data 54 is described below.

The main program shown in FIG. 2, upon activation, begins with a step S201 to determine, based on the contents of the settings for printing commanded by the user, whether or not an original sequence of pages is required to be changed for determining a printing sequence of pages. The change to the original sequence of pages is required where particular print modes including a manual feed and duplex print mode, a booklet print mode, etc. are commanded by the user.

If there is no need to change the original sequence of pages, the determination of the step S201 becomes negative "NO," and the computer 1 proceeds to a step S204 for a normal or standard printing. As a result, data is outputted to the printer 20 in the same sequence as the original sequence of pages, and an actual printing is performed based on the outputted data.

In this case, the original sequence of pages in which there are arranged successive original pages represented by the original data created as a result of the execution of the application 2 is the same as the actual printing sequence of pages. Therefore, the normal printing is performed without implementation of a processing for specifying the position of data for a downloadable font, which will be described below. In this context, the "original data" is structured or organized such that a plurality of page data indicative of successive pages are arranged in the same sequence as the original sequence of pages.

In FIG. 11, the example of the three-page document is illustrated. The document contains for every page a character string and an image, both as information. The fonts of the character strings on the first and second pages are each the Gothic type font, while the font of the character string on the third page is the Ming-cho type font (for representing oriental characters). For a normal printing of this document, data such as illustrated in FIG. 12 is transmitted to the printer 20.

In this example, once the font data is transmitted to the printer 20 along with the page data for the current print page, a re-transmission of the identical font data to the printer 20 is avoided, except for the transmission of the page data for the subsequent print page. Specifically, in this example, the character strings are identical in font between the first and the second pages.

Accordingly, a sequence of print data is defined to allow the transmission of the page data for the first page to the printer 20 along with the font data required for the first page, and the transmission of the page data for the second page without an accompanying identical portion of the previously transmitted font data (i.e., the font header for font 1, the character data for "に," "と," and "り".

In printing the example of the original document shown in FIG. 11, there exists a case where a manual feed and duplex print mode, upon requested, requires the original sequence of pages to be modified for defining the printing sequence of pages. In this case, the printing is performed, for example, in the following printing sequence:

The second page of the original document is printed on a fed first two-sided sheet;

The first two-sided sheet, upon being printed by and exiting from the printer 20, is inverted and fed into the printer 20 again, together with a second two-sided sheet in a face-to-face opposing relation with the first two-sided sheet;

The first page of the original document is printed on the fed second two-sided sheet; and The third page of the original document is printed on the fed first two-sided sheet.

The printing sequence is varied depending on a manner of feeding a fresh print sheet, or whether the printing is to be performed on only one side or both sides of a print sheet (i.e., simplex sheet or duplex sheet).

In the above case, however, a mere rearrangement or modification of the sequence of the successive subsets of page data for the respective pages of the original document into the printing sequence described above fails to achieve an expected printing. Upon transmission of a subset of page data for the second page of the original document as shown in FIG. 12 to the printer 20 prior to the transmission of a subset of page data for the first page of the original document, the printer 20, at that time, does not yet receive the font data for the downloadable font required for printing the second page of the original document. The printer 20 therefore fails to draw characters using the downloadable font required, due to lack of the font data required.

More specifically, for a normal or standard printing, a plurality of individual subsets of page data are organized, such that a subset of page data for the second page of the original document has no direct link with the font data which is to be transmitted to the printer 20 together with a subset of page data for the first page of the original document. The thus-organized subsets of page data are sequentially transmitted to the printer 20.

On the other hand, for a special printing such as a manual feed and duplex printing described above, if the plurality of subsets of page data organized in the same manner as described above are simply rearranged or modified in order, and if the subset of page data for the second page of the original document is transmitted to the printer 20 prior to transmission of the subset of page data for the first page of the original document, the printer 20 has to print the second page of the original document, without using the font data required for printing the second page of the original document. Accordingly, the printer 20 fails to perform an expected printing for the second page of the original document.

In the present embodiment, to avoid such disadvantages, a processing for file creation is implemented in the step S202 as shown in FIG. 2 to form the page data and the font data into the respective files, to thereby enable an appropriate printing using a downloadable font despite that the printing sequence of pages is varied from the original sequence of pages.

Upon implementation of the step S202, a processing for data output is performed in the step S203 to output print data to the printer 20 in a sequence modified from the original sequence of pages. The above processing is for creating the aforementioned page data file and font data file. The step S202 is followed by the step S203 to perform, upon modification to the sequence of pages, a processing for data output which allows print data to enter the printer 20 in the modified sequence of pages.

Then, the step S202 will be firstly described in greater detail with reference to FIGS. 3-5, and the step S203 will be subsequently described in greater detail with reference to FIGS. 6-10.

As described above, in FIG. 3, the details of the step S202 are schematically illustrated in flow chart as a routine for processing for file creation.

The routine for processing for file creation begins with a step S301 for a suitable data initialization. Specifically, a page counter "i," which indicates the page number (sequential number) of a page currently focused (current page), is set to "0." The step S301 is followed by a step S302 to receive from the aforementioned OS, commands relating to printing of the page having the page number indicated by the current value of the page counter "i." The currently-focused page will be referred to as "current page 'i'" hereinafter. If the current page "i" represents "0," it is indicated that the current page is the first page of the print sheets.

The aforementioned commands to be received from the OS include:

a command for print start to direct the printer 20 to start a printing (information for print start);

a command for print end to direct the printer 20 to end a printing (information for print end);

a command for a new page to direct the printer 20 to start a new page (information for page end or page break);

a command for downloadable-font-character printing to direct the printer 20 to print characters in downloadable font;

a command for character-string drawing to specify in what color and where a character is to be printed;

a command for image drawing to direct the printer 20 to print an image; and other command(s).

The computer 1, once receiving a plurality of commands from the aforementioned OS for each page, executes the routine for processing for file creation in sequence respectively for the commands for each page.

The step S302 is followed by a step S303 to determine whether or not a command received in the step 302 (hereinafter, referred to as "current command") is the command for print end. If the current command is the command for print end, the determination of the step S303 becomes affirmative "YES," and the computer 1 proceeds to a step S313 in which the command for print end is outputted to and recorded in the page data file for creation of the page data file. Thus, one cycle of the execution of the routine for processing for file creation is terminated. The command for print end corresponds to the "information for end of page 3" in the example of the page data file illustrated in FIG. 13.

On the other hand, if the current command is not the command for print end, then the determination of the step S303 becomes negative "NO," and the computer 1 proceeds to a step S304 to determine whether or not the current command is the command for a new page. If the current command is the command for a new page, then the determination of the step S304 becomes affirmative "YES." Thereafter, the computer 1 proceeds to a step S310 in which the command for a new page is outputted to and recorded in the page data file for creation of the page data file. The command for a new page corresponds to the "information for end of page 1" and "information for end of page 2," respectively, in the example of the page data file illustrated in FIG. 13.

The step S310 is followed by a step S311 to increment the current value of the page counter "i" by "1." The computer 1 then proceeds to a step S312 in which the aforementioned page index information (see FIG. 14) is so updated as to reflect the incremented value of the current page "i" for creation of the page index information. Upon implementation of the step S312, the computer 1 returns to the step S302.

On the other hand, if the current command is not the command for a new page, the determination of the step S304 becomes negative "NO," and the computer 1 proceeds to a step S305.

The step S305 is implemented where a determination is made as to whether or not the current command is the command for downloadable-font-character printing. In the step S305, for the determination, it is determined based on the analysis of the current command whether or not the command for downloadable-font-character printing has been received from the aforementioned OS.

A manner of printing a character includes a printing using a downloadable font and a printing using a resident font (also referred to as "inner font," "device font," or "printer font"). The printing of a character using a downloadable font requires a delivery of information relating to the downloadable font to the printer 20, unlike a conventional manner of printing a character. In contrast, the printing of a character using a resident font does not require extra information other than information relating to the font resident in the printer 20.

If the current command is the command for downloadable-font-character printing, the determination of the step S305 becomes affirmative "YES." Thereafter, the computer 1 proceeds to the step S306 in which the font header for the downloadable font required is outputted to and recorded in the aforementioned font data file (see FIG. 15), although the details of which will be described later with reference to FIG. 4.

The step S306 is followed by the step S307 in which the character data for the character required to be printed in the downloadable font required is outputted to and recorded in the font data file, although the details of which will be described later, with reference to FIG. 5.

The implementation of the steps S306 and S307 allows for the creation of the font data file. The step S307 is followed by a step S308 in which information for drawing characters is outputted to and recorded in the page data file. The information for drawing characters corresponds to the "command for drawing character string" in the example of the page data file illustrated in FIG. 13.

In the steps S306 and S307, there is also generated information for specifying which one of a plurality of print pages contains a character to be printed in downloadable font. That is, the information allows a print page containing a character to be printed in downloadable font, to be identified.

Specifically, in the present embodiment, the computer 1 is configured to allow an outputting of a plurality kinds of downloadable fonts to the printer 20. In the steps S306 and S307, the aforementioned used-font information (see FIG. 17) and used-character information (see FIG. 19) are generated for specifying the kinds of downloadable fonts used on each page in the print data (specifically, the kinds of fonts and characters used on each page).

On the other hand, if the current command is not the command for downloadable-font-character printing, the determination of the step S305 becomes negative "NO." The computer 1 then proceeds to a step S309 in which part of printing-related information of the current page "i" which corresponds to the current command is outputted to and recorded in the page data file. The information for printing corresponds to the "command for drawing image" in the example of the page data file illustrated in FIG. 13. The printing-related information possibly may however correspond to a separate command, such as a command for character drawing to direct the printer 20 to print characters without using a downloadable font.

In FIG. 11, the example of the document having three pages is illustrated, and the page data file corresponding to the document is structured as illustrated in FIG. 13. The structure of the example of the page data file shown in FIG. 13 is obtained by removing from print data for a normal printing as exemplarily illustrated in FIG. 12, a command for font downloading, a command for character-data downloading, information for start of printing, and information for end of printing. In FIG. 13, a plurality of numeric characters are depicted to the left end of the representation of the page data file, each of which represents a value indicative of a position of the corresponding piece of information relative to the start position of the page data file.

The page index information which corresponds to the page data file shown in FIG. 13 is structured as illustrated in FIG. 14. The page index information is so structured as to enable specifying the start position and the length of the page data in the page data file, on a per page basis.

The page index information in addition to the page data file is created for the following purposes:

A major one of the purposes is that, after reception of the page data file and the page index information in the computer 1, prior to the printing by the printer 20, any subset of the page data for printing any page by means of the printer 20 is made possible to be accessed in the page data file randomly, i.e., without being constrained by the sequence in which the subsets of the page data for the successive print pages are arranged in the page data file. That is to say, the page index information is generated to allow a random access to any subset of the page data in the page data file.

Provided that the above-described purposes are achieved, the page index information may be incorporated into the page data file, or the page index information and the page data file may be recorded on the respective separate files, with these files being linked with each other on a per print-page basis.

Then, with reference to FIG. 4 which illustrates in flow chart the details of the step S306 shown in FIG. 3 as the routine for processing for font-header output, the processing performed in the step S306 to output the font header to the font data file will be described below in greater detail.

Figure 15:
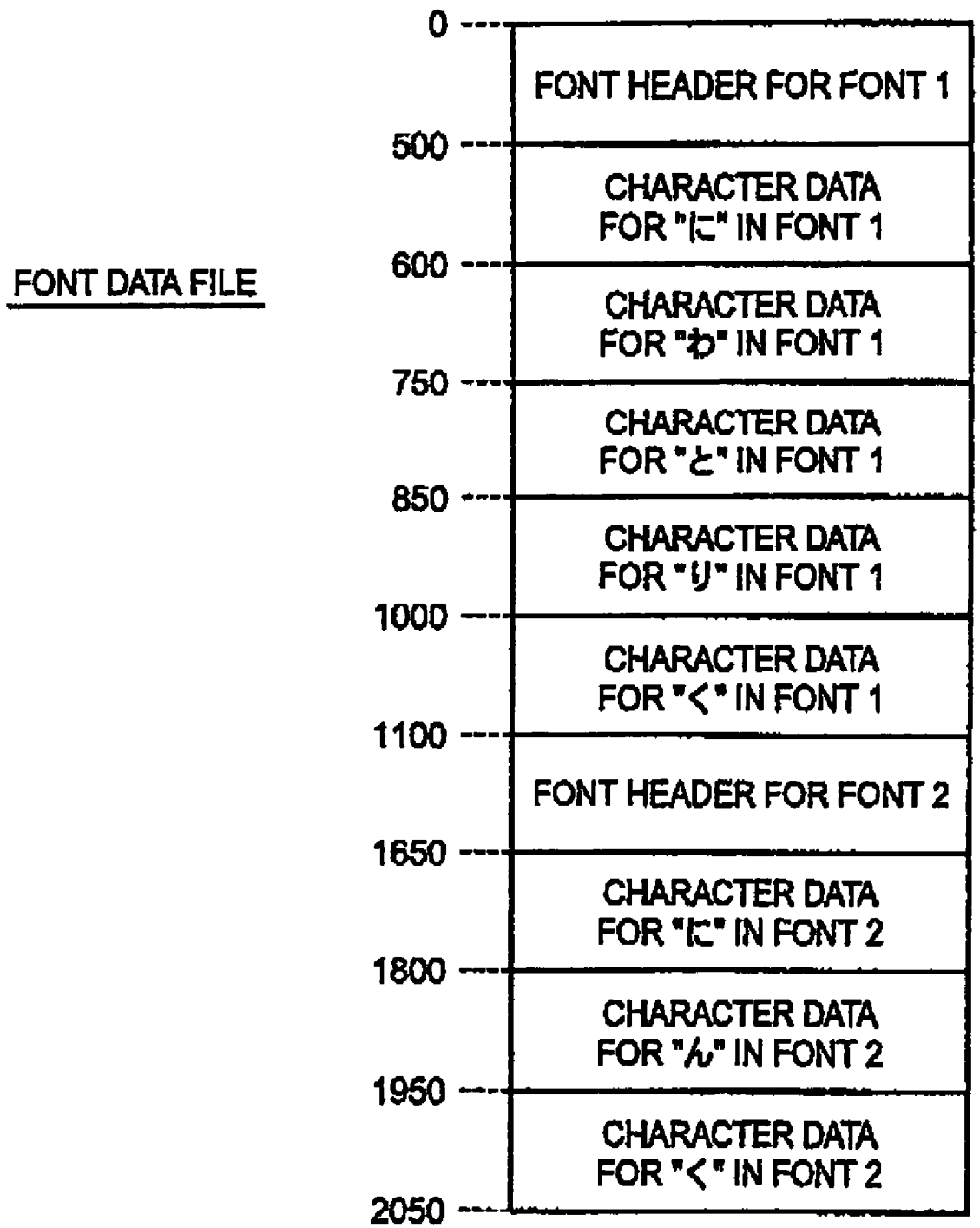
FIG. 15 illustrates the logical structure of a font data file shown in FIG. 1B.

For the above processing to be performed, the font index information, the used-font information, and the font data file are used. In FIG. 15, an example of the font data file which corresponds to the document shown in FIG. 11 is illustrated. In FIG. 16, the font index information which corresponds to the font data file shown in FIG. 15 is illustrated.

In FIG. 17, there is schematically illustrated an example of the used-font information which corresponds to the document shown in FIG. 11 and the font index information shown in FIG. 16. The used-font information is organized as a record of the kinds of the total downloadable fonts used on each print page. In the example of the used-font information shown in FIG. 17, the number of the kinds of the total downloadable fonts used is one for every page, because only one kind of font is used for each page. If a plurality of kinds of downloadable fonts are used for each page, the number of the kinds of the total downloadable fonts used becomes equal to or greater than two.

In the example of the used-font information shown in FIG. 17, the sequential numbers of downloadable fonts used in the print data are listed in the field labeled "sequential numbers of used-fonts" on a per print-page basis.

The routine for processing for font-header output shown in FIG. 4 begins with a step S401 to determine whether or not information relating to a downloadable font requested for printing the current page "i" has been already included and recorded in the font index information. The information relating to the downloadable font requested for printing the current page "i" is captured from the current command for downloadable-font-character printing. The determination of the step S401 upon implemented first becomes negative "NO," because information relating to any downloadable font has not yet been included in the font index information.

The step S401 is followed by a step S402 to record in the font data file a font header corresponding to a downloadable font requested for printing the current page "i." In recording of a new font header in the font data file, the new font header is added at a position after the end position of data previously recorded in the font data file. If there is no data previously recorded in the font data file, the new font header is recorded at the start position of the font data file.

Font headers have been previously stored in a predetermined area of the aforementioned OS, so as to form a header file. The command for downloadable-font-character printing, which the printer driver 3 is to receive from the aforementioned OS, contains font-data specifying-information for specifying or identifying a downloadable font required for printing. The font-data specifying-information indicates the pointer to a position in the header file at which the font data corresponding to the downloadable font required has been stored. Upon reference to the pointer, the font data required is read out from the header file, and then outputted to and recorded in the font data file.

Upon recording of the current font header, a step S403 is implemented to include and record in the font index information, the font name of the downloadable font recorded, and the start position and the length of an area in which the current font header has been recorded in the font data file. In recording, font numbers are attached to individual data sets for the respective fonts in a recording sequence in which these data sets are recorded in the font index information.

The step S403 is followed by a step S405 to add to the used-font information, the sequential number of the downloadable font required for printing the current page "i", together with the page number and the number of the kinds of the total downloadable fonts used on the current page "i."

The above-described steps S401-S403 and S405 will be described below in greater detail by way of an example of the document illustrated in FIG. 11, for better understanding these steps.

On the point of printing the character string appearing on the first page, i.e., "にわとり" in the Gothic font (the command for character-strings drawing is performed earlier than any other commands for the document illustrated in FIG. 11), the determination of the step S401 becomes negative "NO," because information relating to the Gothic font has not yet been included in the font index information.

Next, the step S402 is implemented to record the font header for the Gothic font in the font data file. In the example of the font data file illustrated in FIG. 15, the start position of the recorded font header (i.e., "font header for font 1") is "0," and the length of the recorded font header is "500." Therefore, the step S403 is implemented, as shown in FIG. 16, to add to the font index information, information indicating that the "font number" is "1," the "font name" is the "Gothic font," the "start position" is "0," and the "length" is "500."

The step S403 is followed by the step S405, as shown in FIG. 17, to include and record in the used-font information, information indicating that the "page number" is "1," the "number of total fonts used" is "1," and the "sequential number of used-font" is "1."

If the determination of the step S401 is affirmative "YES," the computer 1 proceeds to a step S404 to determine whether or not information relating to the downloadable font used for printing the current page "i" has been included and recorded in the used-font information associated with the current page "i."

If the above information has not been recorded in the used-font information, the determination of the step S404 becomes negative "NO," and one cycle of the execution of the routine for processing for font-header output is terminated through the step S405. On the other hand, if the above information has been recorded in the used-font information, the determination of the step S404 becomes affirmative "YES," and one cycle of the execution of the routine for processing for font-header output is immediately terminated.

Then, with reference to FIG. 5 illustrating in flow chart the details of the step S307 shown in FIG. 3 as the routine for processing for character-data output, the processing performed in the step S307 to output the character data to the font data file will be described below in greater detail. For the processing to be performed, the character index information, the used-character information, and the font data file are used.

In FIG. 18, the character index information corresponding to the font data file shown in FIG. 15 is illustrated. There are included and recorded in the character index information on a per-character basis, the font number, the character code, and the start position and the length of the character data recorded in the font data file. In recording, character numbers are attached to individual data sets for the respective characters in a recording sequence in which these data sets are recorded in the character index information.

In FIG. 19, the used-character information corresponding to the document shown in FIG. 11 and the character index information shown in FIG. 18 is illustrated. There are recorded in the used-character information, information relating to character required to be used on a per page basis.

The routine for processing for character-data output shown in FIG. 5 begins with a step S501 to determine whether or not information relating to a character required to be used for printing the current page "i" has been already included and recorded in the character index information. The information relating to the character required to be used for printing the current page "i" is captured from the current command for downloadable-font-character printing. The determination of the step S501 upon implemented first becomes negative "NO," because information relating to any character has not yet been included in the font index information.

The step S501 is followed by a step S502 to capture from the aforementioned original data, the descriptions using a page description language for directing a downloading of the character required to be used for printing the current page "i." The descriptions correspond to the character data. The step S502 is further implemented to output and record the captured character data. In recording of new data in the font data file, the new data is added at a position after the end position of data previously stored in the font data file.

Similarly with the above-described font headers, sets of character data have been previously stored in a predetermined area of the aforementioned OS, so as to form a character data file. The command for downloadable-font-character printing, which the printer driver 3 is to receive from the aforementioned OS, contains character-data specifying-information for specifying or identifying character data required for printing. The character-data specifying-information indicates the pointer to a position in the character data file at which the character data required has been stored. Upon reference to the pointer, the character data required is read out from the character data file, and then outputted to and recorded in the font data file.

Upon recording of the current character data, a step S503 is implemented to include and record in the character index information, the character name (character code) and the font number of the character represented by the current character data recorded in the font data file, and the start position and the length of an area in which the current character data has been recorded in the font data file. In recording, character numbers are attached to individual data sets for the respective characters in a recording sequence in which these data sets are recorded in the character index information.

The step S503 is followed by a step S505 to add to the used-character information, information for a character required to be used for printing the current page "i."

The above-described steps S501-S503 and S505 will be described below in greater detail by way of an example of the document illustrated in FIG. 11, for better understanding these steps.

On the point of printing one of the characters appearing on the first page, i.e., "に" of "にわとり" in the Gothic font, the determination of the step S501 becomes negative "NO," because information relating to the "に" in the Gothic font has not yet been included or recorded in the character index information.

Next, the step S502 is implemented to record the character data for the "に" in the Gothic font in the font data file. In the example of the font data file illustrated in FIG. 15, the start position of the recorded character data (i.e., "character data for "に" in font 1") is "500," and the length of the recorded character data is "100." Therefore, the step S503 is implemented, as shown in FIG. 18, to add to the character index information, information indicating that the "character number" is "1," the "font number" is "1," the "character code" is "0x306B," the "start position" is "500," and the "length" is "100."

The step S503 is followed by the step S505, as shown in FIG. 19, to include and record in the used-character information, information indicating that the "page number" is "1," the "number of total characters used" is "1," and the "sequential number of used-character" is "1." As a result of the following cycles of the execution of the routine for processing for character-data output, sets of information for the "わ," "と," and "り" are added to the used-character information, and the resultantly, the used-character information includes and records information indicating that the "number of total characters used" is "4," and the "sequential numbers of used-characters" are "1,2,3,4."

If the determination of the step S501 is affirmative "YES," the computer 1 proceeds to a step S504 to determine whether or not information relating to the character used for printing the current page "i" has been included and recorded in the used-character information associated with the current page "i."

If the above information has not been recorded in the used-character information, the determination of the step S504 becomes negative "NO," and one cycle of the execution of the routine for processing for character-data output is terminated through the step S505. On the other hand, if the above information has been recorded in the used-character information, the determination of the step S504 becomes affirmative "YES," and one cycle of the execution of the routine for processing for character-data output is immediately terminated.

Thus, one cycle of the execution of the routine for processing for file creation shown in FIG. 3, i.e., the step S202 shown in FIG. 2 is terminated.

In general, print data is classified into first data relating to font data (font header and character data), and second data other than the first data (e.g., command for character string drawing, command for image drawing, etc.).

In the present embodiment, as described above, prior to a printing operation by the printer 20, the first data is collected free from being redundant in content from the corresponding storage, and the collected first data is stored in the font data file, as shown in FIG. 15.

In the step S203 shown in FIG. 2, i.e., a processing for data output, described generally, the page data file (see FIG. 13) corresponding to the above second data is outputted to the printer 20, and data relating to the font data required for printing, upon extracted from the font data file, is in turn outputted to the printer 20.

Then, with reference to FIG. 6, the processing for data output performed in the step S203 will be described in greater detail. FIG. 6 illustrates schematically in flow chart the details of the processing for data output as a routine for processing for data output.

The routine for processing for data output is initiated with a step S601 to determine the sequence of a plurality of pages to be printed as a printing sequence, based on the aforementioned settings for printing and the number of print pages. The step S601 is followed by a step S602 to record the determined printing sequence in page sequence information.

For example, where the three-page document shown in FIG. 11 is required to be printed in a manual feed and duplex printing mode, the original sequence which indicates that pages 1, 2, and 3 of the original document are arranged in sequentially, is modified into the printing sequence which indicates pages 2, 1, and 3 of the original document are printed sequentially.

In this example, the original sequence is represented as 1, 2, and 3 by the original page numbers of the original pages arranged within the original document, while the printing sequence is represented as 1, 2, and 3 by the print page numbers of the print pages arranged within the print document.

In this example, the print page numbers 2, 1, and 3 of the print document correspond to the original page numbers 1, 2, and 3 of the original document, respectively. Therefore, the above page sequence information is created as illustrated in FIG. 20.

The thus-determined printing sequence coincides with the transmitting sequence in which print data (e.g., a series of successive sets of page data) is to be transmitted from the computer 1 to the printer 20.

Upon modification of the transmitting sequence of the print data from the original sequence to the printing sequence, there are determined ones of a plurality of pages arranged in the same sequence as the printing sequence, which use a downloadable font in printing are determined and the page numbers thereof. Further, based on the determined downloadable-font-used page numbers, there is determined a redundant range over which the same downloadable font is to be redundantly used in printing the plurality of pages.

More specifically, a step S603 is implemented to add to the font index information, first set of information for the page number of a start print page, and a second set of information for the page number of an end print page.

The first set of information indicates the page number of one of the plurality of pages arranged in the same sequence as the printing sequence, on which one each font recorded in the font index information is first used during printing of the plurality of pages. The second set of information indicates the page number of one of the plurality of pages arranged in the same sequence as the printing sequence, on which one each font recorded in the font index information is last used during printing of the plurality of pages. The first set of information will be referred to simply as "start page number," and the second set of information as "end page number," for the sake of convenience in explanation of the present embodiment.

That is, the start and end page numbers cooperate to indicate that from which print page to which print page each downloadable font is used on the plurality of pages. The font index information illustrated in FIG. 16, as a result of the incorporation thereinto of the start and end page numbers, is updated into the font index information illustrated in FIG. 21.

Subsequently, a step S604 is implemented, similarly with the step S603, to add the above start and end page numbers to the character index information illustrated in FIG. 18, resulting in an updating of the character index information from that illustrated in FIG. 18 to that illustrated in FIG. 22.

The font index information illustrated in FIG. 21 is an example of a set of information created where the above start and end page numbers have been detected on a per font basis. The font index information illustrated in FIG. 16 and the used-font information illustrated in FIG. 17 are referred to in combination with each other for the detection of the start and end page numbers in the font index information illustrated in FIG. 21. For the detection, the page sequence information illustrated in FIG. 20 is also referred to, because the start and end page numbers are to be determined not in the aforementioned original sequence of pages but in the printing sequence.

The character index information illustrated in FIG. 22 is an example of a set of information created where there are detected on a per character basis the page number ("start page number using character in downloaded font," in the example shown in FIG. 22) of one of the plurality of pages arranged in the printing sequence on which one the same character is first used during printing of the plurality of pages, and the page number ("end page number using character in downloaded font," in the example shown in FIG. 22) of one of the plurality of pages arranged in the printing sequence on which one the same character is last used during printing of the plurality of pages.

The character index information illustrated in FIG. 18 and the used-character information-illustrated in FIG. 19 are referred to in combination with each other for the detection of the above start and end page numbers using character in downloaded font in the character index information illustrated in FIG. 22. For the detection, the page sequence information illustrated in FIG. 20 is also referred to, because the start and end page numbers are to be determined not in the aforementioned original sequence of pages but in the printing sequence.

As is evident from the above, the reference to the font index information and the character index information allows the detection of a redundant range over which the same downloadable font is redundantly used within the plurality of pages arranged in the printing sequence.

Upon completion of the implementation of the steps S603 and S604 described above, a step S606 is implemented to initialize a page number "j" to "1," and set post-download flags for all the fonts and the characters to indicate "false." Each of the post-download flags, in the state of "false," indicates that a downloading of the corresponding one of the fonts and characters has been completed, while, in the state of "true," indicates that a downloading of the corresponding one of the fonts and characters has not yet been completed. Subsequently, steps S607-S615 are implemented.

Described first generally, the steps S607-S615 are implemented to perform an actual sending of commands for a printing operation to the printer 20, and to perform, for the first page of the full print document represented by the entire print data an outputting of the font data in timed relation with an outputting of a subset of the entire print data which corresponds to the first page.

In the step S607-S615, for the remaining ones of the full print document other than the first page, at least one portion (e.g., the font header and the character data) of data identical to the font data which was previously outputted to the printer 20 is not redundantly outputted thereto.

More specifically, because of the availability of a plurality of kinds of downloadable fonts in the present embodiment, in the above steps S607-S615, there is determined, on a per kind-of-downloadable-font basis, a redundant range over which the same kind of a downloadable font is redundantly used within the plurality of pages arranged in the printing sequence. In the steps S607-615, within the determined redundant range, at least one portion (e.g., the font header and the character data) of data identical to the font data of the kind which was previously outputted to the printer 20 is not redundantly outputted thereto.

Described next in more detail, the step S607 is implemented to transmit a command for print start to the printer 20. The step S607 is followed by the step S608 to determine whether or not the current value of the page number "j" is not greater than the current value of the aforementioned page counter "i" (hereinafter, referred to as "number "i" of total print pages", in view of the current value of the page counter "i" indicating the number of the total print pages at this time).

If the current value of the page number "j" is greater than the number "i" of the total print pages, then the determination of the step S607 becomes negative "NO," and the step S615 is implemented to transmit a command for print end to the printer 20.

On the other hand, if the current value of the page number "j" is equal to or smaller than the number "i" of the total print pages, then the determination of the step S607 becomes affirmative "YES," and the computer 1 proceeds to the step S609.

The step S609, although will be described later in more detail with reference to FIG. 7, is implemented to transmit a command for instructing the printer 20 to load therein from the computer 1 the font header included in the print data 54. Subsequently, the step S610, although will be described later in more detail with reference to FIG. 8, is implemented to transmit a command for instructing the printer 20 to load therein from the computer 1 the character data included in the print data 54.

Thereafter, the step 611 is implemented to transmit to the printer 20 the page data for the page having the page number "j" (hereinafter, referred to as "current page "j""), which page data is included in the print data 54.

More specifically, the step S611 is implemented to first refer to a segment of the page index information (see FIG. 14) which relates to the current page "j," to thereby capture therefrom the start position and the length for the current page "j." The step S611 is further implemented to transmit to the printer 20, data stored in an area which is so located in the page data file (see FIG. 13) as to extend from the captured start position, by the same length as the captured length.

Thereafter the step S612, although will be described later in more detail with reference to FIG. 9, is implemented to transmit a command for instructing the printer 20 to delete an inactive character data from the corresponding storage of the printer 20. Subsequently, the step S613, although will be described later in more detail with reference to FIG. 10, is implemented to transmit a command for instructing the printer 20 to delete an inactive font (inactive font header) from the corresponding storage of the printer 20.

Thereafter, the step S614 is implemented to increment the current value of the page number "j" by one. Subsequently, a loop of the steps S608-S614 is repeatedly implemented until the determination of the step S608 becomes negative "NO." Thereafter, one cycle of the execution of the routine for processing data output, i.e., the step S203 shown in FIG. 2 is terminated via the step S615.

Then, with reference to FIG. 7 illustrating schematically in flow chart the details of the step S609 as a routine for transmitting command for font-data loading, the step S609 will be described in more detail.

The routine for transmitting command for font-data loading is initiated with a step S701 to set a font number "k" to "0." The step S701 is followed by a step S702 to increment the current value of the font number "k" by one. Thereafter, a step S703 is implemented to determine whether or not the current value of the font number "k" is not greater than the number of the total fonts recorded in the font index information (see FIG. 21).

If the current value of the font number "k" is greater than the number of the total fonts recorded, then the determination of the step S703 becomes negative "NO," and one cycle of the execution of the routine for transmitting command for font-data loading is terminated immediately. By contrast, if the current value of the font number "k" is not greater than the number of the total fonts recorded, then the determination of the step S703 becomes affirmative "YES, and the computer 1 proceeds to a step S704.

Describing by way of the example of the font index information illustrated in FIG. 21, the number of the fonts is two, and the font number "k" is one at the initial implementation of the step S703, and therefore, the determination of the step S703 becomes affirmative "YES," and the computer 1 proceeds to the step S704.

The step S704 is implemented to determine whether or not the current value of the page number "j" is equal to or greater than the aforementioned start page number using the font (hereinafter, referred to as "font #k") to which the same number as the current value of the font number "k" has been assigned: and is concurrently equal to or smaller than the aforementioned end page number using the font #k.

The current value of the page number "j," which is a value used in the routine for processing for data output shown in FIG. 6, indicates the page number of the current print page in the aforementioned print document.

If the determination of the step S704 is affirmative "YES," then the computer 1 proceeds to a step S705, while, if the determination is negative "NO," then the computer 1 returns to the step S702. The step S705 is implemented to determine whether or not the aforementioned post-download flag corresponding to the font #k is "false." If the current post-download flag is "false," then the computer 1 proceeds to a step S706. On the other hand, if the current post-download flag is "true," then the computer 1 returns to the step S702.

The initial status of the post-download flag is set to "false" by the previous implementation of the step S606 shown in FIG. 6, and therefore, the initial determination of the step S705 becomes affirmative "YES," and the computer 1 proceeds to the step S706. The step S706 is implemented to set the post-downloadable flag corresponding to the font #k to "true."

The step S706 is followed by a step S707 to transmit to the printer 20 the font header corresponding to the font #k for storage in the RAM 27. More specifically, the step S707 is implemented, by referring to a segment of the font index information (see FIG. 21) which relates to the font #k, the start position and the length for the font #k are captured the font index information. By the use of the captured start position and the length, there is located data which has been stored corresponding to the font #k within the font data file (see FIG. 15). The located data, i.e., the font header for the font #k is transmitted to the printer 20.

Thereafter, the computer 1 returns to the step S702, and a loop of the steps S702-S707 is repeatedly executed until the determination of the step S703 becomes negative "NO."

Then, with reference to FIG. 8 illustrating schematically in flow chart the details of the step S610 as a routine for transmitting command for character-data loading, the step S610 will be described in more detail.

The routine for transmitting command for character-data loading is initiated with a step S801 to set a character number "k" to "0." The step S801 is followed by a step S802 to increment the current value of the character number "k" by one. Thereafter, a step S803 is implemented to determine whether or not the current value of the character number "k" is not greater than the number of the total characters recorded in the character index information (see FIG. 22).

If the current value of the character number "k" is greater than the number of the total characters recorded, then the determination of the step S803 becomes negative "NO," and one cycle of the execution of the routine for transmitting command for character-data loading is terminated immediately. By contrast, if the current value of the character number "k" is not greater than the number of the total characters recorded, then the determination of the step S603 becomes affirmative "YES, and the computer 1 proceeds to a step S804.

Describing by way of the example of the font index information illustrated in FIG. 22, the number of the characters is eight, and the character number "k" is one at the initial implementation of the step S803, and therefore, the determination of the step S803 becomes affirmative "YES," and the computer 1 proceeds to the step S804.

The step S804 is implemented to determine whether or not the current value of the page number "j" is equal to or greater than the aforementioned start page number using the character (hereinafter, referred to as "character #k") to which the same number as the current value of the character number "k" has been assigned; and is concurrently equal to or smaller than the aforementioned end page number using the character #k.

As described above, the current value of the page number "j," which is a value used in the routine for processing for data output shown in FIG. 6, indicates the page number of the current print page in the aforementioned print document.

If the determination of the step S804 is affirmative "YES," then the computer 1 proceeds to a step S805, while, if the determination is negative "NO," then the computer 1 returns to the step S802. The step S805 is implemented to determine whether or not the aforementioned post-download flag corresponding to the character #k is "false." If the current post-download flag is "false," then the computer 1 proceeds to a step S806. On the other hand, if the current post-download flag is "true," then the computer 1 returns to the step S802.

The initial status of the post-download flag is set to "false" by the previous implementation of the step S606 shown in FIG. 6, and therefore, the initial determination of the step S805 becomes affirmative "YES," and the computer 1 proceeds to the step S806. The step S806 is implemented to set the post-download flag corresponding to the character #k to "true."

The step S806 is followed by a step S807 to transmit to the printer 20 the character data corresponding to the character #k for storage in the RAM 27. More specifically, the step S807 is implemented, by referring to a segment of the character index information (see FIG. 22) which relates to the character #k, the start position and the length for the character #k are captured the character index information. By the use of the captured start position and the length, there is located data which has been stored corresponding to the character #k within the font data file (see FIG. 15). The located data, i.e., the character data for the character #k is transmitted to the printer 20.

Thereafter, the computer 1 returns to the step S802, and a loop of the steps S802-S807 is repeatedly executed until the determination of the step S803 becomes negative "NO."

Then, with reference to FIG. 9 illustrating schematically in flow chart the details of the step S612 as a routine for transmitting command for character-data deletion, the step S612 will be described in more detail.

The routine for transmitting command for character-data deletion is initiated with a step S901 to set a character number "k" to "0." The step S901 is followed by a step S902 to increment the current value of the character number "k" by one. Thereafter, a step S903 is implemented to determine whether or not the current value of the character number "k" is not greater than the number of the total characters recorded in the character index information (see FIG. 22).

If the current value of the character number "k" is greater than the number of the total characters recorded, then the determination of the step S903 becomes negative "NO," and one cycle of the execution of the routine for transmitting command for character-data deletion is terminated immediately. By contrast, if the current value of the character number "k" is not greater than the number of the total characters recorded, then the determination of the step S903 becomes affirmative "YES, and the computer 1 proceeds to a step S904.

Describing by way of the example of the character index information illustrated in FIG. 22, the number of the characters is eight, and the character number "k" is one at the initial implementation of the step S903, and therefore, the determination of the step S903 becomes affirmative "YES," and the computer 1 proceeds to the step S904.

The step S904 is implemented to determine whether or not the current value of the page number "j" is equal to or greater than the aforementioned end page number using the character (hereinafter, referred to as "character #k") to which the same number as the current value of the character number "k" has been assigned.

As described above, the current value of the page number "j," which is a value used in the routine for processing for data output shown in FIG. 6, indicates the page number of the current print page in the aforementioned print document.

More specifically, the step S904 is implemented to detect as an inactive character data, at least one of individual sets of the character data which has been stored in the RAM 27 (corresponding to a memory) of the printer 20, wherein the at least one will not be later used at least temporarily. The detected character data represents a character printed in a downloadable font.

In the present embodiment, as illustrated in FIG. 22, there is detected a redundant range over which the same character data is redundantly used within a plurality of print pages of a print document arranged in the aforementioned printing sequence. The step S904 is implemented to detect, after completion of the printing of the end page of the redundant range, the character data that was used for printing the end page, as the inactive character data.

If the determination of the step S904 is affirmative "YES," then the computer 1 proceeds to a step S905, while, if the determination is negative "NO," then the computer 1 returns to the step S902. The step S905 is implemented to determine whether or not the aforementioned post-download flag corresponding to the character #k is "true." If the current post-download flag is "true," then the computer 1 proceeds to a step S906. On the other hand, if the current post-download flag is "false," then the computer 1 returns to the step S902.

The step S906 is implemented to set the post-download flag for the character #k to "false." The step S906 is followed by a step S907 to transmit to the printer 20 the command for character data deletion which instructs the printer 20 to delete from the RAM 27 the character data corresponding to the character #k.

Thereafter, the computer 1 returns to the step S902, and a loop of the steps S902-S907 is repeatedly executed until the determination of the step S903 becomes negative "NO."

In the present embodiment, as will be understood from FIG. 9, irrespective of whether or not the same character data is not used on an intermediate page between the start and the end pages of the aforementioned redundant range, the same character data is not detected as the inactive character data until the printing of the end page is completed, and only after the completion, the character data is detected-as the inactive character data.

Then, with reference to FIG. 10 illustrating schematically in flow chart the details of the step S613 as a routine for transmitting command for font-data deletion, the step S613 will be described in more detail.

The routine for transmitting command for font-data deletion is initiated with a step S1001 to set a font number "k" to "0." The step S1001 is followed by a step S1002 to increment the current value of the font number "k" by one. Thereafter, a step S1003 is implemented to determine whether or not the current value of the font number "k" is not greater than the number of the total fonts recorded in the font index information (see FIG. 21).

If the current value of the font number "k" is greater than the number of the total fonts recorded, then the determination of the step S1003 becomes negative "NO," and one cycle of the execution of the routine for transmitting command for font-data deletion is terminated immediately. By contrast, if the current value of the font number "k" is not greater than the number of the total fonts recorded, then the determination of the step S1003 becomes affirmative "YES," and the computer 1 proceeds to a step S1004.

Describing by way of the example of the font index information illustrated in FIG. 21, the number of the fonts is two, and the font number "k" is one at the initial implementation of the step S1003, and therefore, the determination of the step S1003 becomes affirmative "YES," and the computer 1 proceeds to the step S1004.

The step S1004 is implemented to determine whether or not the current value of the page number "j" is equal to or greater than the aforementioned end page number using the font (hereinafter, referred to as "font #k") to which the same number as the current value of the font number "k" has been assigned.

As described above, the current value of the page number "j," which is a value used in the routine for processing for data output shown in FIG. 6, indicates the page number of the current print page in the aforementioned print document.

More specifically, the step S1004 is implemented to detect as an inactive font, at least one of a plurality of kinds of downloadable fonts which have been stored in the RAM 27 (corresponding to a memory) of the printer 20, wherein the at least one will not later be used at least temporarily.

In the present embodiment, as illustrated in FIG. 21, there is detected a redundant range over which the same font is redundantly used within a plurality of print pages of a print document arranged in the aforementioned printing sequence. The step S1004 is implemented to detect, after completion of the printing of the end page of the redundant range, the font that was used for printing the end page, as the inactive font.

If the determination of the step S1004 is affirmative "YES," then the computer 1 proceeds to a step S1005. On the other hand, if the determination is negative "NO," then the computer 1 returns to the step S1002. The step S1005 is implemented to determine whether or not the aforementioned post-download flag corresponding to the font #k is "true." If the current post-download flag is "true," then the computer 1 proceeds to a step S1006. On the other hand, if the current post-download flag is "false," then the computer 1 returns to the step S1002.

The step S1006 is implemented to set the post-download flag for the font #k to "false." The step S1006 is followed by a step S1007 to transmit to the printer 20 the command for font data deletion which instructs the printer 20 to delete from the RAM 27 the font header (inactive font header) corresponding to the font #k.

Thereafter, the computer 1 returns to the step S1002, and a loop of the steps S1002-S1007 is repeatedly executed until the determination of the step S1003 becomes negative "NO."

Figure 23:
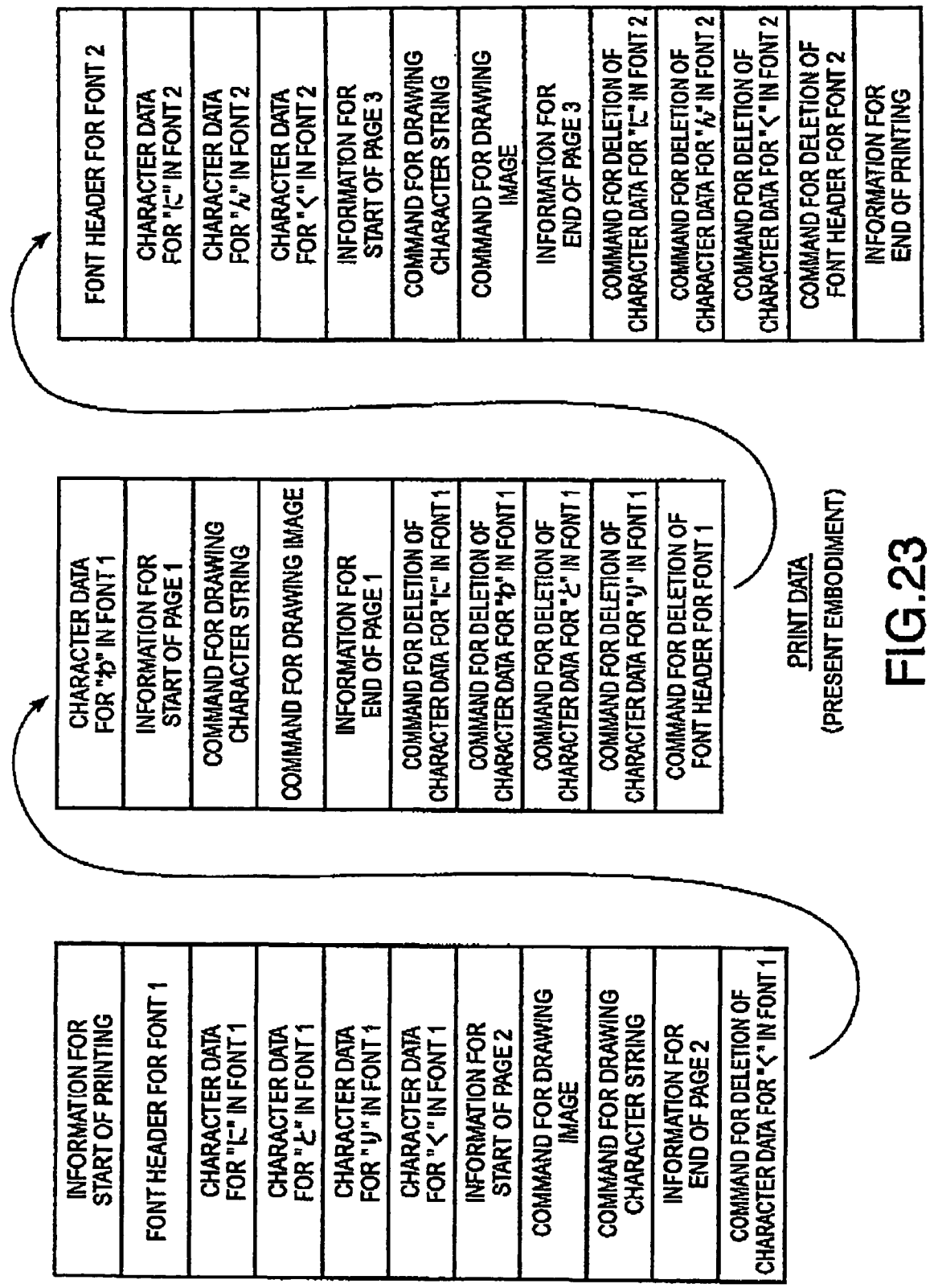
FIG. 23 illustrates a series of subsets of print data required for printing the document shown in FIG. 11 in a duplex mode in the present embodiment.

In FIG. 23, a series of sets of data which are to be transmitted to the printer 20 are illustrated in the same sequence as a transmitting sequence in which the sets of data are to be sequentially transmitted to the printer 20 for a specified printing operation described below.

The sets of data are ones that have been created as a result of the implementation of the steps S202 and S203 both shown in FIG. 2 for the page data file (see FIG. 13) and the font data file (see FIG. 15), both of which have been created in the computer 1 based on the aforementioned original data of the original document, under the settings for printing commanded by the user. More specifically, the sets of data are ones that are to be transmitted to the printer 20 for printing in a manual feed and duplex mode the document shown in FIG. 11.

Figure 24:
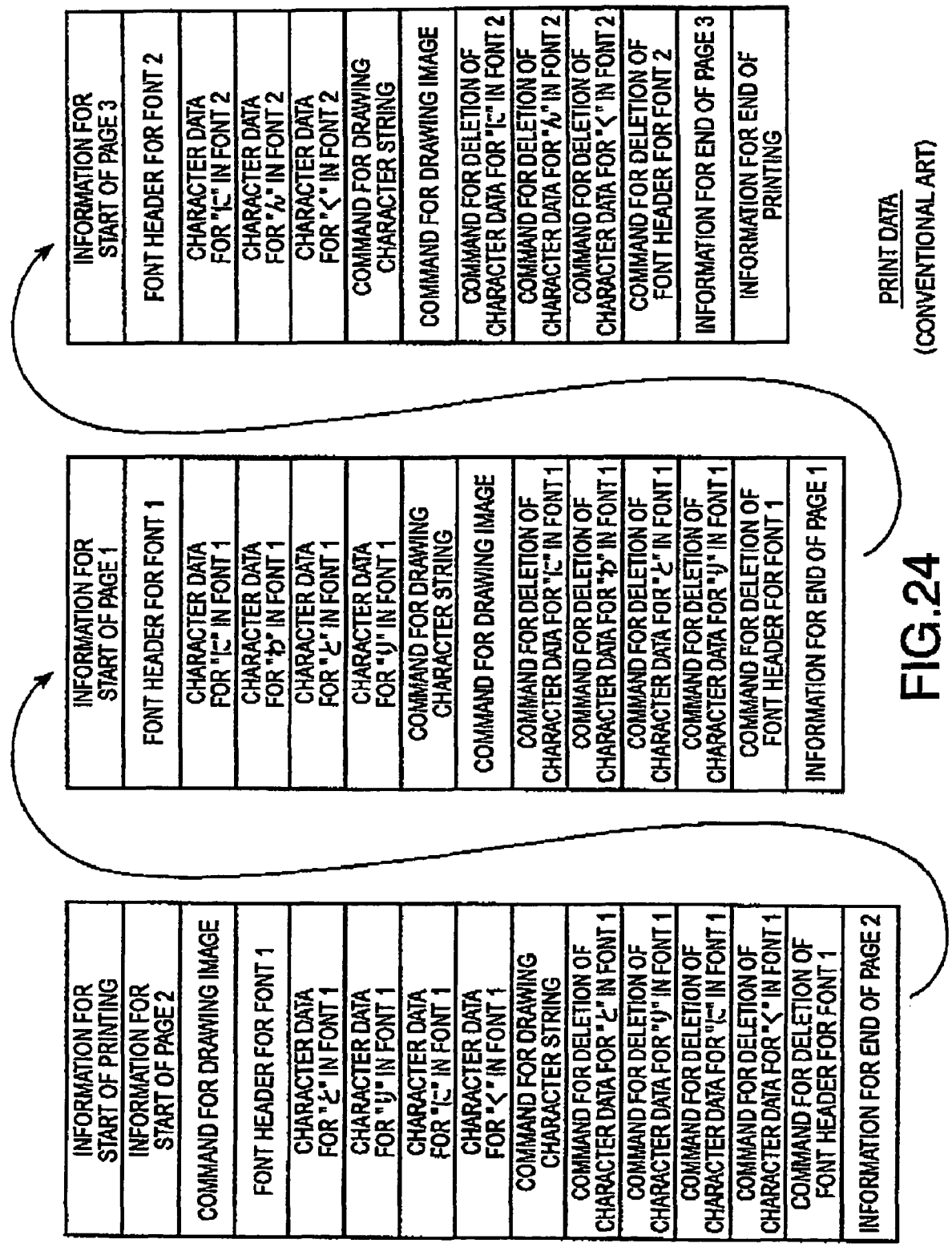
FIG. 24 illustrates a series of subsets of print data required for printing the document shown in FIG. 11 in a duplex mode by a conventional printer.

In FIG. 24, there are illustrated a series of sets of data required to be transmitted to the printer 20 for printing the document shown in FIG. 11 in a manual feed and duplex mode in a conventional manner. In the conventional manner, both of a downloading of a font required from the computer 1 to the printer 20, and a deletion of inactive font data (including an inactive font header and inactive character data) from the printer 20 are performed on a per page basis.

The data shown in FIG. 23 is smaller in amount than the data shown in FIG. 24. This fact shows that the present embodiment does not require a transmission to the printer 20 of data larger in amount than that in the above conventional manner for causing the printer 20 to perform the same job of print using a downloadable font.

As will be evident from the above, in the present embodiment, the determining section 42 is constructed by a portion of the computer 1 which is assigned to implement the steps S301-S305. The management-data producing section 44 is constructed by a portion of the computer 1 which is assigned to implement the steps S201, S306, and S307. The print-data producing section 46 is constructed by a portion of the computer 1 which is assigned to implement the steps S308-S310, S312, and S313. The print-data output section 48 is constructed by a portion of the computer 1 which is assigned to implement the steps S603-S614. The page-sequence determining section 50 is constructed by a portion of the computer 1 which is assigned to implement the steps S601 and S602.

Further, in the present embodiment, the computer 1 constitutes an example of the "print management apparatus" set forth in the above mode (1), the printer 20 constitutes an example of the "image forming apparatus" set forth in the same mode, and the printing system 100 constitutes an example of the "printing system" set forth in the same mode. Still further, the page-sequence determining section 50 constitutes an example of the "sequence modifier" set forth in the same mode, a portion of the print-data output section 48 which is assigned to implement the steps S603 and S604 constitutes an example of the "redundant-range detector" set forth in the same mode, and the remainder of the print-data output section 48 constitutes an example of the "print-data producing device" set forth in the same mode.

Additionally, in the present embodiment, the management-data producing section 44 constitutes an example of the "position determining device" set forth in the above mode (2), a portion of the management-data producing section 44 which is assigned to implement the steps S306 and S307 constitutes an example of the "kind-related-information producing device" set forth in the above mode (6), and a portion of the print-data output section 48 which is assigned to implement the steps S603 and S604 constitutes an example of the "kind-classified redundant-range detecting device" set forth in the same mode.

Still additionally, in the present embodiment, the RAM27 constitutes an example of the "memory" set forth in the above mode (7), a portion of the print-data output section 48 which is assigned to implement the steps S904 and S1004 constitutes an example of the "inactive-font detecting device" set forth in the same mode, a portion of the print-data output section 48 which is assigned to implement the steps S907 and S1007 constitutes an example of the "deletion-command output device" set forth in the same mode, and the RAM 8 constitutes an example of the "storage" set forth in the above mode (12).

Further, in the present embodiment, the font header constitutes an example of the "font-kind data" set forth in the above mode (14), and the character data constitutes an example of the "character-identification data" set forth in the same mode, and a portion of the determining section 42 which is assigned to implement the step S305 constitutes an example of the "determining device" set forth in the above mode (15).

Still further, in the present embodiment, the computer 1 constitutes an example of the "print management apparatus" set forth in the above mode (17), a method effected as a result of the execution of the printer driver 3, i.e., the main program illustrated in FIG. 2 constitutes an example of the "method" set forth in the above mode (18), a process performed in the page-sequence determining section 50 constitutes an example of the "sequence-modification step" set forth in the same mode, the steps S603 and S604 constitute an example of the "redundant-range detection step" set forth in the same mode, and the step S203 constitutes an example of the "print-data output step" set forth in the same mode.

Yet further, in the present embodiment, the printer driver 3, i.e., the main program illustrated in FIG. 2 constitutes an example of the "computer program" set forth in the above mode (19), and the RAM 8 storing therein the main program constitutes an example of the "computer-readable storage medium" set forth in the above mode (20).

Next, a second embodiment of the present invention will be described with reference to FIGS. 25-30.

Described generally, a printing system 100 according to the present embodiment is obtained by partially modifying the first embodiment with respect to the routine for processing for data output shown in FIG. 6 (including: the routine for transmitting command for font-data loading shown in FIG. 7; the routine for transmitting command for character-data loading shown in FIG. 8; the routine for transmitting command for character-data deletion shown in FIG. 9; and the routine for transmitting command for font-data deletion shown in FIG. 10).

In view of the fact that the present embodiment is common in construction to the first embodiment with respect to the remaining elements, only the corresponding routine in the present embodiment will be described below in more detail, for better understanding the present embodiment, while the common elements of the present embodiment to those of the first embodiment will be referenced the same reference numerals or names as those in the description and illustration of the first embodiment, without a redundant description and illustration.

In the present embodiment, the status in utilization of the RAM 27 (corresponding to a memory) of the printer 20 is detected, and, depending on the detected status, there is transmitted from the computer 1 to the printer 20 a command for instructing the printer 20 to delete inactive font data (the inactive font header and the inactive character data) from the printer 20.

More specifically, at the printing of a predetermined one (hereinafter, referred to as "reference page") of the plurality of print pages of the print document, the available capacity of the RAM 27 is detected. If the detected available capacity fails to meet a predetermined condition, a portion of the font data stored in the RAM 27, which will not used for printing the reference page is determined as data relating to the inactive font, even if the same font as the determined inactive font is required to be used for printing the subsequent print pages following the reference page in the full print document. In this case, a command for instructing the printer 20 to delete the data relating to the determined inactive font from the RAM 27 is sent to the printer 20, so that the data may be absent from the RAM 27 at least temporarily.

When the present embodiment is applied in an example where the same font is used respectively on the first and the third print page, data for the font is deleted from the RAM 27, upon completion of the printing of the first page, and prior to initiation of the printing of the second page, for preventing the RAM 27 from being overloaded in capacity at the printing of the second print page. In this case, the second print page corresponds to an example of the aforementioned reference page.

It is added that the determination as to whether or not the detection of data relating to a particular font is allowed may be made depending upon the size of the data of the particular font after downloaded to the printer 20.

Figure 25:
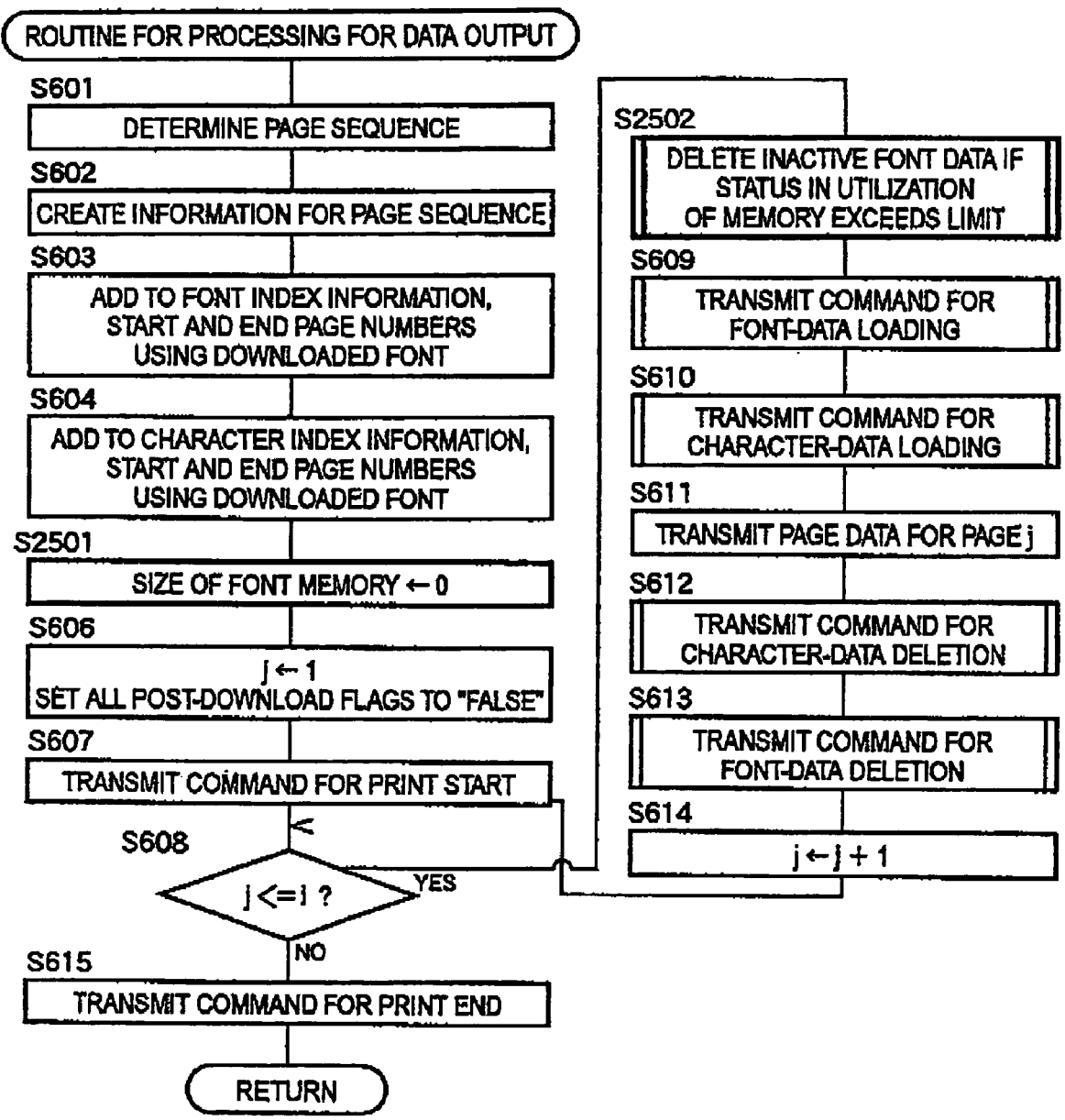
FIG. 25 is a flow chart illustrating schematically an example of a routine for processing for data output to be executed by a computer of a printing system according to a second embodiment of the present invention.

FIG. 25 illustrates schematically in flow chart a routine for processing for data output to be executed by the computer 1 in the printing system 100 constructed according to the present embodiment. The routine is executed in the step S203 of the main program shown in FIG. 2.

The routine for processing for data output shown in FIG. 25 is different in configuration from the routine for processing for data output shown in FIG. 6 in that a new step S2501 (depicted by the thick frame line in FIG. 25) is interposed between the existing steps S604 and S606. The step S2501 is provided to initialize a value indicative of the size of a font memory, which size is defined to mean the total data size of the font header and the character data which have been downloaded to the RAM 27, resulting in the setting of the value indicative of the size of the font memory (hereinafter, referred to simply as "value of font memory size") to zero.

Figure 30:
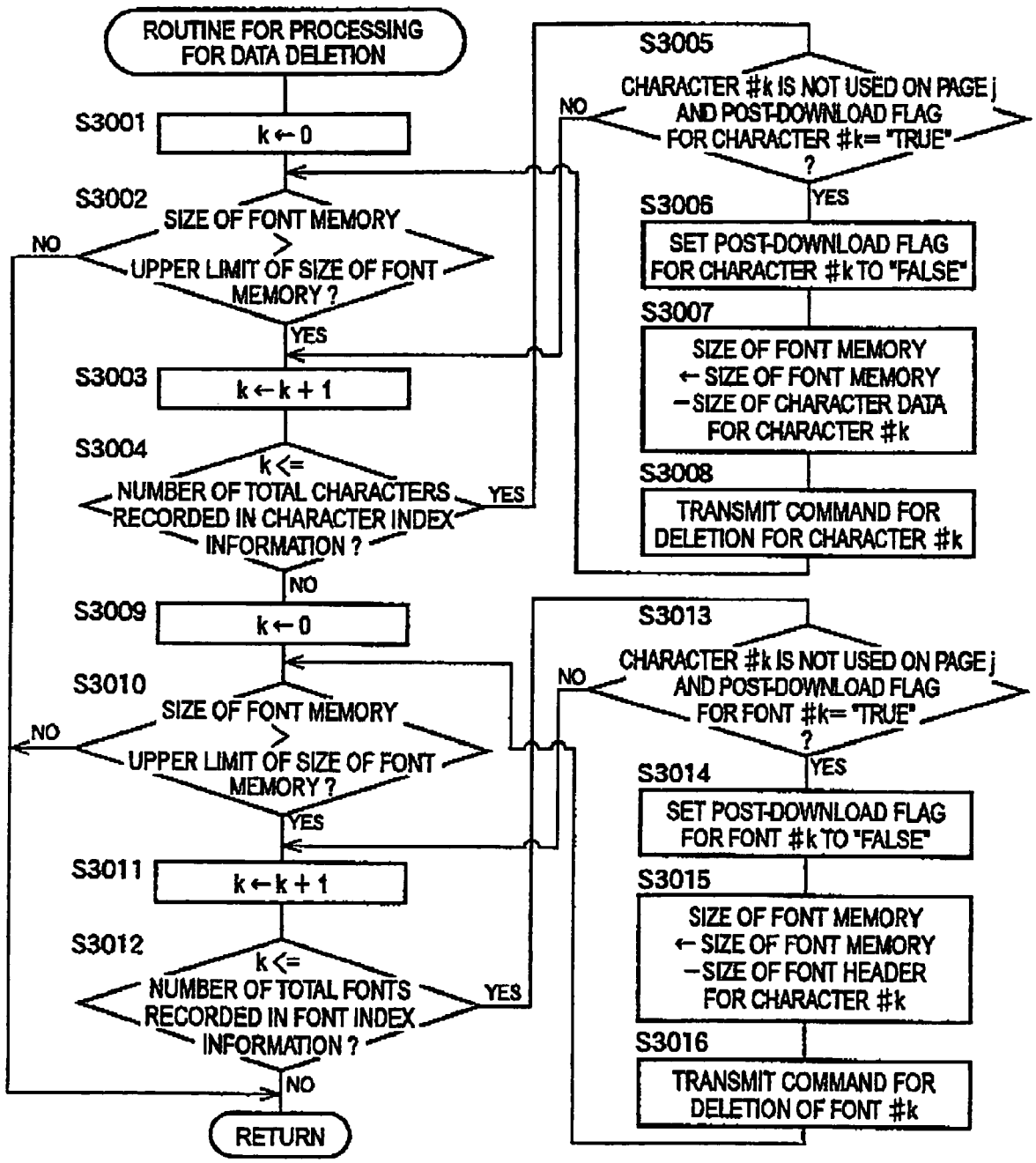
FIG. 30 is a flow chart illustrating schematically an example of a routine for processing for data deletion to be executed by the computer in the second embodiment.

Further, the routine for processing for data output shown in FIG. 25 is different in configuration from the routine for processing for data output shown in FIG. 6 also in that a new step S2502 (depicted by the thick frame line in FIG. 25) is interposed between the existing steps S608 and S609. The step S2502, although will be described later in greater detail with reference to FIG. 30, is provided to determine whether or not the current value of font memory size is equal to or greater than a given value. If the determination is affirmative, inactive font header and character data is deleted from the RAM 27.

Still further, the routine for processing for data output shown in FIG. 25 is different in configuration from the routine for processing for data output shown in FIG. 6 also in that the steps S609, S610, S612, and S613 are each partially modified from those in the routine shown in FIG. 6, although will be described in more detail with reference to FIGS. 26-29.

The routine for processing for data output shown in FIG. 25, in view of its employment of the identical steps to those of the routine for processing for data output shown in FIG. 6, has been described without a redundant explanation of these identical steps.

Figure 26:
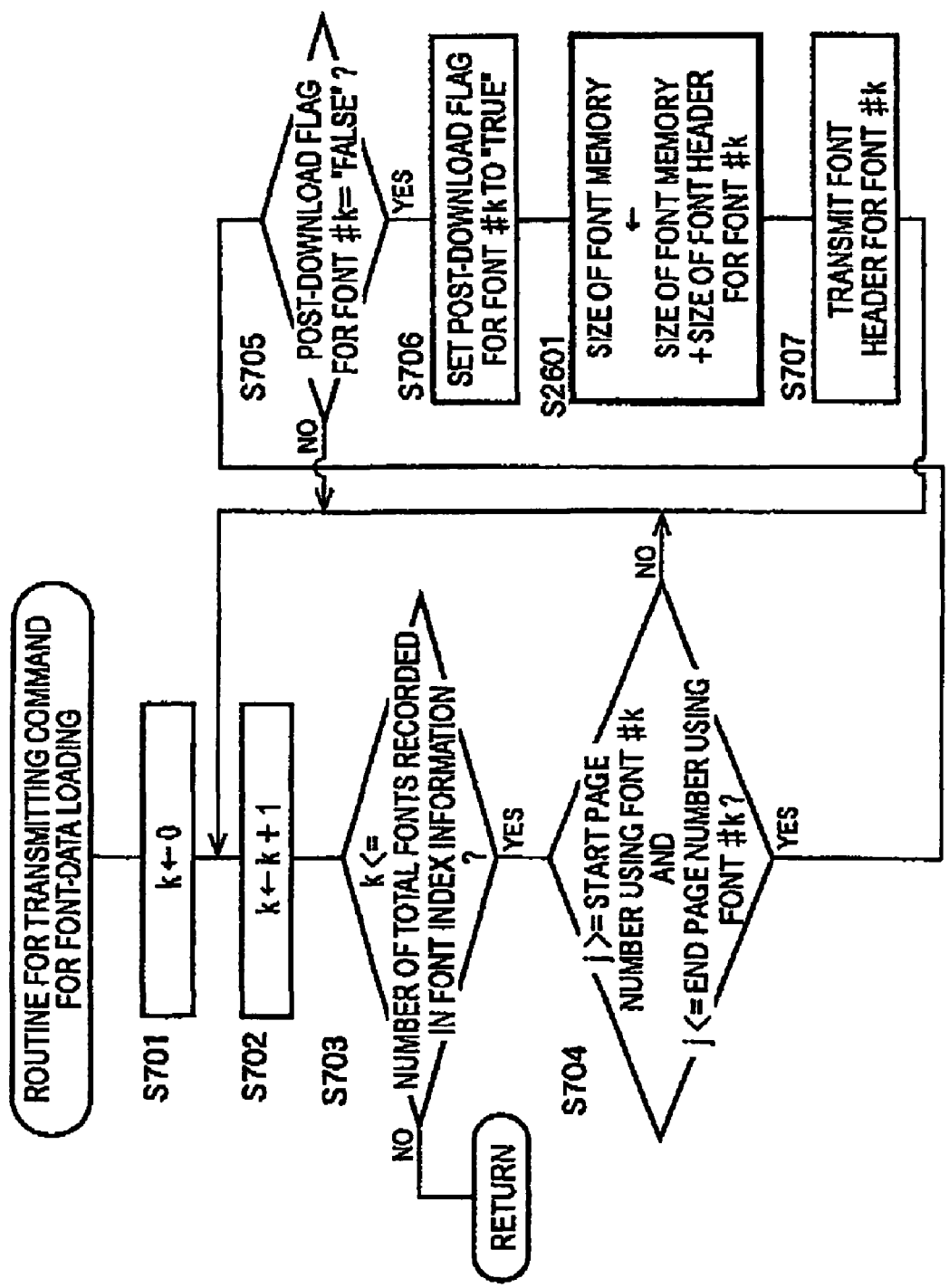
FIG. 26 is a flow chart illustrating schematically an example of a routine for transmitting command for font-data loading to be executed by the computer in the second embodiment.

FIG. 26 illustrates schematically in flow chart a routine for transmitting command for font-data loading, which is to be executed by the computer 1, in the step S609 of the routine for processing for data output shown in FIG. 25.

The routine for transmitting command for font-data loading shown in FIG. 26 is different in configuration from the routine for transmitting command for font-data loading shown in FIG. 7 in that a new step S2601 is added between the existing steps S706 and S707. The step S2601 is provided to add to the current value of font memory size described above, a value indicative of the size of data of the font header for the font #k which has been additionally downloaded to the RAM 27, to thereby update the current value of font memory size.

The routine for transmitting command for font-data loading shown in FIG. 26, in view of its employment of the identical steps to those of the routine for transmitting command for font-data loading shown in FIG. 7, has been described without a redundant explanation of these identical steps.

Figure 27:
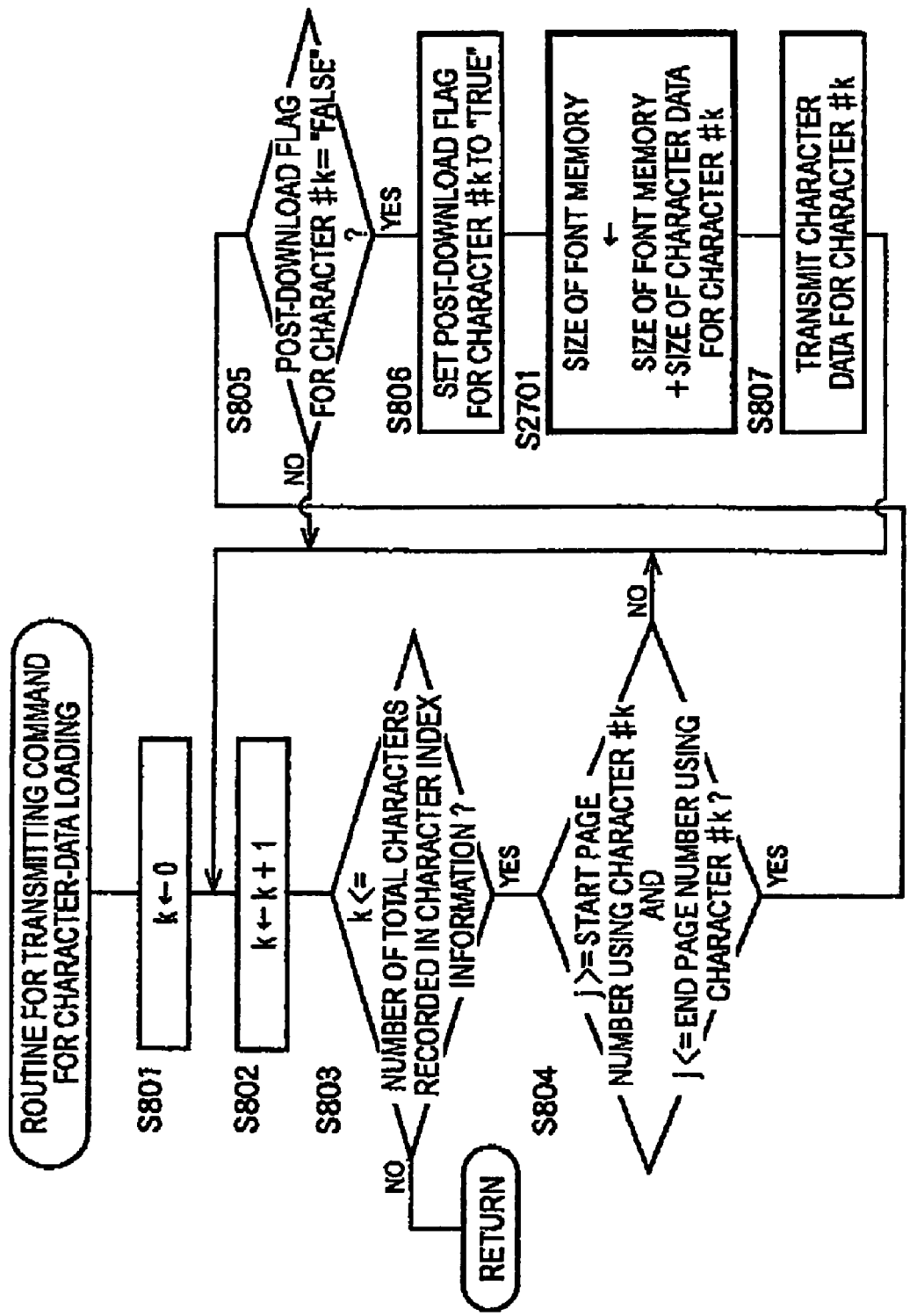
FIG. 27 is a flow chart illustrating schematically an example of a routine for transmitting command for character-data loading to be executed by the computer in the second embodiment.

FIG. 27 illustrates schematically in flow chart a routine for transmitting command for character-data loading, which is to be executed by the computer 1, in the step S610 of the routine for processing for data output shown in FIG. 25.

The routine for transmitting command for character-data loading shown in FIG. 27 is different in configuration from the routine for transmitting command for character-data loading shown in FIG. 8 in that a new step S2701 is added between the existing steps S806 and S807. The step S2701 is provided to add to the current value of font memory size described above, a value indicative of the size of the character data for the character #k which has been additionally downloaded to the RAM 27, to thereby update the current value of font memory size.

The routine for transmitting command for character-data loading shown in FIG. 27, in view of its employment of the identical steps to those of the routine for transmitting command for character-data loading shown in FIG. 8, has been described without a redundant explanation of these identical steps.

Figure 28:
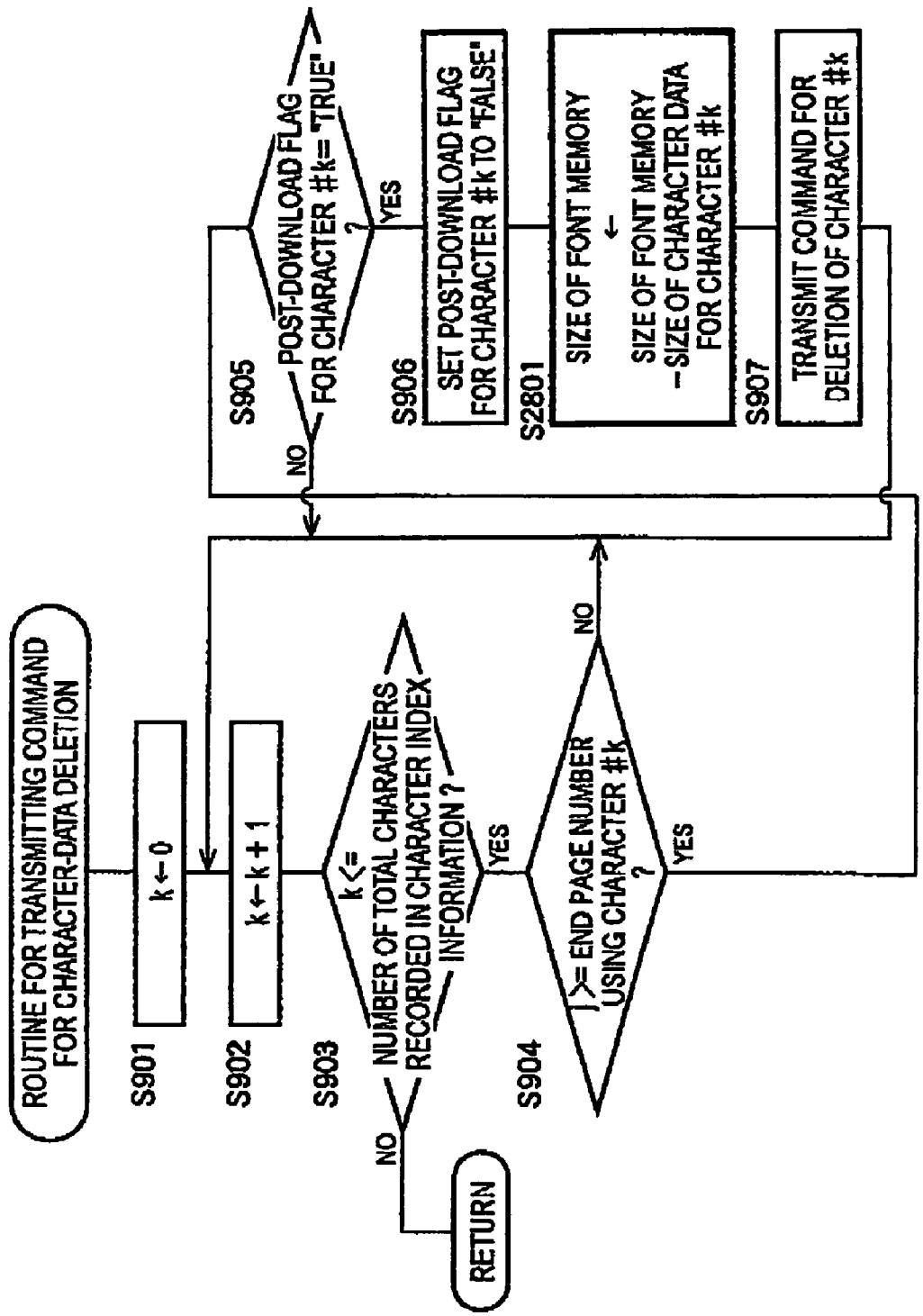
FIG. 28 is a flow chart illustrating schematically an example of a routine for transmitting command for character-data deletion to be executed by the computer in the second embodiment.

FIG. 28 illustrates schematically in flow chart a routine for transmitting command for character-data deletion, which is to be executed by the computer 1, in the step S612 of the routine for processing for data output shown in FIG. 25.

The routine for transmitting command for character-data deletion shown in FIG. 28 is different in configuration from the routine for transmitting command for character-data deletion shown in FIG. 9 in that a new step S2801 is added between the existing steps S906 and S907. The step S2801 is provided to subtract from the current value of font memory size described above, a value indicative of the size of the character data for the character #k which has been deleted from the RAM 27, to thereby update the current value of font memory size.

The routine for transmitting command for character-data deletion shown in FIG. 28, in view of its employment of the identical steps to those of the routine for transmitting command for character-data deletion shown in FIG. 9, has been described without a redundant explanation of these identical steps.

Figure 29:
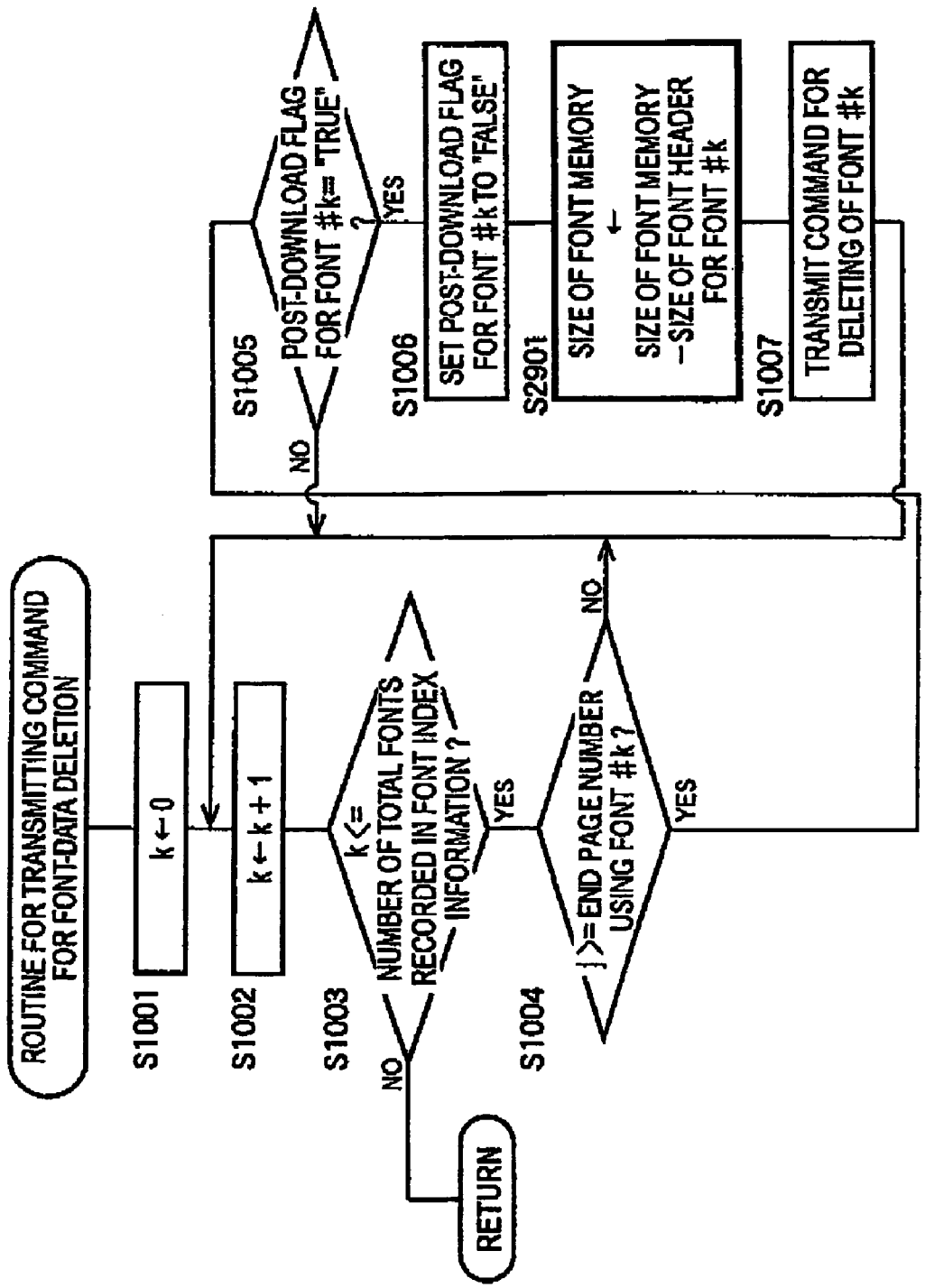
FIG. 29 is a flow chart illustrating schematically an example of a routine for transmitting command for font-data deletion to be executed by the computer in the second embodiment.

FIG. 29 illustrates schematically in flow chart a routine for transmitting command for font-data deletion, which is to be executed by the computer 1, in the step S613 of the routine for processing for data output shown in FIG. 25.

The routine for transmitting command for font-data deletion shown in FIG. 29 is different in configuration from the routine for transmitting command for font-data deletion shown in FIG. 10 in that a new step S2901 is added between the existing steps S1006 and S1007. The step S2901 is provided to subtract from the current value of font memory size described above, a value indicative of the size of data of the font header for the font #k which has been deleted from the RAM 27, to thereby update the current value of font memory size.

The routine for transmitting command for font-data deletion shown in FIG. 29, in view of its employment of the identical steps to those of the routine for transmitting command for font-data deletion shown in FIG. 10, has been described without a redundant explanation of these identical steps.

Then, with reference to FIG. 30 illustrating schematically in flow chart the details of the step S2502 shown in FIG. 25 as a routine for processing for data deletion, the step S2502 will be described below in more detail.

The routine for processing for data deletion shown in FIG. 30 is constructed to implement a plurality of steps which are divided into a first step group to be implemented for transmitting a command instructing the printer 20 to delete character data from the RAM 27, i.e., steps S3001-S3008, and a second step group to be implemented for transmitting a command instructing the printer 20 to delete font header from the RAM 27, i.e., steps S3009-S3016.

These two step groups are different in subject from each other only with respect to whether an object for which each step group is implemented is character data or a font header, and are common in or substantive content or algorithm with each other. The steps S3001-S3008 correspond to the steps S3009-3016, respectively.

Then, the routine for processing for data deletion shown in FIG. 30 will be described, by explaining in more detail the representative steps S3001-S3008, without a redundant explanation of the remaining steps S3009-S3016.

The routine for processing for data deletion shown in FIG. 30 is initiated with the step S3001 to initialize a character number "k" to zero. The step S3001 is followed by the step S3002 to determine whether or not the current value of the font memory size described above exceeds an upper limit of the font memory size. The upper limit is predetermined.

If the current value of the font memory size does not exceed the upper limit of the font memory size, then the determination of the step S3002 becomes negative "NO," and one cycle of the execution of the routine for processing for data deletion is immediately terminated.

On the other hand, if the current value of the font memory size exceeds the upper limit of the font memory size, then the determination of the step S3002 becomes affirmative "YES," and the step S3003 is implemented to increment the current value of the character number "k" by one.

Thereafter, the step S3004 is implemented to determine whether or not the current value of the character number "k" is equal to or smaller than the number of characters which have been recorded in the aforementioned character index information. If the current value of the character number "k" is larger than the number of the characters recorded, then the computer 1 proceeds to the step S3009. On the other hand, if the current value of the character number "k" is equal to or smaller than the number of the characters recorded, then the computer 1 proceeds to the step S3005.

The step S3005 is implemented to determine whether or not both of a first condition that the character to which the same character number as the current value of the character number "k" has been assigned (hereinafter, referred to as "character #k") is not used on the current page "j," and a second condition that the aforementioned post-download flag for the character #k is "true" are together established. If both of these two conditions are not together established, then the computer 1 proceeds to the step S3003, while, if both of these two conditions are together established, then the computer 1 proceeds to the step S3006.

The step S3006 is implemented to set the post-download flag for the character #k to "false," and subsequently the step S3007 is implemented to subtract the size of the character data for the character #k to be deleted from the RAM 27, from the current value of the font memory size. Thereafter, the step S3008 is implemented to transmit a command instructing the printer 20 to delete the data for the character #k from the RAM 27. Then, the computer 1 returns to the step S3002.

As will be readily understood from the above, in the present embodiment, the RAM 27 constitutes an example of the "memory" set forth in the above mode (7), a portion of the computer 1 which is assigned to implement the steps S3005-S3013 constitutes an example of the "inactive-font detecting device" set forth in the same mode, and a portion of the computer 1 which is assigned to implement to the steps S3008-S3016 constitutes an example of the "deletion-command output device" set forth in the same mode.

Further, in the present embodiment, a portion of the computer 1 which is assigned to implement the steps S3002 and S3010 constitutes an example of the "status detector" set forth in the above mode (8).

Next, a third embodiment of the present invention will be described with reference to FIGS. 31-35.

Described generally, a printing system 100 according to the present embodiment is obtained by partially modifying the first embodiment with respect to both of the routine for processing for file creation shown in FIG. 3 (including: the routine for processing for font-header output shown in FIG. 4; and the routine for processing for character-data output shown in FIG. 5), and the routine for processing for data output shown in FIG. 6 (including: the routine for transmitting command for font-data loading shown in FIG. 7; and the routine for transmitting command for character-data loading shown in FIG. 8).

In view of the fact that the present embodiment is common in construction to the first embodiment with respect to the remaining elements, only the corresponding routine in the present embodiment will be described below in more detail, for better understanding the present embodiment, while the common elements of the present embodiment to those of the first embodiment will be referenced the same reference numerals or names as those in the description and illustration of the first embodiment, without a redundant description and illustration.

In the present embodiment, the first data composed of the font header and the character data, prior to the retrieval from a previously-assigned storage area in the aforementioned OS and the storage into the font data file, is stored in a memory area such as the RAM 8 of the computer 1. The font header and the character data, upon needed, are retrieved from the previously-assigned storage area to create the font data required and are then delivered to the printer 20.

Describing comparatively, the first embodiment is configured, such that the font data required is created and stored into the font data file, during execution of the routine for processing for file creation shown in FIG. 3 (the step S202 shown in FIG. 2). The present embodiment is configured, such that the font data required is created and delivered to the printer 20, during execution of a processing for data output (the step S203 shown in FIG. 2).

The above configuration of the present embodiment makes it possible to remove the implementation of the processing for file creation for the font data, without requiring data storage into and data retrieval from the font data file, resulting in reduction in processing time of the computer 1.

Further, the above configuration of the present embodiment, because of the removal of the creation of the font data during the processing for file creation, allows the reduction in the time required for the computer 1 to enter the data processing stage.

This is conducive to the advancement of the point of time at which the data output from the computer 1 to the printer 20 is allowed to start, and eventually, to an earlier start-up of the preparation for the coming printing operation in the printer 20. As a result, the reduction in the total time required for printing by the printer 20 is allowed with the improvement in printing speed of the printer 20.

Figure 31:
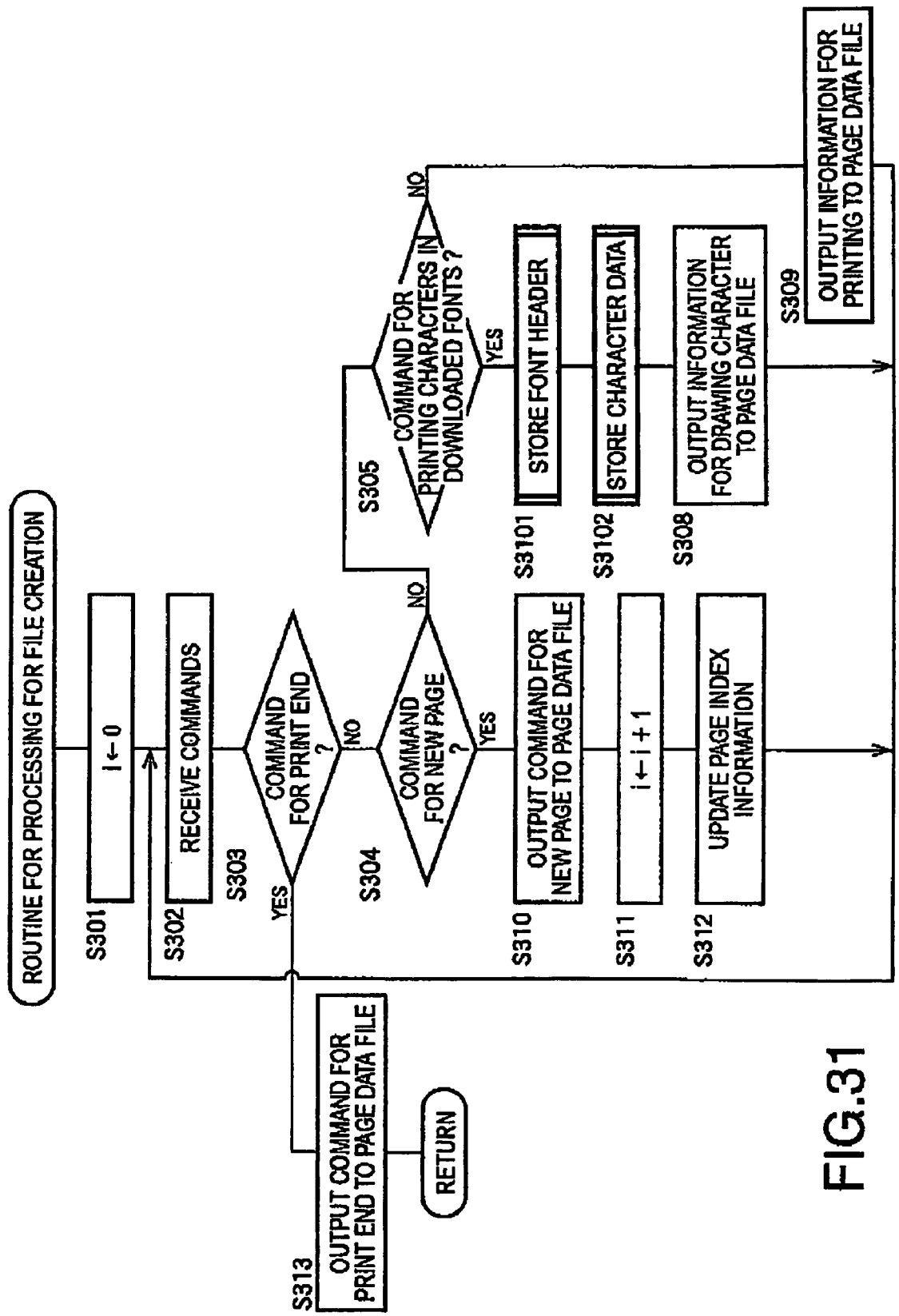
FIG. 31 is a flow chart illustrating schematically an example of a routine for processing for file creation to be executed by a computer of a printing system according to a third embodiment of the present invention.

FIG. 31 illustrates schematically in flow chart a routine for processing for file creation, which is to be executed by the computer 1, in the step S202 of the main program shown in FIG. 2, wherein the computer 1 is within the printing system 100 according to the present embodiment.

The routine for processing for file creation shown in FIG. 31 is different in configuration from the routine for processing for file creation shown in FIG. 3 in that a modified step S3101 in which the font header is merely stored is modified from the original step S3101, and in that a modified step S3102 in which the character data is merely stored is modified from the original step S3102. These steps S3101 and S3102 will be described later in greater detail.

The routine for processing for file creation shown in FIG. 31, in view of its employment of the identical steps to those of the routine for processing for file creation shown in FIG. 3, has been described without a redundant explanation of these identical steps.

Figure 32:
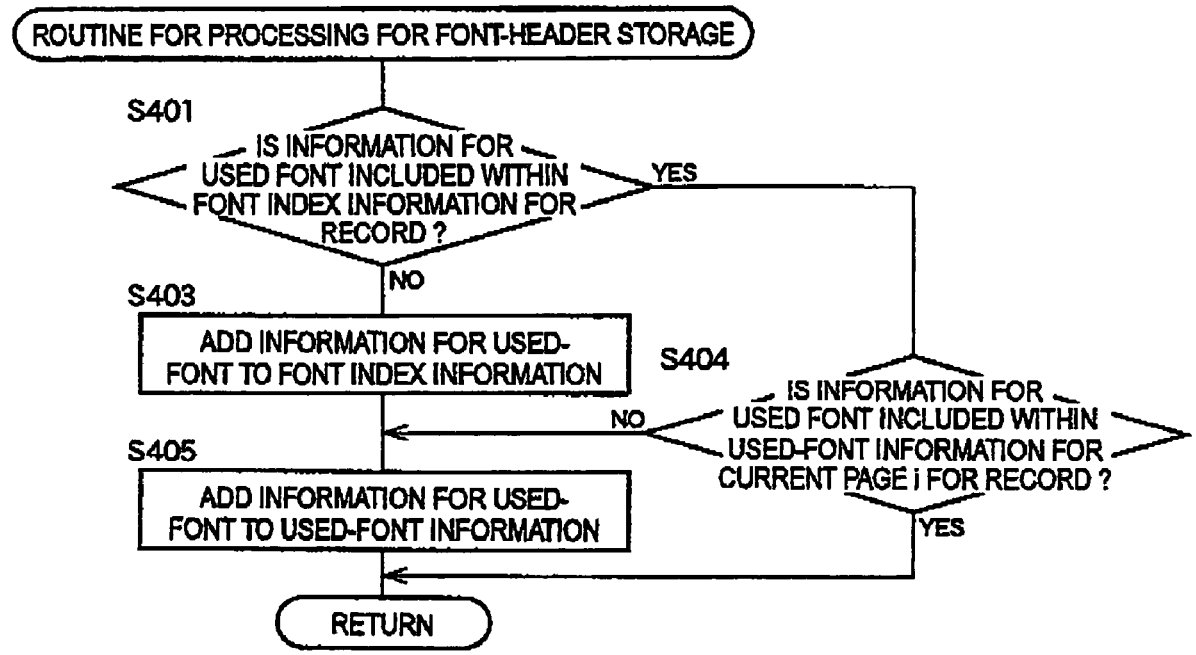
FIG. 32 is a flow chart illustrating schematically an example of a routine for processing for font-header storage to be executed by the computer in the third embodiment.

FIG. 32 illustrates schematically in flow chart the details of the step S3101 shown in FIG. 31 as a routine for processing for font-header storage. The routine for processing for font-header storage shown in FIG. 32 is different from the routine for processing for font-header output shown in FIG. 4 in that the step S402 has been removed which is implemented to create the font data file.

The routine for processing for font-header storage shown in FIG. 32, in view of its employment of the identical steps to those of the routine for processing for font-header output shown in FIG. 4, has been described without a redundant explanation of these identical steps.

Figure 33:
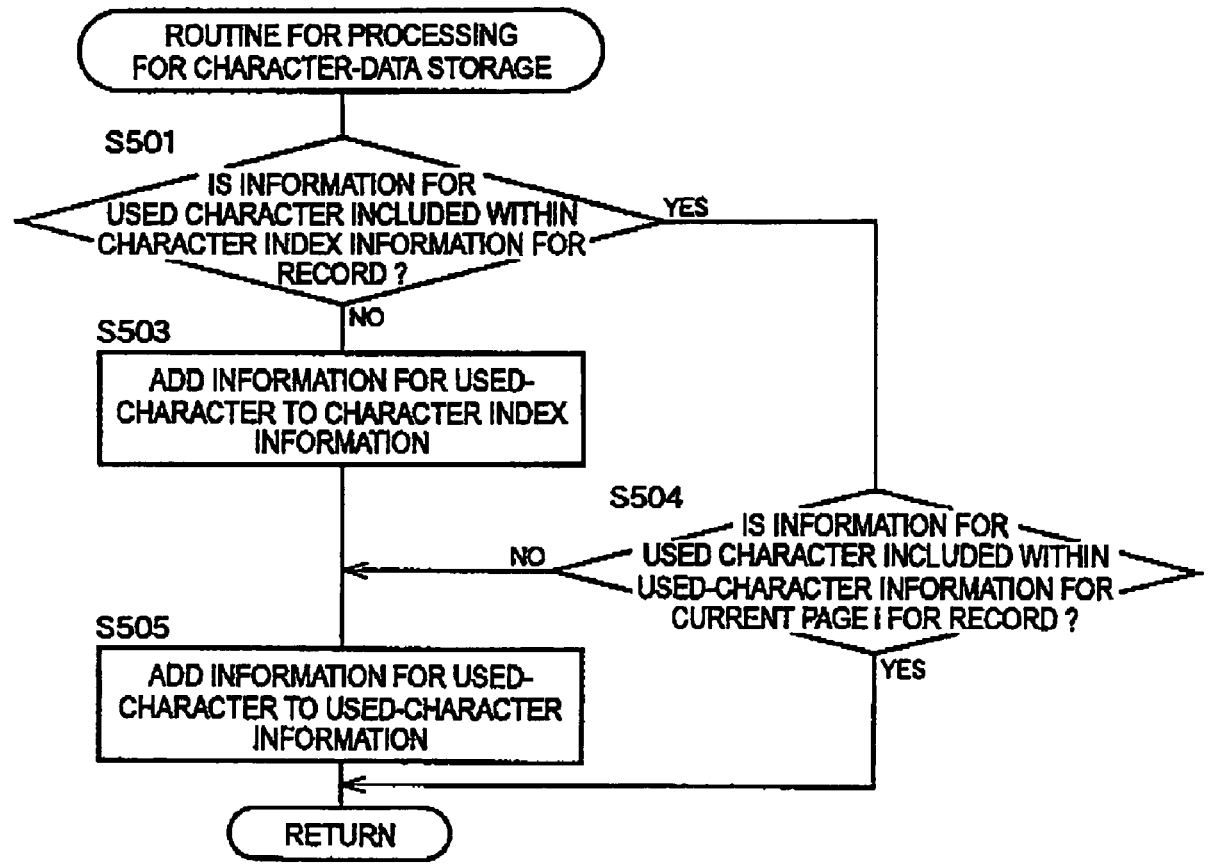
FIG. 33 is a flow chart illustrating schematically an example of a routine for processing for character-data storage to be executed by the computer in the third embodiment.

FIG. 33 illustrates schematically in flow chart the details of the step S3102 shown in FIG. 31 as a routine for processing for character-data storage. The routine for processing for character-data storage shown in FIG. 33 is different from the routine for processing for character-data output shown in FIG. 5 in that the step S502 has been removed which is implemented to create the font data file.

The routine for processing for character-data storage shown in FIG. 33, in view of its employment of the identical steps to those of the routine for processing for character-data output shown in FIG. 5, has been described without a redundant explanation of these identical steps.

Figure 34:
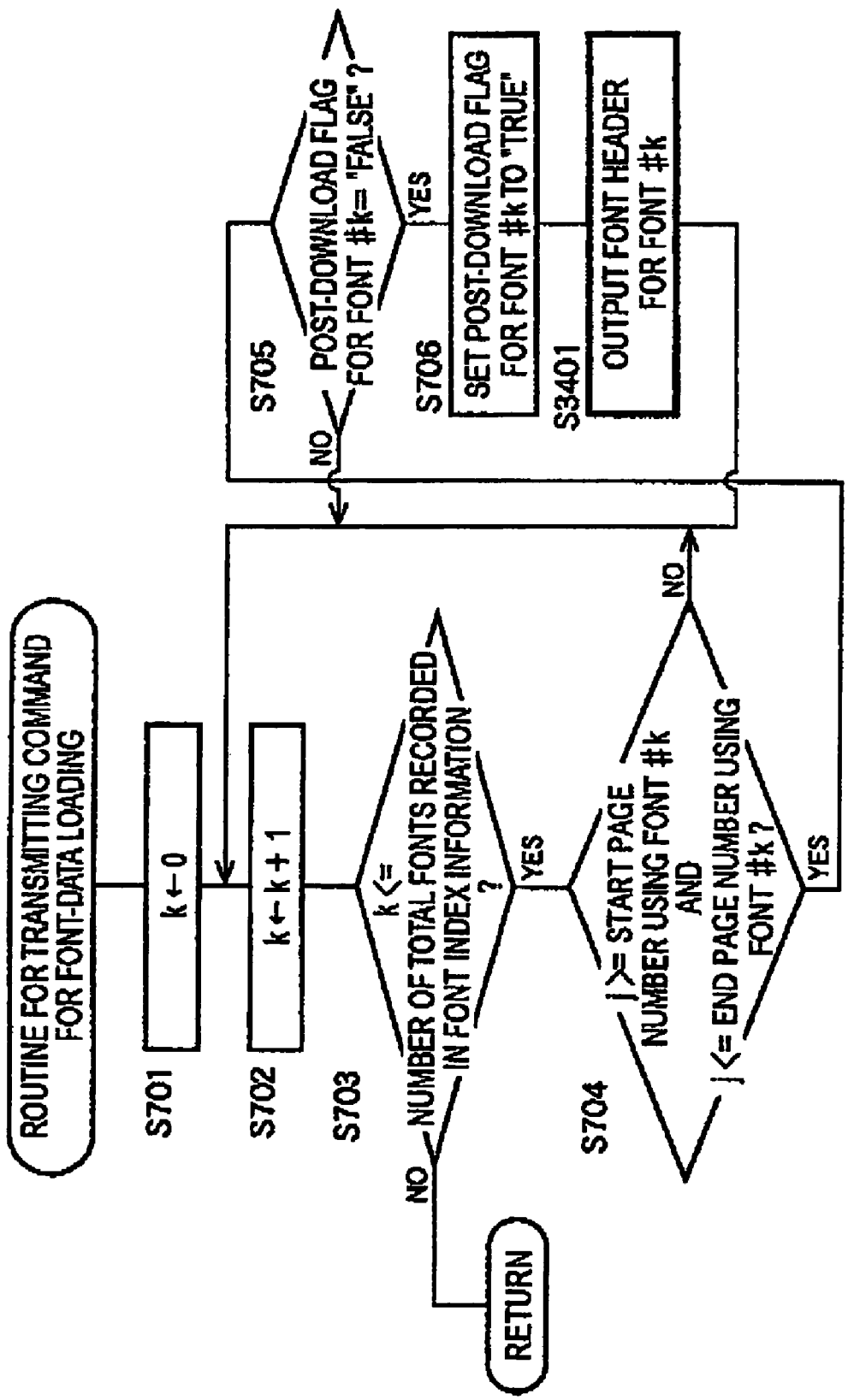
FIG. 34 is a flow chart illustrating schematically an example of a routine for processing for font-data loading to be executed by the computer in the third embodiment.

FIG. 34 illustrates schematically in flow chart as a routine for transmitting command for font-data loading, the details of an alternative step corresponding to the step S609 in the routine for processing for data output shown in FIG. 6. The alternative step is obtained by modifying the step S609 to be in conformity with the present embodiment. The routine for transmitting command for font-data loading shown in FIG. 34 is different from the routine for transmitting command for font-data loading shown in FIG. 7 in that a new step S3401 is implemented instead of the step S707.

Describing comparatively, the first embodiment is configured, such that, as a result of the implementation of the step S707, the font header for the font #k is retrieved from the font data file to be transmitted to the printer 20. The present embodiment is configured, such that, as a result of the implementation of the step S3401, based on font-data specifying information or font-header specifying information (information for specifying a corresponding one of the kinds of font headers, e.g., the corresponding respective pointers) which have been stored in the aforementioned OS, a font header required is created by retrieving from the corresponding header file in the OS, and such that the created font header is transmitted to the printer 20.

The routine for transmitting command for font-data loading shown in FIG. 34, in view of its employment of the identical steps to those of the routine for transmitting command for font-data loading shown in FIG. 7, has been described without a redundant explanation of these identical steps.

Figure 35:
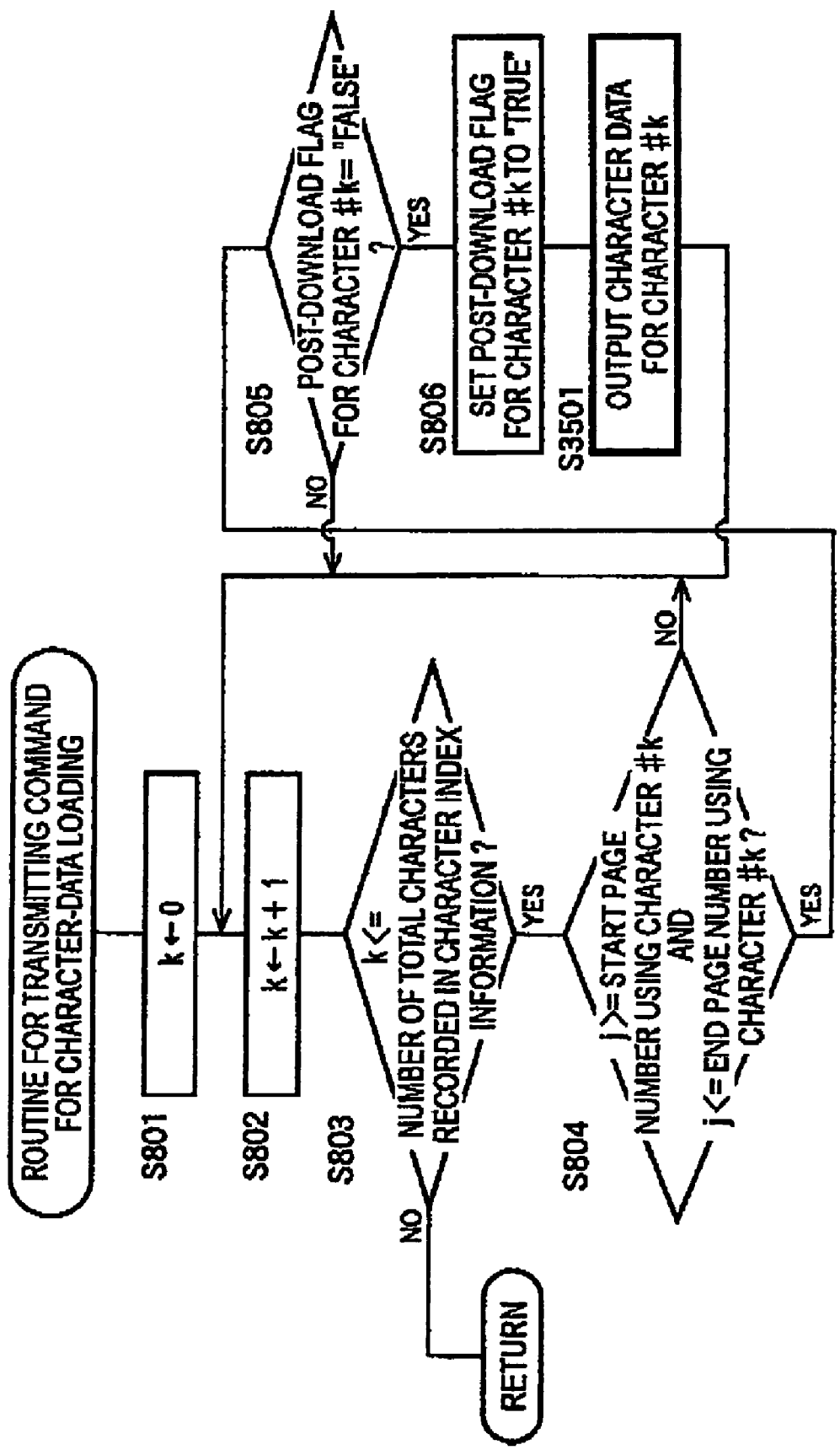
FIG. 35 is a flow chart illustrating schematically an example of a routine for processing for character-data loading to be executed by the computer in the third embodiment.

FIG. 35 illustrates schematically in flow chart as a routine for transmitting command for character-data loading, the details of an alternative step corresponding to the step S610 in the routine for processing for data output shown in FIG. 6. The alternative step is obtained by modifying the step S610 to be in conformity with the present embodiment. The routine for transmitting command for character-data loading shown in FIG. 35 is different from the routine for transmitting command for character-data loading shown in FIG. 8 in that a new step S3501 is implemented instead of the step S807.

Describing comparatively, the first embodiment is configured, such that, as a result of the implementation of the step S807, the character data for the character #k is retrieved from the font data file to be transmitted to the printer 20. The present embodiment is configured, such that, as a result of the implementation of the step S3501, based on character-data specifying information (information for specifying a corresponding one of the kinds of characters, e.g., the corresponding respective character codes) which have been stored in the aforementioned OS, character data (indicating the shape of a character to be printed) required is created by retrieving from the corresponding character data file in the OS, and such that the created character data is transmitted to the printer 20.

The routine for transmitting command for character-data loading shown in FIG. 35, in view of its employment of the identical steps to those of the routine for transmitting command for character-data loading shown in FIG. 8, has been described without a redundant explanation of these identical steps.

As will be evident from the above, in the present embodiment, the RAM 8 constitutes an example of the "memory" set forth in the above mode (13).

The present invention, although has been described through the several preferred embodiments in more detail with reference to the drawings, may be practiced in alternative manners.

Although the above several embodiments have been described by way of an example of a printing in a duplex mode, with the findings that they are useful in reducing the amount of print data required to be delivered to the printer 20, the present invention is also useful in printing pages for booklet production.

In general, in printing pages within a booklet, the tendency exists that the number of the print pages required to be printed is increased, and therefore, it is difficult to store the entire amount of data required for printing into a memory provided in the printer 20.

For the above reason, the approach is not suitable for printing pages within a booklet, of once transmitting the original data created by the execution of the application 2 in the same sequence as the original sequence of pages, and of thereafter modifying the page sequence into the printing sequence in the printer 20, due to the difficulty of the printer 20 in storing a large amount of print data concurrently.

By contrast, the aforementioned embodiments allow the secured modification of the page sequence on the side of the computer 1, without requiring increase in storage capacity of the printer 20 and in amount of data to be transmitted to the printer 20, resulting in the efficient reduction in amount of data within the printer 20. Thus, the present invention may be useful in printing pages for booklet production.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A printing system comprising a print management apparatus and an image forming apparatus, the print management apparatus producing and outputting print data based on original data produced as a result of execution of an application program, the image forming apparatus receiving the print data from the print management apparatus and forming an image using the received print data, the printing system being configured to allow a downloading of downloadable font data for forming a downloadable font for use in a printing operation by the image forming apparatus using the print data, from the print management apparatus to the image forming apparatus, the print management apparatus comprising:

a need determination section configured to make a determination, based on a single print command issued from a user for printing a single document in the form of a plurality of successive print pages, as to whether there is a modification need for modifying a printing sequence in which the successive print pages represented by the print data are to be printed, from an original sequence in which a plurality of successive original pages are arranged that are represented by the original data;

a sequence modifier operable when the need determination section determines the modification need, the sequence modifier modifying into the printing sequence a sequence in which the print management apparatus outputs the print data to the image forming apparatus, within a sequence-modification range selected to at least include a non-correspondence range over which the original sequence and the printing sequence do not coincide in numerical number of pages with each other;

a position determining device determining a font data position at which the downloadable font data is used in the print data;

a redundant-range detector detecting a redundant range over which an identical downloadable font is redundantly used within the selected sequence-modification range, based on the font data position specified by the position determining device; and a print-data producing device configured to output the print data to the image forming apparatus in the printing sequence, without a redundant output of at least one portion of data identical to the downloadable font data previously outputted to the image forming apparatus, over the detected redundant-range, wherein the position determining device does not determine the font data position when the need determination section does not determine the modification need, and the print management apparatus is processing the plurality of successive print pages using the print data of the single print command throughout the entire printing process of the single document.

2. The system according to claim 1, wherein the position determining device determines as at least one downloadable-font-used page at least one of the plurality of print pages on which the downloadable font is used, and wherein the redundant-range detector detects the redundant range based on at least one page number of at least one of the plurality of print pages arranged in the printing sequence of pages, which at least one corresponds to the at least one downloadable-font-used page, upon modification by the sequence modifier of the sequence in which the print data is outputted to the image forming apparatus, from the original sequence of pages into the printing sequence of pages.

3. The system according to claim 2, wherein the at least one downloadable-font-used page comprises a plurality of downloadable-font-used pages, wherein the redundant range detector detects a start page of the plurality of downloadable-font-used pages arranged in the printing sequence of pages, wherein the print-data producing device outputs the font data in timed relation with an event of outputting to the image forming apparatus of a portion of the print data which corresponds to the start page, the print data being representative of the plurality of print pages arranged in the printing sequence of pages, and wherein the print-data producing device avoids a redundant output of at least one portion of data identical to the font data previously outputted to the image forming apparatus, for at least one of the downloadable-font-used pages which follows the start page in the printing sequence.

4. The system according to claim 1, wherein the downloadable font comprises a plurality kinds of downloadable fonts, and wherein the system is configured to allow a downloading of the plurality kinds of downloadable fonts from the print management apparatus to the image forming apparatus, wherein the redundant range detector comprises:

(a) a kind-related-information producing device producing per-page kind-related-information for specifying in kind at least one of the plurality kinds of downloadable fonts which is used for printing the plurality of print pages represented by the print data, on a per print-page basis; and (b) a per-kind redundant-range detecting device detecting a redundant range over which the same kind of downloadable font is redundantly used within the plurality of print pages arranged in the printing sequence of pages, for each of the plurality kinds of downloadable fonts, based on the per-page kind-related-information produced by the kind-related-information producing device, and wherein the print-data producing device avoids a redundant output of at least one portion of data identical to the font data previously outputted to the image forming apparatus, for each of the plurality kinds of downloadable fonts, over the redundant range detected by the per-kind redundant-range detecting device.

5. The system according to claim 1, wherein the image forming apparatus comprises a memory allowing for storage of the font data received from the print-data producing device, wherein the print management apparatus comprises:

(a) an inactive-font detecting device detecting as an inactive font at least one of a plurality of downloadable fonts represented by the font data stored in the memory, which at least one will not be used later at least temporarily; and (b) a deletion-command output device outputting to the image forming apparatus a deletion command instructing the image forming apparatus to delete from the memory data for the inactive font detected by the inactive-font detecting device.

6. The system according to claim 5, further comprising a status detector detecting a status in utilization of the memory, and wherein the deletion-command output device outputs the deletion command to the image forming apparatus, depending upon the status in utilization of the memory detected by the status detector.

7. The system according to claim 6, wherein the status detector detects an available capacity of the memory at a print of a predetermined one of the plurality of print pages, and wherein the deletion-command output device outputs the deletion command to the image forming apparatus, upon fulfillment of a predetermined condition by the available capacity detected by the status detector, so as to instruct the image forming apparatus to temporarily delete from the memory a portion of the font data stored in the memory, which portion will not be used for printing the predetermined page, and which portion functions as data for the inactive font, irrespective of whether or not the portion will be used for printing at least one of the plurality of print pages which follows the predetermined page.

8. The system according to claim 5, wherein the inactive-font detector detects the downloadable font as the inactive font, upon completion of a print of an end page of downloadable-font-used pages of the plurality of print pages arranged in the printing sequence, on which downloadable-font-used pages the downloadable font is used.

9. The system according to claim 8, wherein the downloadable-font-used pages are formed as a series of pages which are selected from the print pages so as to include a start page and an end page on which the downloadable font is used, and at least one intermediate page between the start and end pages on which the downloadable font is not used, and wherein the inactive-font detector is configured, in the presence of the intermediate page not using the downloadable font, so as not to detect the downloadable font as the inactive font, before completion of a print of the end page, and to detect the downloadable font as the inactive font, after completion of the print of the end page.

10. The system according to claim 1, wherein the print data is categorized into first data relating to the font data, and second data other than the first data, wherein the print management apparatus further comprises a storage in which the first data is stored, prior to the printing operation by the image forming apparatus, in a manner that the first data is not redundant with respect to the font data, and that the first data is formatted into a data file required for the printing operation by the image forming apparatus, and wherein the print-data producing device performs outputting of the second data to the image forming apparatus, and retrieval of the first data from the storage and outputting of the retrieved first data to the image forming apparatus.

11. The system according to claim 1, wherein the print data is categorized into first data relating to the font data, and second data other than the first data, wherein the print management apparatus further comprises a memory in which the first data is stored, prior to the printing operation by the image forming apparatus, in a manner that the first data is not formatted into a data file required for the printing operation by the image forming apparatus, and wherein the print-data producing device, operable upon request for the first data, retrieves the first data from the memory, formats the retrieved first data into a data file required for the printing operation by the image forming apparatus, and to output the formatted first data to the image forming apparatus.

12. The system according to claim 1, wherein the font data comprises character-identification data for specifying a character, and font-kind data specifying a kind of a font required to be used for printing a character.

13. The system according to claim 1, wherein the print management apparatus comprises a determining device determining whether or not the print data contains data for the downloadable font.

14. The system according to claim 1, wherein the print-data producing device outputs to the image forming apparatus the print data and the font data in a manner that the font data is attached to the print data, at an event of outputting the print data to the image forming apparatus.

15. The system according to claim 1, wherein the redundant-range detector detects the redundant range based on font index information and character index information.

16. The system according to claim 15, wherein the font index information is information for management of a font data file, which stores a font header and character data, and
   the character index information is a record of, on a per character basis, a font number, a character code, and a start position and a length of an area in which the character data is stored in the font data file.

17. The system according to claim 1, wherein the redundant-range detector determines page numbers of ones of the plurality of print pages arranged in the same sequence as the printing sequence, which ones use an identical downloadable font, and detects that redundant range based on the determined page numbers.

18. A print management apparatus that produces print data based on original data produced as a result of execution of an application program, and that outputs the produced print data to an image forming apparatus forming an image based on the print data received, the print management apparatus being configured to allow a downloading of downloadable font data for forming a downloadable font for use in a printing operation by the image forming apparatus using the print data, from the print management apparatus to the image forming apparatus, the print management apparatus comprising:
   a need determination section configured to make a determination, based on a single print command issued from a user for printing a single document in the form of a plurality of successive print pages, as to whether there is a modification need for modifying a printing sequence in which the successive print pages represented by the print data are to be printed, from an original sequence in which a plurality of successive original pages are arranged that are represented by the original data;
   a sequence modifier operable when the need determination section determines the modification need, the sequence modifier modifying into the printing sequence a sequence in which the print management apparatus outputs the print data to the image forming apparatus, within a sequence-modification range selected to at least include a non-correspondence range over which the original sequence and the printing sequence do not coincide in numerical number of pages with each other;
   a position determining device determining a font data position at which the downloadable font data is used in the print data;
   a redundant-range detector detecting a redundant range over which an identical downloadable font is redundantly used within the selected sequence-modification range, based on the font data position specified by the position determining device; and
   a print-data producing device configured to output the print data to the image forming apparatus in the printing sequence, without a redundant output of at least one portion of data identical to the downloadable font data previously outputted to the image forming apparatus, over the detected redundant-range,
   wherein the position determining device does not determine the font data position when the need determination section does not determine the modification need, and
   the print management apparatus processes the plurality of successive print pages using the print data of the single print command throughout the entire printing process of the single document.

19. A method of print management effected in a print management apparatus that manages a printing operation performed by an image forming apparatus forming an image based on print data, wherein the print management apparatus is configured to produce the print data based on original data produced as a result of execution of an application program, to output the produced print data to the image forming apparatus, and to allow a downloading of downloadable font data for forming a downloadable font for use in the printing operation by the image forming apparatus using the print data, from the print management apparatus to the image forming apparatus, the method comprising:
   a need determination step of making a determination, based on a single print command issued from a user for printing a single document in the form of a plurality of successive print pages, as to whether there is a modification need for modifying a printing sequence in which the successive print pages represented by the print data are to be printed, from an original sequence in which a plurality of successive original pages are arranged that are represented by the original data;
   a sequence-modification step operable when the need determination step determines the modification need, the sequence-modification step is configured to modify into the printing sequence a sequence in which the print management apparatus outputs the print data to the image forming apparatus, within a sequence-modification range selected to at least include a non-correspondence range over which the original sequence and the printing sequence do not coincide in numerical number of pages with each other;
   a position determination step of determining a font data position at which the downloadable font data is used in the print data;
   a redundant-range detection step of detecting a redundant range over which an identical downloadable font is redundantly used within the selected sequence-modification range, based on the font data position specified by the position determination step; and
   a print-data output step of outputting the print data to the image forming apparatus in the printing sequence, without a redundant output of at least one portion of data identical to the downloadable font data previously outputted to the image forming apparatus, over the detected redundant range, wherein the position determination step is not implemented to determine the font data position when the need determination step does not determine the modification need, and the print management appartus processes the plurality of successive print pages using the print data of the single print command throughout the entire printing process of the single document.

20. A computer readable storage having a computer executable program imbedded therein, the program, when executed by a computer, causes the computer to perform the method of claim 19.

* * * * *